(12) United States Patent
Yokota

(10) Patent No.: US 8,325,938 B2
(45) Date of Patent: Dec. 4, 2012

(54) HANDSFREE CALL APPARATUS, ACOUSTIC REPRODUCING APPARATUS WITH HANDSFREE CALL FUNCTION, AND HANDSFREE CALL METHOD

(75) Inventor: Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/537,474

(22) Filed: Aug. 7, 2009

(65) Prior Publication Data

US 2010/0041443 A1    Feb. 18, 2010

(30) Foreign Application Priority Data

Aug. 12, 2008  (JP) ................................. 2008-207918
Aug. 27, 2008  (JP) ................................. 2008-217884

(51) Int. Cl.
*H04B 15/00* (2006.01)
(52) U.S. Cl. ............. 381/93; 381/83; 381/66; 381/71.1; 381/71.4; 381/123; 455/569.1; 455/569.2
(58) Field of Classification Search .................... 381/66, 381/83, 93, 86, 71.1, 71.2, 71.6, 123, 71.4; 704/226, 233; 455/569.1–569.2
See application file for complete search history.

(56) References Cited

U.S. PATENT DOCUMENTS

| 6,993,367 | B2 * | 1/2006 | Yamato et al. | ............. 455/569.2 |
| 2001/0012371 | A1 * | 8/2001 | Baumhauer et al. | .......... 381/345 |
| 2003/0215098 | A1 * | 11/2003 | Marumoto | ................... 381/71.1 |
| 2008/0130908 | A1 * | 6/2008 | Cohen et al. | ................. 381/71.1 |
| 2009/0147965 | A1 * | 6/2009 | Kuo | ............................. 381/71.6 |

FOREIGN PATENT DOCUMENTS

| JP | 02-224499 A | 9/1990 |
| JP | 02-305157 A | 12/1990 |
| JP | 06-023342 U | 3/1994 |
| JP | 08-083081 A | 3/1996 |
| JP | 08-123433 A | 5/1996 |
| JP | 11-298595 A | 10/1999 |
| JP | 2001-146136 A | 5/2001 |
| JP | 2003-125068 A | 4/2003 |
| JP | 2003-263872 A | 9/2003 |
| JP | 2003-344083 A | 12/2003 |
| JP | 2004-016771 A | 1/2004 |
| JP | 2004-354930 A | 12/2004 |
| JP | 2005-277514 A | 10/2005 |
| JP | 2006-080886 A | 3/2006 |
| JP | 2007-036908 A | 2/2007 |
| JP | 2007-104343 A | 4/2007 |

* cited by examiner

Primary Examiner — Disler Paul
(74) Attorney, Agent, or Firm — Wolf, Greenfield & Sacks, P.C.

(57) ABSTRACT

A handsfree call apparatus includes: a speaker held in the vicinity of a user's ear by a holding unit with a speaker unit thereof not being attached to a baffle board so as to mix sounds emitted from the front and back of a diaphragm thereof; a microphone, which is provided to a region where sounds emitted from the front and back of the diaphragm of the speaker are mixed and canceled out, configured to collect the call voice of the user; an output unit configured to output a call voice signal of the user from the microphone to transmit this to a call partner; and an input unit configured to receive a call voice signal from the call partner to supply this to the speaker.

10 Claims, 31 Drawing Sheets

(A)    (B)

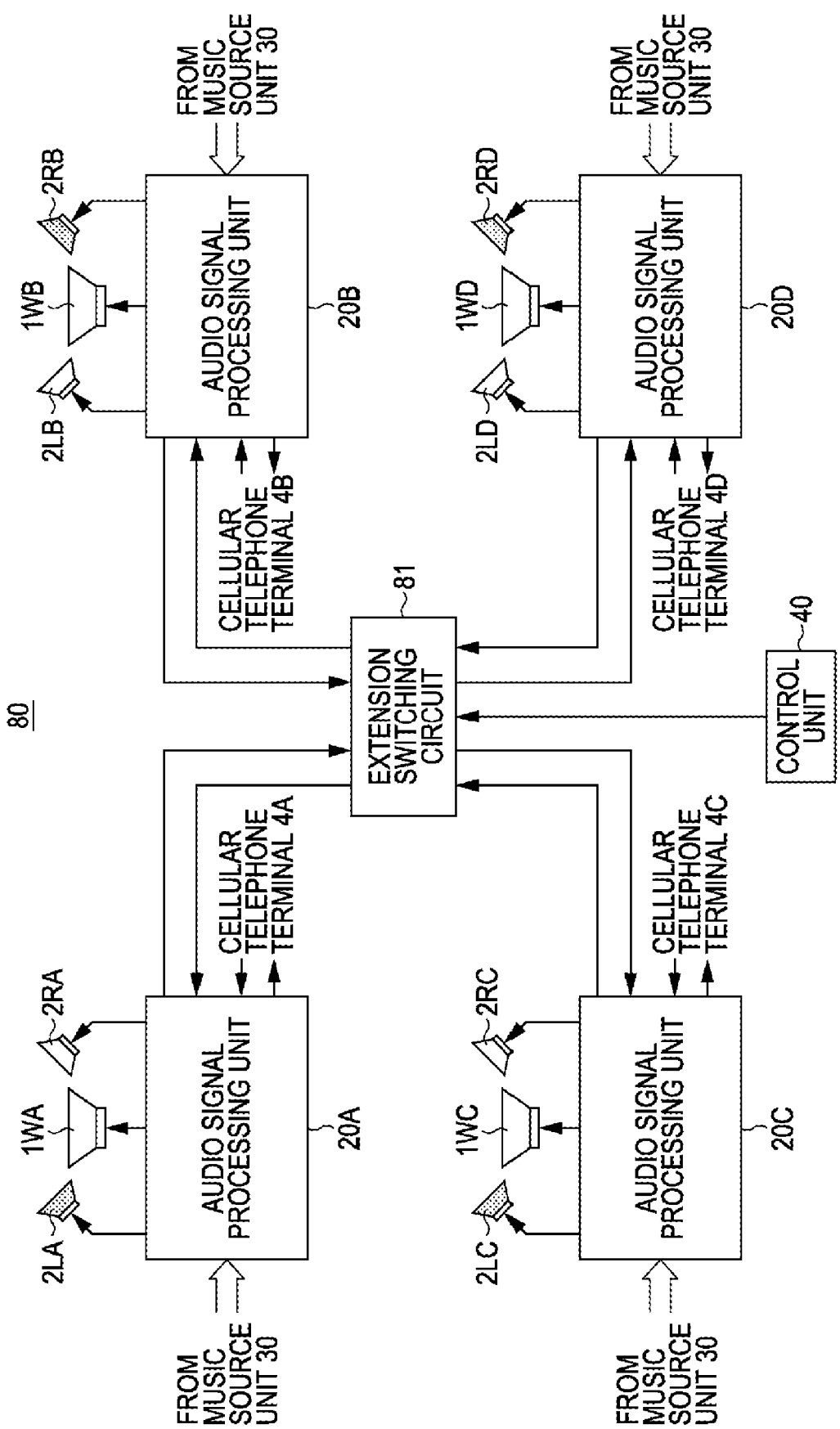

HANDSFREE CALL APPARATUS, ACOUSTIC REPRODUCING APPARATUS WITH HANDSFREE CALL FUNCTION, AND HANDSFREE CALL METHOD

BACKGROUND OF THE INVENTION

1. Field of the Invention

The present invention relates to a handsfree call apparatus, acoustic reproducing apparatus with a handsfree call function, and handsfree call method, which enable a handsfree call.

2. Description of the Related Art

Handsfree call apparatuses have been proposed whereby a user can perform a call without holding a phone handset. Particularly, for the sake of driving safety, an in-vehicle handsfree apparatus has also been proposed whereby a driver can perform a handsfree call.

As for this in-vehicle handsfree apparatus, for example, as shown in FIG. 1, there has been proposed an in-vehicle handsfree apparatus wherein a microphone 102 for transmission of a calling party (driver in this case) 101 is attached to a sun visor 103 provided to the inner side of the front glass of a vehicle. In this case, in a case where an in-vehicle audio playing apparatus is mounted, speakers employed for acoustic reproduction of played audio of the in-vehicle audio playing apparatus thereof can be employed for acoustic reproduction of receiver audio.

Speakers 104 employed for acoustic reproduction of played sound of the in-vehicle audio playing apparatus are provided, as shown in FIG. 1, for example, by being embedded in the doors of a driving seat, passenger seat, and backseat of the vehicle and attached thereto, respectively. Accordingly, in the case of FIG. 1, for example, in a case where a driver performs a handsfree call, an arrangement is made wherein a microphone 102 of the sun visor 103, and the speaker 104 attached to the door on the left side of the driving seat are employed.

However, the case in FIG. 1 includes a problem of howling caused by the microphone 102 collecting the sound emitted from the speaker 104. Also, the case in FIG. 1 includes a problem wherein the disposed positions of the microphone 102 and speaker 104 are separated such as between the sun visor 103 and the door, and accordingly, there is difficulty in how to lay the wiring.

As for an in-vehicle handsfree call apparatus of which this point has been improved, an in-vehicle handsfree call apparatus such as shown in FIG. 2 has been proposed in Japanese Unexamined Patent Application Publication No. 2001-146136. With the in-vehicle handsfree call apparatus disclosed in Japanese Unexamined Patent Application Publication No. 2001-146136, a speaker 112 for a receiver is provided to one of both shoulder portions sandwiching a headrest 114 above a backrest portion 111 of a seat of a vehicle, and a microphone 113 for a transmitter is provided to the other.

According to the configuration in Japanese Unexamined Patent Application Publication No. 2001-146136, the headrest 114 and a user (driver) serve as noise insulation, and howling is reduced, and also wiring as to the speaker 112 and microphone 113 can be shared, for example, such as shown in a wiring portion 115 in FIG. 2.

SUMMARY OF THE INVENTION

However, the above-mentioned in-vehicle handsfree call apparatus in Japanese Unexamined Patent Application Publication No. 2001-146136 has a problem in that howling prevention effects are reduced when the volume of sound emission audio from the speaker 112 is great.

Also, the speaker 112 of the in-vehicle handsfree call apparatus in Japanese Unexamined Patent Application Publication No. 2001-146136 can be employed for music playing of car audio. However, in order to prevent howling, the speaker 112 has to be provided only on the one side, of both shoulder portions sandwiching the headrest 114 above the backrest portion 111, where the microphone 113 is not provided.

Accordingly, in a case where the speaker of the in-vehicle handsfree call apparatus in Japanese Unexamined Patent Application Publication No. 2001-146136 is employed for music playing of the car audio, this results in a configuration not capable of a handsfree call while listening to left and right two-channel stereo reproduced sound.

That is to say, in order to perform left and right two-channel stereo reproduction, speakers have to be disposed on both shoulder portions above the backrest portion 111 of the seat. However, such a speaker layout causes a side where the microphone 113 is provided to dispose a speaker in the vicinity of the microphone 113 thereof. However, with Japanese Unexamined Patent Application Publication No. 2001-146136, the configuration where the speaker 112 is disposed in the vicinity of the microphone 113, does not take howling into consideration. Accordingly, with Japanese Unexamined Patent Application Publication No. 2001-146136, the speaker for music playing has to be provided separately from the speaker for a handsfree call.

It has been found desirable to provide an apparatus and method to realize a layout relationship whereby howling can be prevented even in a case where a speaker and microphone employed for a handsfree call are disposed in adjacent positions.

According to an embodiment of the present invention, a handsfree call apparatus includes: a speaker held in the vicinity of a user's ear by a holding unit with a speaker unit thereof not being attached to a baffle board so as to mix sounds emitted from the front and back of a diaphragm thereof; a microphone, which is provided to a region where sounds emitted from the front and back of the diaphragm of the speaker are mixed and canceled out, configured to collect the call voice of the user; an output unit configured to output a call voice signal of the user from the microphone to transmit this to a call partner; and an input unit configured to receive a call voice signal from the call partner to supply this to the speaker.

With the handsfree call apparatus according to the above-mentioned configuration, the speaker is held in the vicinity of the user's ear by the holding unit with the speaker unit thereof not being attached to the baffle board so as to mix sounds emitted from the front and back of the diaphragm thereof.

The microphone is disposed in a region where sounds emitted from the front and back of the diaphragm of the speaker are mutually mixed and canceled out. Therefore, the microphone rarely collects audio emitted from the speaker, and accordingly, howling due to the microphone collecting sound emission audio from the speaker does not occur.

Moreover, the microphone can be disposed in the vicinity of the speaker, and accordingly, laying of wiring can be readily performed. Note that an arrangement may be made wherein another speaker other than the above-mentioned speaker is disposed instead of the microphone, and the speaker thereof serves as a microphone.

According to an embodiment of the present invention, an acoustic reproducing apparatus with a handsfree call function, includes: first and second speakers held in the vicinity of a user's left and right ears by a holding unit respectively with a speaker unit thereof not being attached to a baffle board so as to mix sounds emitted from the front and back of a diaphragm thereof; an audio signal generating unit configured to generate an audio signal to be supplied to the first and second speakers to be subjected to acoustic reproduction; a microphone, which is provided to a region where sounds emitted from the front and back of the diaphragm of at least one speaker of the first and second speakers are mixed and canceled out, configured to collect the call voice of the user; an output unit configured to output a call voice signal of the user from the microphone to transmit this to a call partner; a first switch circuit, which is provided between the output unit and the microphone, configured to form a route of the call voice signal of the user from the microphone to the output unit at the time of a call; an input unit configured to receive a call voice signal from the call partner to supply this to at least the one speaker; a second switch circuit, which is provided between the input unit and at least the one speaker, configured to form a route of the call voice signal of the call partner from the input unit to at least the one speaker at the time of a call; first and second attenuating units configured to attenuate the two-channel audio signals from the audio signal generating unit at the time of a call; and an adding unit, which is provided between the second switch circuit and at least the one speaker, configured to add the audio signal of one channel from the first and second attenuating units and the call voice signal.

With the acoustic reproducing apparatus with a handsfree call function according to the above-mentioned configuration, the first and second speakers for left and right two-channels are held in the vicinity of both of the user's ears by the holding unit with a speaker unit thereof not being attached to a baffle board so as to mix sounds emitted from the front and back of a diaphragm thereof.

The microphone is disposed in a region where sounds emitted from the front and back of the diaphragm of at least one speaker of the first and second speakers are mixed and canceled out. Therefore, the microphone rarely collects audio emitted from the one speaker, and accordingly, howling due to the microphone collecting sound emission audio from the one speaker thereof does not occur even in the event that the microphone is disposed in a position adjacent to the one speaker thereof.

Therefore, for example, an arrangement may be made wherein the speakers of the left and right channels are disposed on the both shoulder portions above the backrest portion of a seat respectively, and the microphone is disposed in the vicinity of one speaker thereof. Accordingly, for example, even if an arrangement is made wherein a speaker for a handsfree call is employed for music playing of a car stereo, this arrangement can be taken as an arrangement wherein howling does not occur easily.

Moreover, the microphone can be disposed in the vicinity of a speaker, whereby laying of wiring can be readily performed. It goes without saying that an arrangement may be made wherein another speaker other than the above-mentioned speakers is disposed instead of the microphone, and the speaker thereof serves as a microphone.

With the handsfree call apparatus according to an embodiment of the present invention, even in the event that a microphone (or speaker serving as a microphone) is disposed in the vicinity of a speaker, the microphone thereof rarely collects audio emitted from the speaker thereof, and accordingly, howling due to sound emission audio from the speaker does not occur. Moreover, the microphone can be disposed in the vicinity of the speaker, whereby laying of wiring can be readily performed.

Also, an arrangement is made wherein howling can be prevented even if the microphone is disposed in the vicinity of the speaker, and accordingly, the microphone and another speaker are disposed distantly, whereby howling due to collecting audio from the other speaker thereof can be prevented. Therefore, a speaker for handsfree can also be readily employed as a speaker for music playing.

BRIEF DESCRIPTION OF THE DRAWINGS

FIG. 34 is a diagram for describing a call between devices (extension call) according to the tenth embodiment of the present invention;

DESCRIPTION OF THE PREFERRED EMBODIMENTS

Embodiments of a handsfree call apparatus according to the present invention, and embodiments of an acoustic reproducing apparatus with a handsfree call function according to the present invention will be described below with reference to the drawings.

Note that, in order to facilitate description, with the following first through sixth embodiments, description will be made by employing a microphone configured to collect call voice of a user, but with a seventh embodiment and thereafter, description will be made regarding a configuration wherein a speaker is disposed instead of the microphone thereof, and the speaker thereof serves as a microphone.

Embodiment of Handsfree Call Apparatus

First Embodiment

Figure 1:
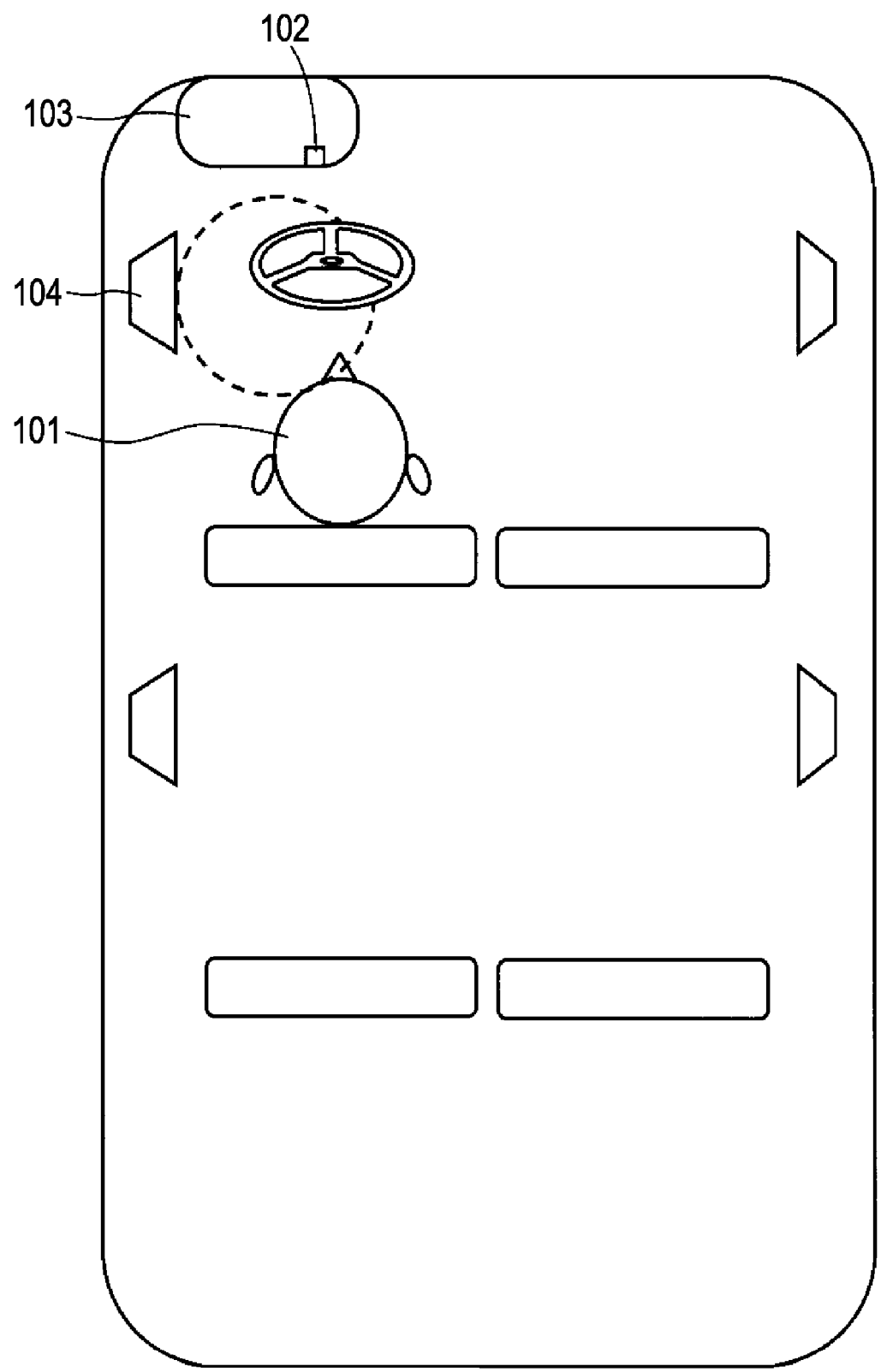
FIG. 1 is a diagram for describing an example of an in-vehicle handsfree call apparatus according to the related art.
Figure 2:
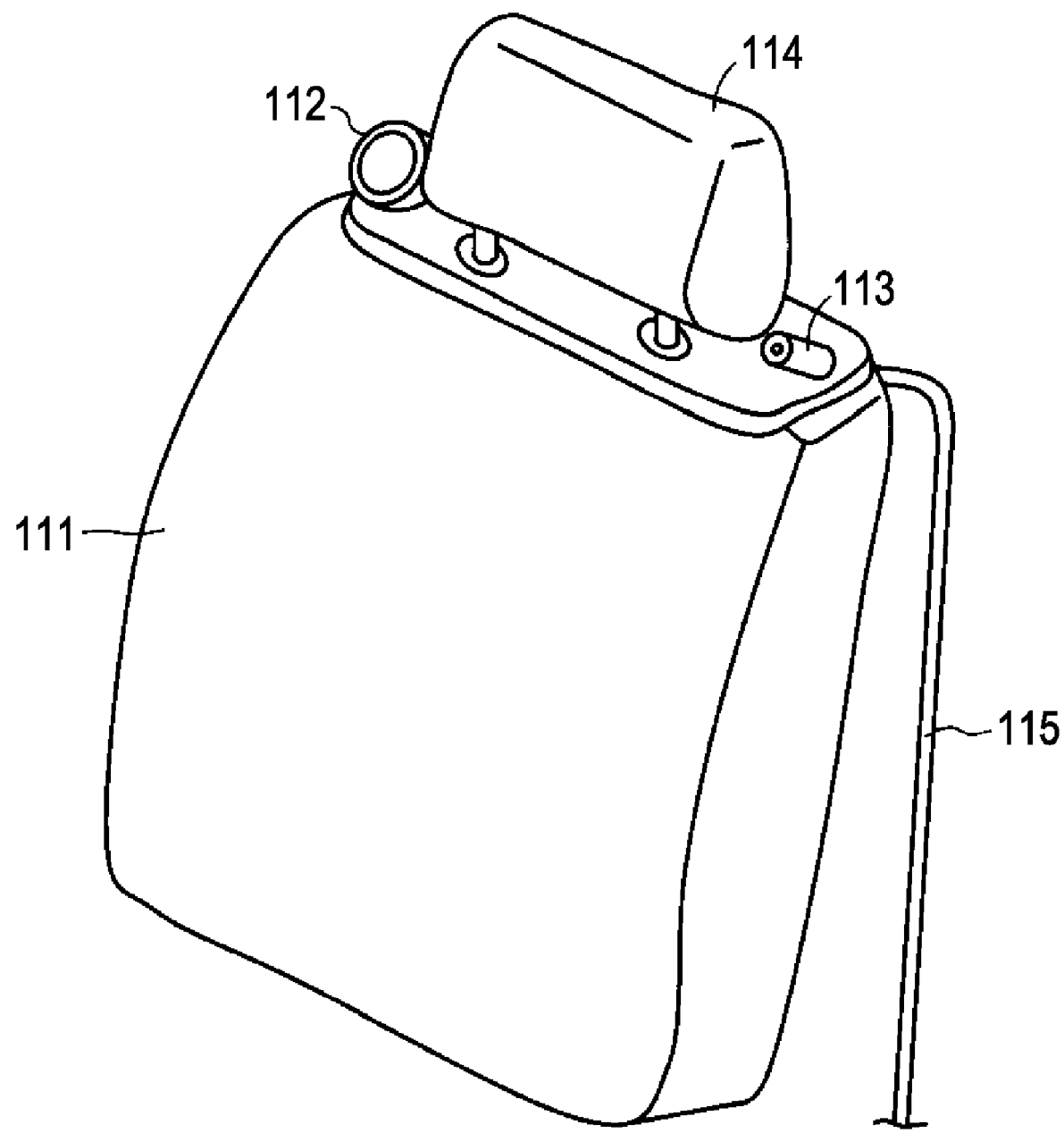
FIG. 2 is a diagram for describing another example of an in-vehicle handsfree call apparatus according to the related art.
Figure 3:
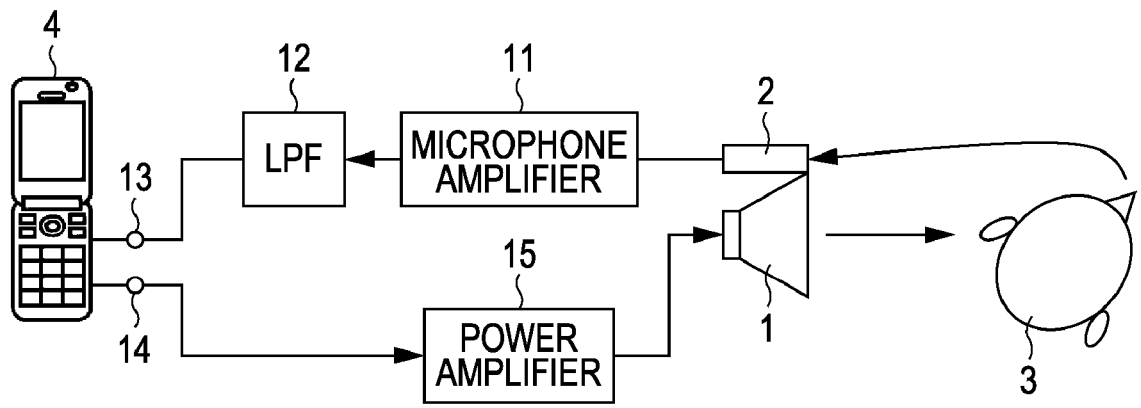
FIG. 3 is a block diagram of a configuration example of an embodiment (first embodiment) of a handsfree call apparatus according to the present invention.

FIG. 3 is a diagram for describing a configuration example of an embodiment of a handsfree call apparatus according to the present invention. With a handsfree call apparatus 10 according to the embodiment shown in FIG. 3, a speaker 1 is disposed in the vicinity of the left ear of a user 3. The speaker 1 is configured as a bare speaker. Specifically, with the speaker 1, a speaker unit thereof is not housed in a speaker box, and is also not attached to a baffle board such that sound emitted in the front of a diaphragm of the speaker unit, and sound emitted from backward can be mixed.

Figure 4:
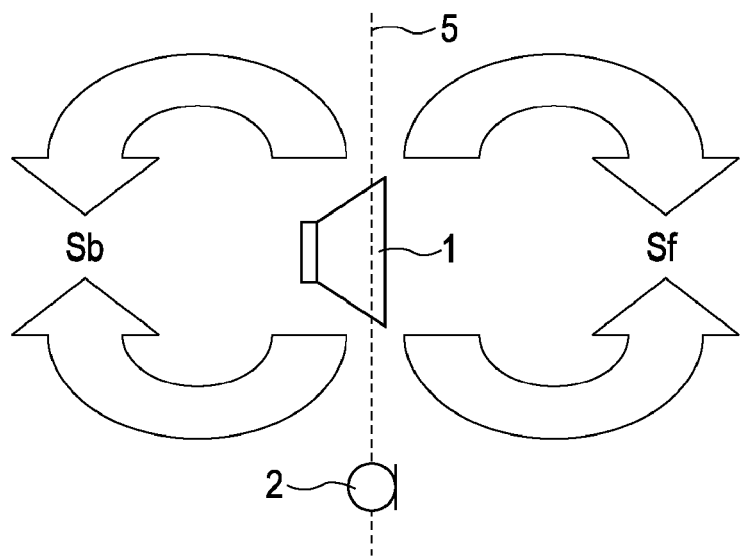
FIG. 4 is a diagram for describing the disposed positions of a speaker and microphone for a handsfree call with the embodiment of the handsfree call apparatus according to the present invention.
Figure 5:
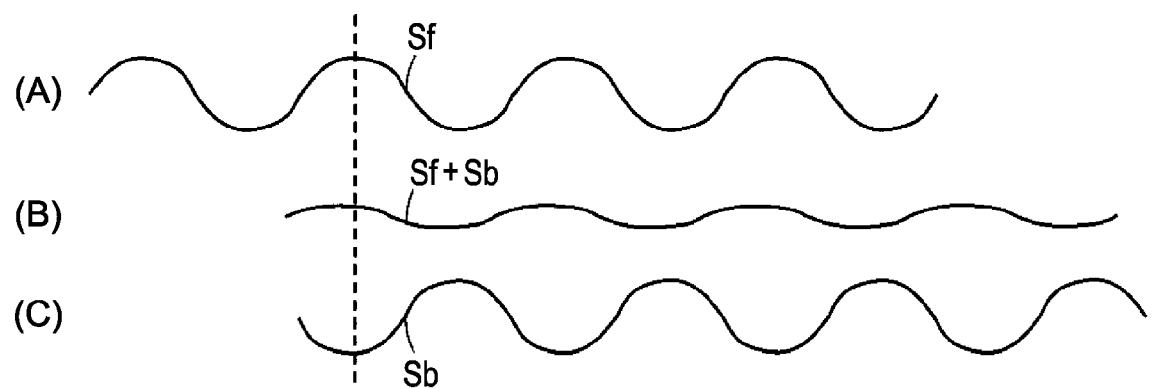
FIG. 5 is a diagram employed for describing a sound pressure zero region with the embodiment of the handsfree call apparatus according to the present invention.

With the bare speaker 1, as shown in FIG. 4, a sound wave Sf emitted from the front of the diaphragm of the speaker unit, and a sound wave Sb emitted from the back thereof are mixed. Here, the phase of the sound wave Sf emitted from the front of the diaphragm of the speaker unit (see (A) in FIG. 5), and the phase of the sound wave Sb emitted from the back of the diaphragm (see (C) in FIG. 5) become reversed phases mutually. Therefore, with a region outer side than the outer circumferential end of the diaphragm thereof within a face parallel to a face including the outer circumferential end of the diaphragm of the speaker 1, there is a region Zo where sounds emitted from the front and back of the diaphragm thereof are mixed and canceled out (see (B) in FIG. 5), and sound pressure is around zero (hereafter, referred to as "sound pressure zero region").

The sound pressure zero region Zo can be confirmed by employing the microphone to collect emitted sound waves from the speaker 1 when reproducing audio at the speaker 1. FIG. 4 illustrates this region with a dashed line 5.

With the present embodiment, a microphone 2 for collection of transmitted audio of a transmitter (user 3) is disposed in an arbitrary position of the sound pressure zero region Zo. Note that in the present Specification, the term "transmitter" refers to a transmitting party of a call, and the term "receiver" refers to the receiving party of a call.

In actual use, for example, the neighborhood of the outer circumferential frame portion of the diaphragm of the speaker 1 becomes the sound pressure zero region Zo, and accordingly, the microphone 2 is fixed to the outer circumferential frame portion of the diaphragm of the speaker 1 thereof, and the microphone 2 is disposed in the sound pressure zero region Zo. That is to say, with this example, the holding unit of the microphone 2 serves as the speaker 1.

Figure 6:
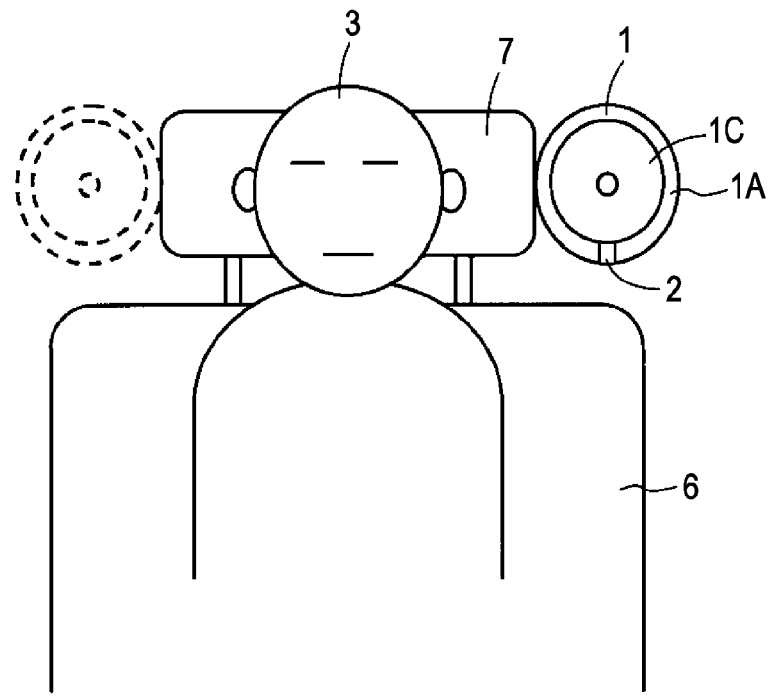
FIG. 6 is a diagram illustrating an example of the disposed positions of the speaker and microphone for a handsfree call with the embodiment of the handsfree call apparatus according to the present invention.

With the present embodiment, as shown in FIG. 6, the speaker 1 is fixed to the left ear side of the user 3 of a headrest portion 7 of a seat 6 where the user 3 sits, such that the vibrating face of the diaphragm 1C faces the user side. With this example, in order that the vibrating face of the diaphragm 1C of the speaker 1 faces the user side, the speaker 1 is attached to the headrest portion 7 in a state in which the vibrating face of the diaphragm 1C slants around 45 degrees for example as to the long piece direction of the headrest portion 7.

As shown in FIG. 6, the microphone 2 is fixed to the position corresponding to the mouth of the user 3 with the outer circumferential frame portion 1A of the diaphragm 1C of the speaker 1. With the example in FIG. 6, the speaker 1 is attached to the headrest portion 7 in a state in which the attachment position of the microphone 2 of the outer circumferential frame portion 1A of the speaker 1 is at the lowermost end position.

Call voice emitted from the user 3 is collected by the microphone 2. A call voice signal obtained by being subjected to acousto-electric conversion at the microphone 2 is supplied to a low-pass filter 12 through a microphone amplifier 11. Subsequently, with the present embodiment, the output audio signal of the low-pass filter 12 is supplied to the transmitter audio input terminal of a cellular telephone terminal 4 through an audio signal output terminal 13.

Also, the receiver audio signal from a call partner from the receiver audio output terminal of the cellular telephone terminal 4 is input to the handsfree call apparatus 10 according to the present embodiment through an audio signal input terminal 14. Subsequently, the receiver audio signal input through the audio signal input terminal 14 is supplied to the speaker 1 through a power amplifier 15. In this case, the speaker 1 is disposed near the user's ear, and accordingly, the sound volume of call voice emitted from the speaker 1 can be suppressed. This is also more effective for howling prevention.

With the present embodiment, the low-pass filter 12 is provided according to the following reason. Specifically, of sounds emitted from the front and back of the diaphragm 1C of the bare speaker 1, and particularly with regard to low frequencies, cancellation effects of the sounds emitted from the front and back of the diaphragm 1C are great. The middle through high frequency components of the sounds emitted from the front and back of the diaphragm 1C of the bare speaker 1 are attenuated greatly in the sound pressure zero region Zo, but do not become zero completely.

Therefore, with the present embodiment, in order to enable a call to be performed stably in a sure manner without howling, according to the low-pass filter 12, the components of the sounds emitted from the front and back of the diaphragm 1C of the bare speaker 1 are restricted to only call voice band components of which the sound pressure is approximately completely canceled out and becomes zero when the microphone 2 is disposed in the above-mentioned sound pressure zero region Zo. With this example, a cut-off frequency at the low-pass filter 12 is set to, for example, around 2 kHz. The cut-off frequency of the low-pass filter 12 differs depending on the use environment of the handsfree call apparatus, and for example, it can be conceived that the cut-off frequency is at or below 1 kHz.

According to the above-mentioned configuration, with the handsfree apparatus 10 according to the present embodiment, a call can be performed stably without concern about howling. The microphone 2 may be fixed to the speaker 1, and in this case, the speaker 1 and microphone 2 approximate, and may be handled as one unit, thereby providing an advantage wherein attachment, wiring, or the like can be readily facilitated.

Also, for example, in FIG. 6, as shown in dotted lines, a right channel speaker SPR is disposed on the right ear side, and the speaker 1 according to the above-mentioned embodiment is a left channel speaker, whereby an acoustic reproducing apparatus for two-channel stereo can be readily realized.

Note that, with the above-mentioned embodiment, the speaker 1 and microphone 2 have been disposed only on the left side of the user, but it goes without saying that the speaker 1 and microphone 2 may be disposed on the right side of the user.

Also, speakers and microphones are disposed on both of the left and right sides of the user as with the same layout relationship of the above-mentioned speaker 1 and microphone 2, and both may be employed for a handsfree call. In this case, sounds are collected at the left and right microphones, transmitter audio signals passed through the low-pass filter are combined, and are transmitted from the audio signal output terminal 13. Also, the receiver audio signal from a call partner is distributed to the left and right speakers, and the distributed signals are subjected to acoustic reproduction.

Embodiment of Acoustic Reproducing Apparatus with Handsfree Call Function

Second Embodiment

Figure 7:
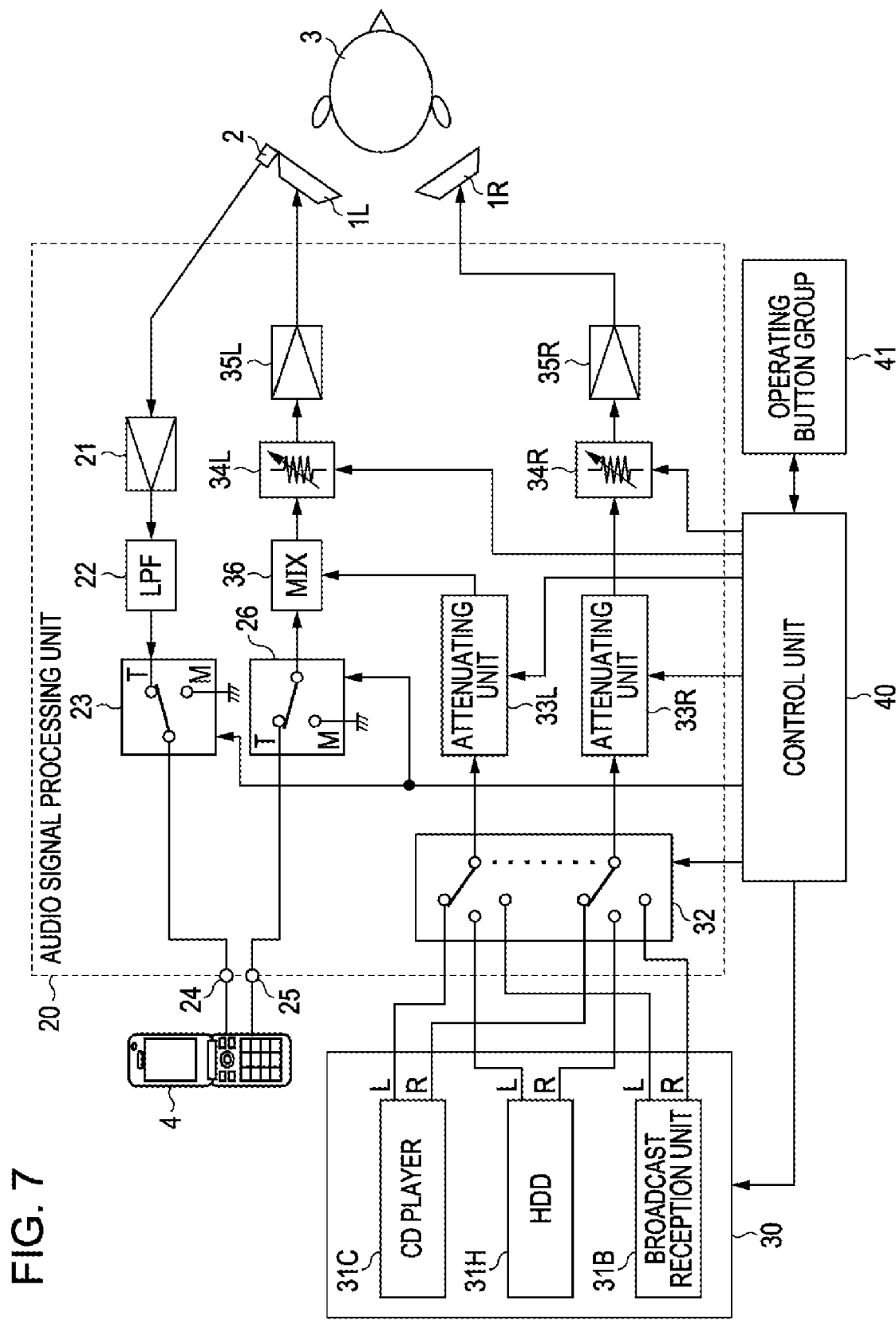
FIG. 7 is a block diagram illustrating a configuration example of an embodiment (second embodiment) of an acoustic reproducing apparatus with a handsfree call function according to the present invention.

FIG. 7 is a block diagram illustrating a configuration example of an embodiment (second embodiment) of an acoustic reproducing apparatus with a handsfree call function. In FIG. 7, the same components as those of the above-described handsfree call apparatus 10 are denoted with the same reference numerals. The present second embodiment is a case where, with a stereo acoustic reproducing apparatus of left and right two channels, the speaker of one channel thereof is employed as a speaker for a handsfree call function.

The acoustic reproducing apparatus with a handsfree call function according to the present embodiment is configured of an audio signal processing unit 20, music source unit 30 serving as an example of audio signal generating unit, control unit 40, operating button group 41, and cellular telephone terminal 4.

Figure 8:
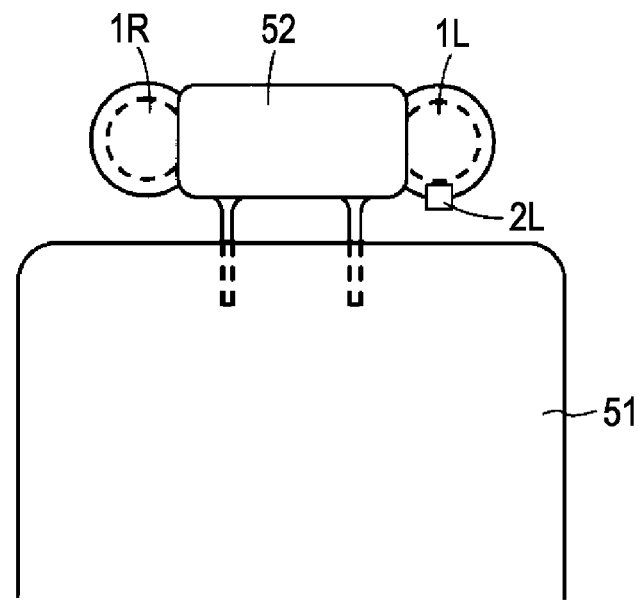
FIG. 8 is a diagram illustrating an example of the disposed positions of the speaker and microphone according to the second embodiment of the present invention.

As shown in FIG. 8, with the present embodiment, a speaker 1L for the left channel and a speaker 1R for the right channel are attached to both sides of a headrest portion 52 of a seat 51 where the user 3 sits. These speakers 1L and 1R for left and right channels have a bare speaker configuration.

With the present embodiment, with regard to sound waves emitted from the speaker 1L for the left channel, the microphone 2 for collecting transmitter audio of the transmitter (user 3) is disposed in an arbitrary position of the sound pressure zero region Zo. As described above, the neighborhood of the outer circumferential frame portion of the diaphragm of the speaker 1L becomes the sound pressure zero region Zo, and accordingly, with the present embodiment as well, the microphone 2 is fixed to the outer circumferential frame portion of the diaphragm of the speaker 1L thereof, and is disposed in the sound pressure zero region Zo.

With the present embodiment, the speaker 1L for the left channel is employed for a handsfree call function, and accordingly, the microphone 2 is provided to only the speaker 1L for the left channel, and the speaker for the right channel is not employed for a handsfree call.

With the present embodiment, the music source unit 30 includes a CD (Compact Disc) player 31C, hard disk drive (hereafter, abbreviated as HDD) 31H, and broadcast reception unit 31B. Upon CD being loaded to a CD player 31C, the CD player 31C decodes two-channel audio signals and output these. The music data of a great number of music contents is stored in an HDD 31H, and upon this being selected, the HDD 31H decodes the music data to output two-channel audio signals. The broadcast reception unit 31B can receive, for example, AM radio broadcast, FM radio broadcast, television broadcast, or the like, and outputs the received broadcast audio as two-channel audio signals.

With the present embodiment, the audio signals for the left and right two channels from the CD player 31C, HDD 31H, and broadcast reception unit 31B are supplied to the audio signal processing unit 20.

With the audio signal processing unit 20, the audio signals for the two channels from the CD player 31C, HDD 31H, and broadcast reception unit 31B are input to a source selecting circuit 32.

Figure 9:
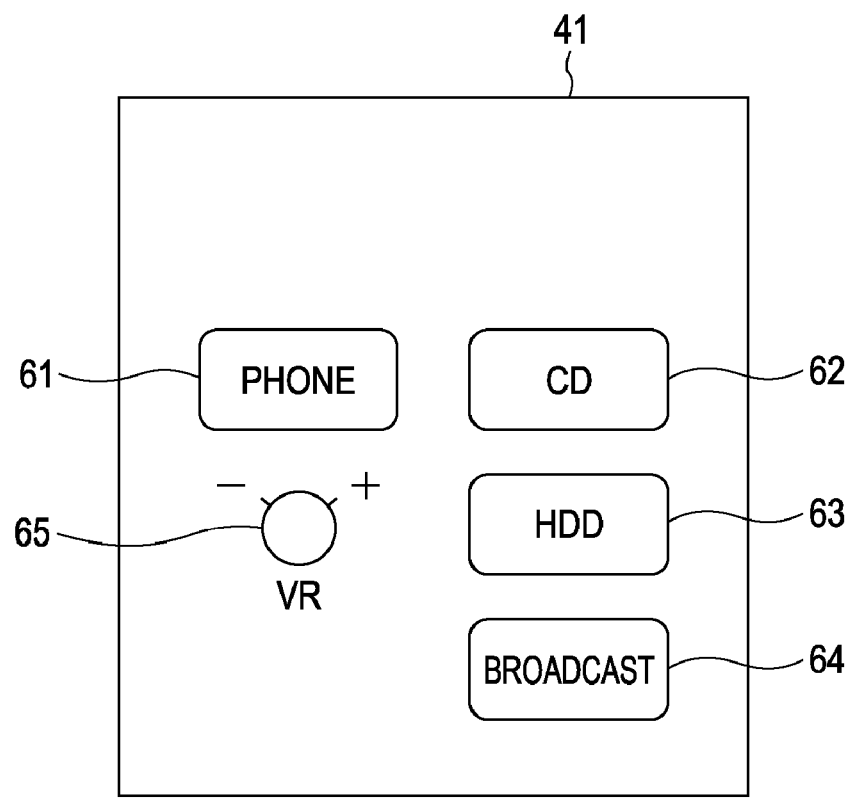
FIG. 9 is a diagram illustrating an example of an operating button group according to the second and seventh embodiments of the present invention.

The operating button group 41 includes, as shown in FIG. 9, selection buttons such as a phone button 61, CD button 62, HDD button 63, broadcast button 64, and so forth, and volume control knob 65. The operating signal corresponding to button operations by the user at the operating button group 41 is supplied to the control unit 40.

Note that the operating button group 41 also includes, in addition to the selection buttons such as described above, repeat play, and shuffle play as to the CD player 31C and HDD 31H, and an operating button for broadcast channel selection with the broadcast reception unit 31B, and so forth. However, in order to simplify description, illustrations and descriptions regarding these buttons will be omitted.

The control unit 40, which is configured of a microcomputer being mounted thereupon for example, generates the control signal corresponding to the button operations of the user with the operating button group 41, and supplies this to necessary units of the music source unit 30 and audio signal processing unit 20.

The acoustic reproducing apparatus with a handsfree call function according to the present embodiment is controlled by the control unit 40 so as to be in a music source playing mode at the time of the phone button 61 not being pressed, and so as to be in a handsfree call mode at the time of the phone button 61 being pressed. Note that, with the handsfree call mode according to the present embodiment, control is performed so as to reduce the sound volume of a music source to the extent of playing of the music source not being stopped, i.e., to the extent of a handsfree call not being influenced, as described later.

In the music source playing mode, upon a selection button regarding a music source, such as the CD button 62, HDD button 63, broadcast button 64, or the like, being pressed, the control unit 40 supplies a source selection signal to the source selecting circuit 32.

The source selecting circuit 32 is selectively controlled by the source selection signal thereof, and performs selection control so as to select the music source corresponding to the pressed selection button. For example, upon the CD button 62 being pressed, the source selecting circuit 32 selectively outputs the audio signals of the left and right two channels from the CD player 31C. Similarly, the source selecting circuit 32 selectively outputs the audio signals of the left and right two channels from the HDD 31H upon the HDD button 63 being pressed, and outputs the audio signals of the left and right two channels from the broadcast reception unit 31B upon the broadcast button 64 being pressed.

With the present embodiment, of the audio signals of the two channels from the source selecting circuit 32, the audio signal of the left channel is supplied to a mixing circuit 36 with a receiver audio signal at the time of a call through an attenuating unit 33L. The output audio signal of the mixing circuit 36 is supplied to the speaker 1L for the left channel through a potentiometer 34L for volume control and a power amplifier 35L, and is reproduced acoustically.

Also, the audio signal of the right channel of the audio signals of the two channels from the source selecting circuit 32 is supplied to the speaker 1R for the right channel through an attenuating unit 33R, potentiometer 34R for volume control, and power amplifier 35R, and is reproduced acoustically.

In this case, the speakers 1L and 1R are disposed in the vicinity of the user's ears, and accordingly, sounds emitted from the speakers 1L and 1R can be suppressed to a small output volume.

With the acoustic reproducing apparatus with a handsfree call function according to the present embodiment, the attenuating units 33L and 33R are for reducing the sound volume of a music source from the music source unit 30 when performing a handsfree call. In the music source playing mode, the attenuation amounts of the attenuating units 33L and 33R are zero. That is to say, in the music source playing mode, the attenuating units 33L and 33R inputs/outputs an input audio signal without attenuation.

Upon the user pressing the phone button 61 of the operating button group 41, the control unit 40 detects this to switch the music source playing mode to the handsfree call mode, supplies an attenuation control signal to the attenuating units 33L and 33R so as to attenuate the audio signal from the source selecting circuit 32.

In this case, the attenuation amounts of the attenuating units 33L and 33R are selected so as to attenuate the audio signal of a music source to the extent of a call not being hindered. The attenuation amounts of the attenuating units 33L and 33R may the same. However, with the present embodiment, only the left channel is employed for a call, and accordingly, the attenuation amount of the attenuating unit 33L for the left channel is set to be greater than the attenuation amount of the attenuating unit 33R for the right channel. For example, with the present embodiment, the attenuation amount of the attenuating unit 33L for the left channel is set to −20 dB, and the attenuation amount of the attenuating unit 33R for the right channel is set to −10 dB, at the time of a handsfree call.

The potentiometers 34L and 34R for volume control are for controlling the volumes of the audio signals supplied to the speakers 1L and 1R at the time of the volume control knob 65 being operated by the user, in accordance with the operation thereof.

Specifically, upon the user rotating the volume control knob 65 to the right for example, the control unit 40 detects this to control the potentiometers 34L and 34R for volume control so as to increase the sound volumes of the audio signals to be supplied to the speakers 1L and 1R for the worth of the rotational amount thereof. Also, upon the user rotating the volume control knob 65 to the left for example, the control unit 40 detects this to control the potentiometers 34L and 34R for volume control so as to decrease the sound volumes of the audio signals to be supplied to the speakers 1L and 1R for the worth of the rotational amount thereof.

Next, the processing system of an audio signal for a handsfree call will be described. With the present embodiment, as shown in FIG. 7, according to the microphone 2, call voice emitted from the user 3 is collected, subjected to acousto-electric conversion to generate a call voice signal, and the call voice signal is input to the audio signal processing unit 20. With the audio signal processing unit 20, the call voice signal from the microphone 2 is supplied to a low-pass filter 22 similar to the above-mentioned low-pass filter 12 through a microphone amplifier 21. Subsequently, the output audio signal of the low-pass filter 22 is supplied to a call side terminal (input terminal) T of a switch circuit 23 to be switched between at the time of a call and at the time of music source playing.

A music playing side terminal (input terminal) M of the switch circuit 23 is grounded. A switching terminal (output terminal) of the switch circuit 23 is connected to the transmitter audio input terminal of the cellular telephone terminal 4 through an audio signal output terminal 24 with the present embodiment. That is to say, the transmitter audio signal of the user 3 collected at the microphone 2 is supplied to the transmitter audio input terminal of the cellular telephone terminal 4.

Also, a receiver audio signal from a call partner from the receiver audio output terminal of the cellular telephone terminal 4 is input to the audio signal processing unit 20 according to the present embodiment through an audio signal input terminal 25. Subsequently, the receiver audio signal input through the audio signal input terminal 25 is supplied to a call side terminal (input terminal) T of a switch circuit 26 to be switched between at the time of a call and at the time of music source playing.

A music playing side terminal (input terminal) M of the switch circuit 26 is grounded with the present embodiment. A switching terminal (output terminal) of the switch circuit 26 is connected to the mixing circuit 36, and at the time of a call, a receiver audio signal from the call partner is supplied to the mixing circuit 36 through the call side terminal T. Subsequently, the output audio signal of the mixing circuit 36 is supplied to the speaker 1L for the left channel through the potentiometer 34L for volume control and power amplifier 35L, and is reproduced acoustically.

Operation of Second Embodiment

In the music source playing mode, the switch circuits 23 and 26 have been both switched to the music playing side terminals M, and a collected audio signal from the microphone 2 is supplied to a ground end through a switch circuit 23. Also, an audio signal from the cellular telephone terminal 4 is interrupted by the switch circuit 26.

A music source from the music source unit 30 is supplied to the speakers 1L and 1R for the left and right channels, and is reproduced acoustically. The attenuation amounts at the attenuating units 33L and 33R at this time are zero. The output volume is changed by the operations of the volume control knob 65 of the operating button group 41. Also, the source of the audio signals of the two channels to be transmitted from the music source unit 30 is changed by the CD button 62, HDD button 63, broadcast button 64 or the like of the operating button group 41 being operated.

Next, at the time of the music source playing mode, in a case where the cellular telephone terminal 4 has received an incoming call, with the present embodiment, the user performs incoming call response operations (e.g., offhook operations) at the cellular telephone terminal 4, and also presses the phone button 61 of the operating button group 41.

Also, in a case where the user 3 transmits an outgoing call from the cellular telephone terminal 4 to a call partner to perform a handsfree call, with the present embodiment, the user 3 performs outgoing call operations to the call partner at the cellular telephone terminal 4, and also presses the phone button 61.

Upon the user pressing the phone button 61 of the operating button group 41, the control unit 40 detects this to switch the audio signal processing unit 20 to the handsfree call mode. Subsequently, the control unit 40 supplies to the switch circuits 23 and 26 a switching control signal for switching these to the call side terminals T, and also outputs the above-mentioned attenuation control signal to the attenuating units 33L and 33R. Thus, the attenuating unit 33L attenuates an input audio signal thereof by −20 dB, and outputs this. Also, the attenuating unit 33R attenuates an input audio signal thereof by −10 dB, and outputs this.

A transmitter audio signal of spoken audio of the user 3 collected at the microphone 2 is supplied to the cellular telephone terminal 4 through the microphone amplifier 21, low-pass filter 22, switch circuit 23, and audio signal output terminal 24, and is transmitted to the call partner through a cellular telephone network. Also, a receiver audio signal from the call partner, received at the cellular telephone terminal 4 is input to the audio signal processing unit 20 through the audio signal input terminal 25.

The receiver audio signal input from the call partner is mixed with the audio signal of the left channel from the attenuating unit 33L at the mixing circuit 36, and is supplied to the speaker 1L through the potentiometer 34L for volume control and power amplifier 35L. Therefore, the receiver audio signal is mixed with the attenuated audio signal of the left channel, and is reproduced acoustically by the speaker 1L. Also, the audio signal of the right channel is attenuated to −10 dB, and is reproduced acoustically by the speaker 1R for the right channel.

Thus, in the handsfree call mode, the audio signals of the two channels from the music source unit 30 are attenuated by −20 dB and −10 dB at the attenuating units 33L and 33R respectively, thereby preventing call voice from becoming inaudible.

Therefore, in the handsfree call mode, while continuing listening of a music source to which the user is listening in the music source playing mode, a handsfree call with a call partner through the cellular telephone terminal 4 can be performed.

The speakers 1L and 1R are disposed in the vicinity of the user's ears, and accordingly, the original sound emission output volume (sound pressure) may be suppressed. According to a combination of this advantage and that the microphone 2 is disposed in the sound pressure zero region Zo of the speaker 1L, with the present embodiment, a handsfree call can be performed while preventing howling, and listening to a music source.

In a case where the user 3 has pressed the phone button 61 to transmit an outgoing call to the call partner from the cellular telephone terminal 4 to attempt to perform a handsfree call, upon the call partner responding to this, a handsfree call can be performed while listening to a music source such as described above.

Note that, with the present embodiment, response to an incoming call as to the cellular telephone terminal 4, and outgoing call operations are handled by allowing the user to perform incoming call response operations and outgoing call operations with the cellular telephone terminal 4, respectively.

However, in a case where the cellular telephone terminal 4 includes a connection terminal with a computer, there has been a handsfree kit which employs the connection terminal thereof to realize automatic incoming call/call-ending, and an outgoing call function to a registered partner with a single touch of a button. Therefore, this handsfree kit function is included in the control unit 40, whereby the control unit 40 can perform functions such as automatic incoming call/call-ending, and so forth, obviously.

Third Embodiment

Embodiment of Acoustic Reproducing Apparatus with Handsfree Call Function

With the above-described second embodiment, description has been made wherein the user employs the operating buttons of the operating button group 41 to perform control regarding each of sources such as the CD player 31C, HDD 31H, broadcast reception unit 31B, and so forth of the music source unit 30.

On the other hand, the present third embodiment is a case where a microphone for a handsfree call function is employed for collecting audio control words when performing selection control and volume control of each source by audio recognition. Note that, with the present embodiment, control by the operating buttons of the operating button group 41 can also be performed, and further, control by audio recognition can be performed.

Figure 10:
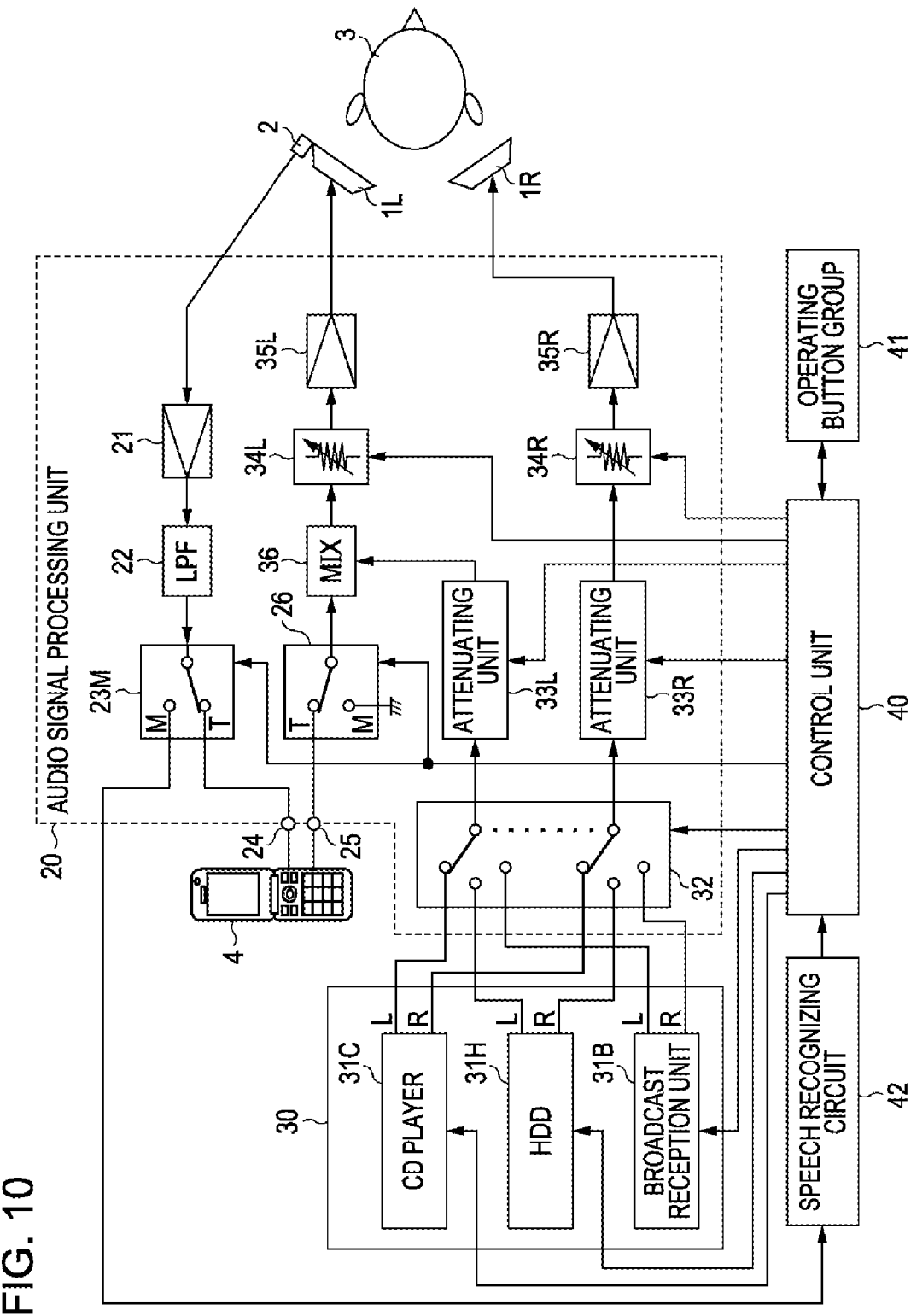
FIG. 10 is a block diagram illustrating a configuration example of an embodiment (third embodiment) of an acoustic reproducing apparatus with a handsfree call function according to the present invention.

FIG. 10 is a block diagram illustrating a configuration example of the third embodiment of the acoustic reproducing apparatus with a handsfree call function. In FIG. 10, the same components as those of the configuration example of the second embodiment in FIG. 7 are denoted with the same reference numerals, and description thereof will be omitted.

With the present third embodiment as well, as shown in FIG. 8, the speaker 1L for the left channel and the speaker 1R for the right channel are attached to both sides of the headrest portion 52 of the seat 51 where the user 3 sits. These speakers 1L and 1R for left and right channels have a bare speaker configuration. With regard to sound waves emitted from the speaker 1L for the left channel, the microphone 2 for collecting transmitter audio of the transmitter (user 3) is disposed in an arbitrary position of the sound pressure zero region Zo.

With the present embodiment as well, the microphone 2 is fixed to the outer circumferential frame portion of the diaphragm of the speaker 1L thereof, and the microphone 2 is disposed in the sound pressure zero region Zo.

With the present third embodiment, as shown in FIG. 10, an audio signal from the microphone 2 through the low-pass filter 22 is supplied to a switching terminal (input terminal) of a switch circuit 23M. Subsequently, with the present embodiment, the audio signal from the microphone 2 through the low-pass filter 22 is supplied from a call side terminal (output terminal) T of the switch circuit 23M to the transmitter audio input terminal of the cellular telephone terminal 4 through an audio signal output terminal 24.

Also, with the present embodiment, the audio signal from the microphone 2 through the low-pass filter 22 is supplied to a speech recognizing circuit 42 through a music playing side terminal (output terminal) M of the switch circuit 23M. The speech recognizing circuit 42 is configured so as to recognize a spoken word for source selection, such as "CD", "HDD", "broadcast", or the like, and a spoken word for control, such as "repeat", "change", "volume up", "volume down", or the like. Subsequently, audio recognition results at the speech recognizing circuit 42 are supplied to the control unit 40.

The control unit 40 performs control corresponding to the audio recognition results from the speech recognizing circuit 42. For example, when determining that the audio recognition results of a spoken word for source selection, such as "CD", "HDD", "broadcast", or the like, have been received from the speech recognizing circuit 42, the control unit 40 switches the source selecting circuit 32 so as to select the source selected with the spoken word thereof. For example, when determining that there has been spoken "CD", the control unit 40 switches the source selecting circuit 32 so as to select the CD player 31C.

Also, while "CD" and "HDD" are selected as sources, when determining that there has been spoken "repeat", the control unit 40 performs control so as to play the music content being played, again. Also, while "CD" and "HDD" are selected as sources, when determining that there has been spoken "change", the control unit 40 controls the CD player 31C or HDD 31H so as to change the music content being playing now to another music content. Also, while "broadcast reception unit" is selected as a source, when determining that there has been spoken "change", the control unit 40 controls the broadcast reception unit 31B so as to change a broadcast channel to be received from the current channel to another channel.

Also, when determining that there has been spoken "volume up" or "volume down", the control unit 40 controls the potentiometers 34L and 34R for volume control according to the recognized spoken word.

The other configurations and operations are the same as those in the above-described second embodiment. That is to say, the present embodiment has the same configuration as that of the second embodiment except that the audio signal from the microphone 2, obtained at the music playing side terminal (output terminal) M of the switch 23M is supplied to the speech recognizing circuit 42.

According to the above-described third embodiment, in addition to the advantages of the above-described second embodiment, the following advantages are provided.

Specifically, the microphone for transmitter audio collection of a handsfree call can also be employed as a microphone for collection of a spoken word for audio recognition employed for selection of a music source, and for control such as volume control or the like. According to audio recognition, control of selection of a music source, volume control, and so forth can be performed, and accordingly, if the present third embodiment is applied to, for example, an in-vehicle audio apparatus, handsfree is realized with not only a handsfree call but also music playing, thereby improving safety.

Note that it goes without saying that the present third embodiment can be applied to not only an in-vehicle audio apparatus but also, for example, an apparatus configured of speakers and microphone being attached to a headrest portion of a seat for living, as described above.

Fourth Embodiment

In-Vehicle Audio System

The present fourth embodiment has been arranged so as to perform a call between two acoustic reproducing apparatuses with a handsfree call function as appropriate while each user is enjoying playing of a music source. The embodiment described below is a case where an acoustic reproducing apparatus with a handsfree call function is provided to a driving seat and passenger seat as an in-vehicle audio system, for example.

Figure 11:
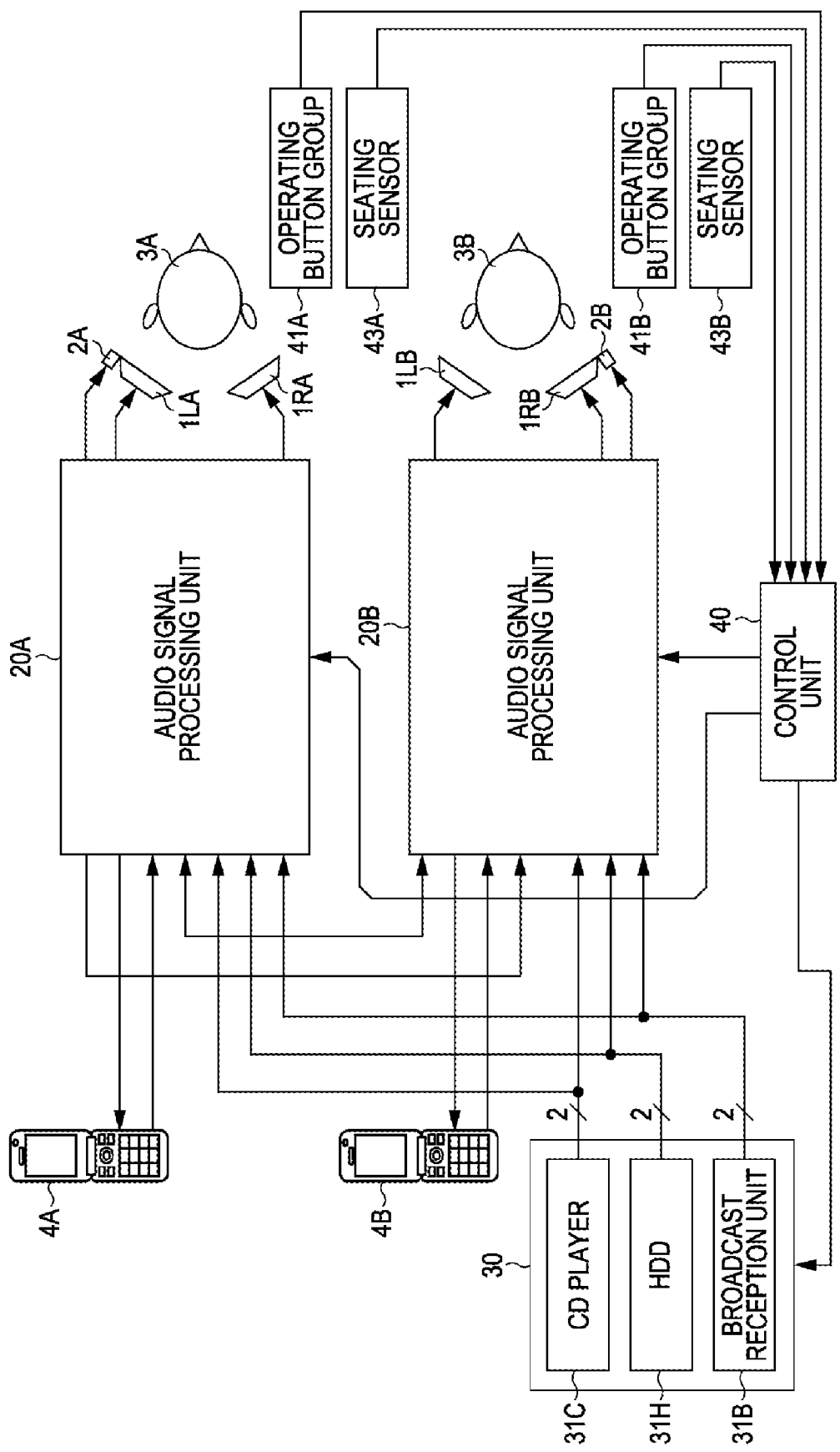
FIG. 11 is a block diagram illustrating a configuration example of an embodiment (fourth embodiment) of an acoustic reproducing apparatus with a handsfree call function according to the present invention.

FIG. 11 is a block diagram illustrating the whole configuration of the in-vehicle audio system according to the fourth embodiment. Note that the same components as those in the above-described embodiments are denoted with the same reference numerals. As shown in FIG. 11, with the present fourth embodiment, for example, a user 3B sits in the passenger seat, and a user 3A sits in the driving seat.

With the fourth embodiment, speakers 1LA and 1LB for the left channel are attached to the left side ends of headrest portions (not shown) of the seats where the users 3A and 3B sit, and speakers 1RA and 1RB for the right channel are attached to the right side ends of the headrest portions. The speakers 1LA, 1LB, 1RA, and 1RB for the left and right channels have a bare speaker configuration.

With the present fourth embodiment, with regard to the user 3A of the driving seat, a microphone 2A for collection of transmitter audio of the transmitter (user 3A) is disposed in an arbitrary position of the sound pressure zero region Zo regarding the emitted sound waves from the speaker 1LA for the left channel. Also, with regard to the user 3B of the passenger seat, a microphone 2B for collection of transmitter audio of the transmitter (user 3B) is disposed in an arbitrary position of the sound pressure zero region Zo regarding the emitted sound waves from the speaker 1RB for the right channel.

With the present embodiment as well, the microphones 2A and 2B are fixed to the outer circumferential frame portions of the diaphragms of the speakers 1LA and 1RB thereof serving as the sound pressure zero regions Zo, and the microphones 2A and 2B are disposed in the sound pressure zero regions Zo.

As described above, with the present embodiment, the microphone 2A is provided to the speaker 1LA side for the left channel as to the user 3A in the driving seat, and the microphone 2B is provided to the speaker 1RB side for the right channel as to the user 3B in the passenger seat.

Thus, the reason why the microphones 2A and 2B are disposed to the left and right so as to be separated respectively, is because the microphone 2A is prevented from collecting spoken audio of the user 3B as much as possible, and the microphone 2B is prevented from collecting spoken audio of the user 3A as much as possible.

With the present embodiment, an operating button group 41A is provided as to the user 3A, and an operating button group 41B is provided as to the user 3B. Operation signals corresponding to the operations of the users 3A and 3B as to the operating button groups 41A and 41B are supplied to the control unit 40. The control unit 40 determines which of the operating button groups 41A and 41B has been operated, and also which of the operating buttons has been pressed, and performs control according to the determination results.

An audio signal processing unit 20A is provided as to the user 3A, and an audio signal processing unit 20B is provided as to the user 3B, respectively. A cellular telephone terminal 4A can be connected to the audio signal processing unit 20A, and also a cellular telephone terminal 4B can be connected to the audio signal processing unit 20B. Further, the audio signals of the left and right two channels from each of the CD player 31C, HDD 31H, and broadcast reception unit 31B of the music source unit 30 are supplied to each of the audio signal processing units 20A and 20B.

The audio signal processing units 20A and 20B have basically the same configuration as the audio signal processing unit 20 according to the above-described second embodiment. Specifically, a configuration is employed wherein a music source from the music source unit 30 can be selected and reproduced, and also a telephone call (handsfree call) with an external call partner can be performed through the cellular telephone terminals 4A and 4B, and a cellular telephone network.

With the present fourth embodiment, the audio signal processing units 20A and 20B are configured such that a call between apparatuses can be performed between the users 3A and 3B by employing the speaker 1LA, microphone 2A, speaker 1RB, and microphone 2B. If we say that a call employing a cellular telephone terminal is an outer line call, this call between the apparatuses is a so-called extension call (conversation between users).

Further, with the present fourth embodiment, seats where the users 3A and 3B sit include seating sensors 43A and 43B for detecting that the users 3A and 3B sit, respectively. The seating detection outputs of the seating sensors 43A and 43B are supplied to the control unit 40.

The control unit 40 sets only the audio signal processing units 20A and/or 20B as to the users 3A and/or 3B of which the seating detection outputs from the seating sensors 43A and 43B are in a state showing seating, to an operable state. For example, the control unit 40 supplies power supply voltage to only the audio signal processing units 20A and/or 20B as to the users 3A and/or 3B of which the seating detection outputs from the seating sensors 43A and 43B are in a state showing seating, enables operation thereof, thereby realizing electrical power saving.

Figure 12:
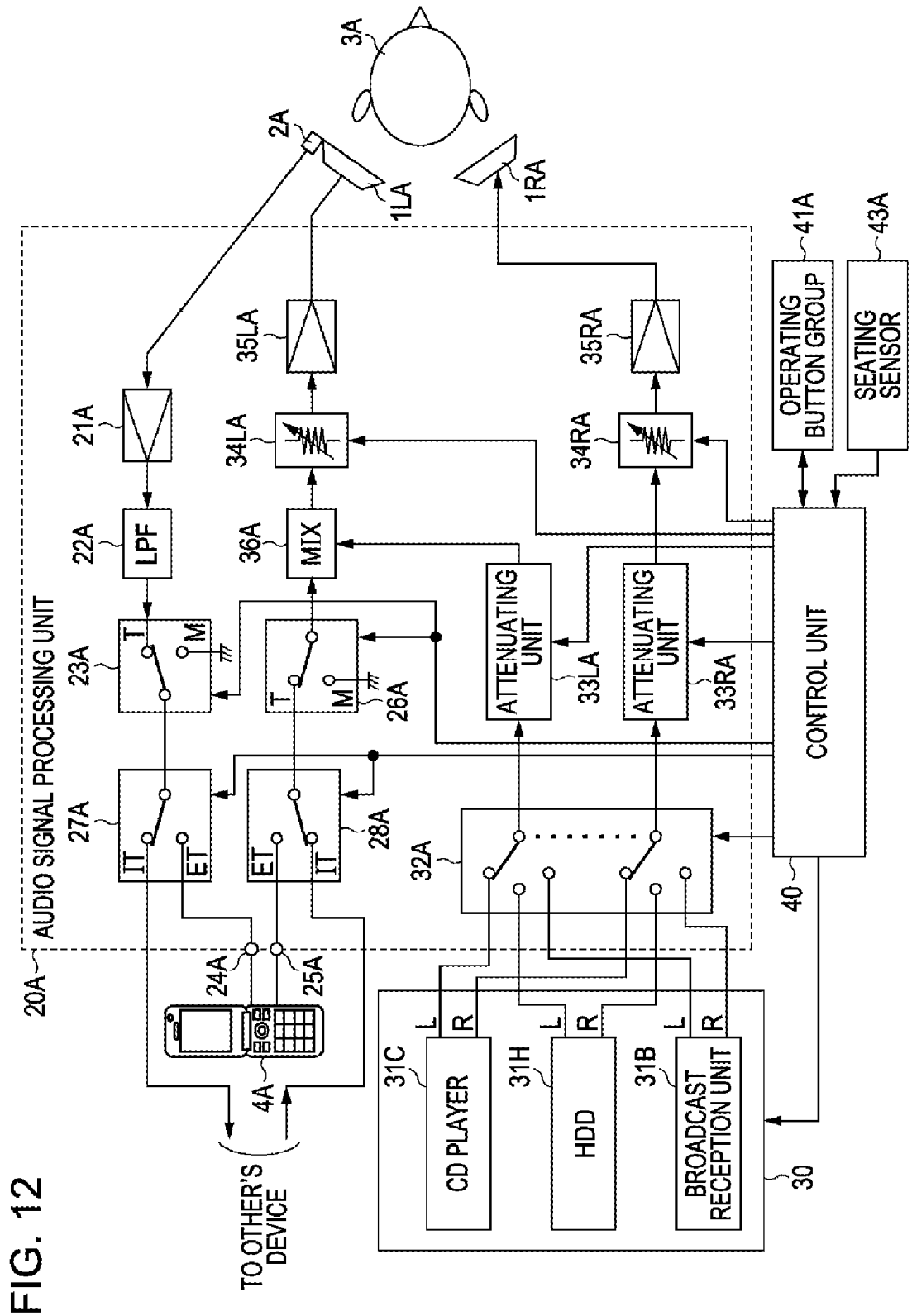
FIG. 12 is a block diagram illustrating a configuration example of an embodiment (fifth embodiment) of an acoustic reproducing apparatus with a handsfree call function according to the present invention.

The audio signal processing units 20A and 20B have the same configuration. FIG. 12 illustrates the configuration of the audio signal processing unit 20A as the representative of both processing units 20A and 20B. In FIG. 12, the same components as those in FIG. 7 are denoted with the same reference numerals to which a suffix A is added.

Figure 13:
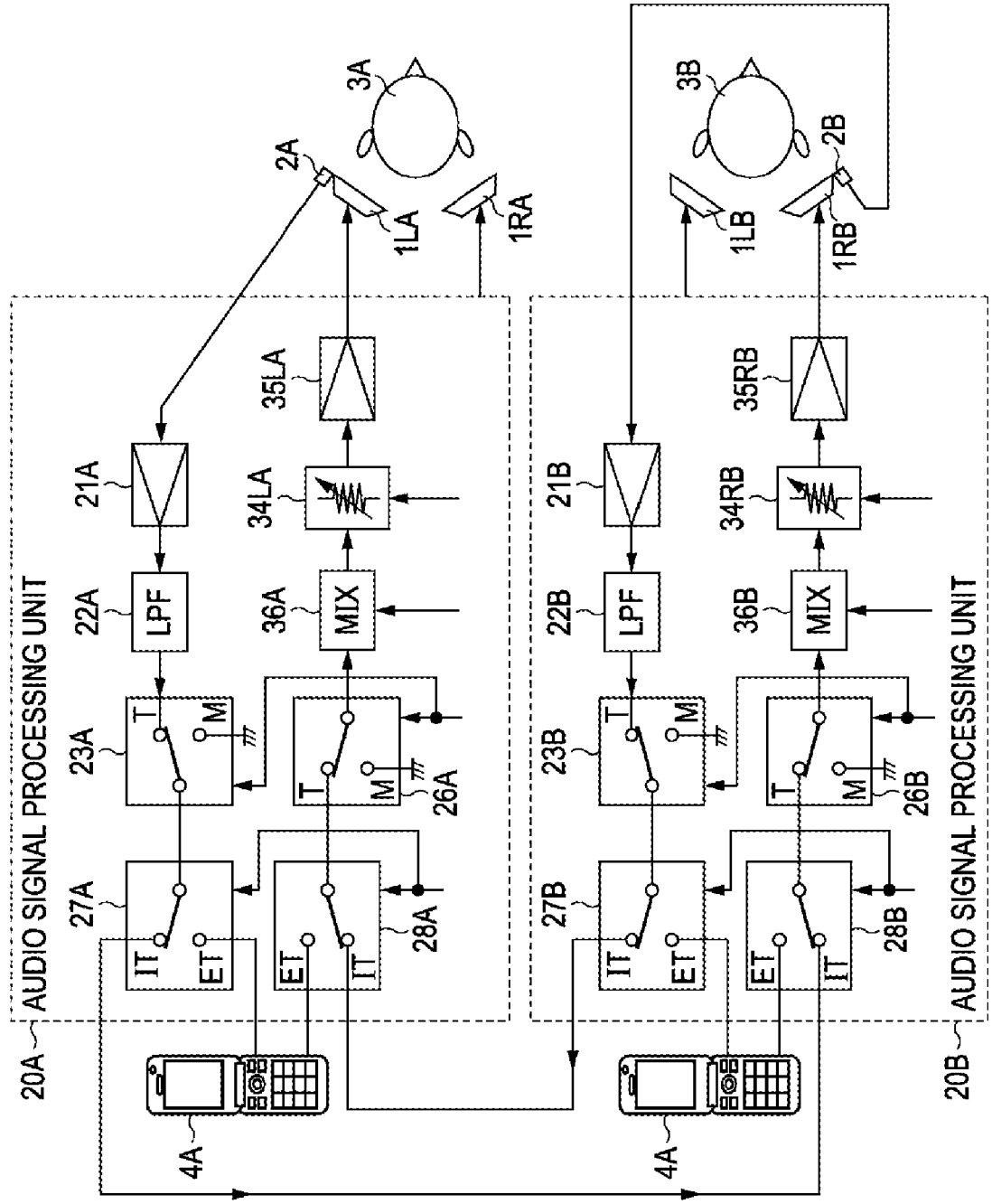
FIG. 13 is a diagram for describing a call between devices (extension call) according to the fifth embodiment of the present invention.

Also, FIG. 13 is a diagram extracting and illustrating only components for a handsfree call of the audio signal processing units 20A and 20B. In FIG. 13, the same components between the audio signal processing units 20A and 20B are denoted with the same reference numerals to which suffixes A and B are added.

Such as shown in FIG. 12, call voice that the user 3A vocalizes is collected by a microphone 2A and subjected to acousto-electric conversion to generate a call voice signal, and the call voice signal is input to the audio signal processing unit 20A.

With the audio signal processing unit 20A, the call voice signal from the microphone 2A is supplied to a low-pass filter 22A through a microphone amplifier 21A. Subsequently, the output audio signal of the low-pass filter 22A is supplied to a call side terminal (input terminal) T of a switch circuit 23A to be switched between at the time of a call and at the time of music source playing.

A music playing side terminal (input terminal) M of the switch circuit 23A is grounded with the present embodiment. A switching terminal (output terminal) of the switch circuit 23A is connected to a switching terminal (input terminal) of a switch circuit 27A to be switched between at the time of an outer line call through a cellular telephone terminal 4A and at the time of conversation (extension call) with another user 3B.

An outer line call side terminal (output terminal) ET of the switch circuit 27A is connected to a transmitter audio input terminal of the cellular telephone terminal 4A through an audio signal output terminal 24A with the present embodiment.

Also, the receiver audio signal from a call partner from a receiver audio output terminal of the cellular telephone terminal 4A is input to the audio signal processing unit 20A according to the present embodiment through an audio signal input terminal 25A. Subsequently, the receiver audio signal input through the audio signal input terminal 25A is supplied to an outer line call side terminal (input terminal) ET of a switch circuit 28A to be switched between at the time of an outer line call through the cellular telephone terminal 4A and at the time of conversation with the other user 3B (extension call).

With the present fourth embodiment, as shown in FIG. 13, an extension call side terminal (output terminal) IT of the switch circuit 27A is connected to an extension call side terminal (input terminal) IT of a switch circuit 28B of the audio signal processing unit 20B of the other user 3B. Also, an extension call side terminal (output terminal) IT of a switch circuit 27B of the audio signal processing unit 20B of the other user 3B is connected to an extension call side terminal (input terminal) IT of the switch circuit 28A of the audio signal processing unit 20A of the user 3A.

The audio signal obtained at a switching terminal (output terminal) of the switch circuit 28A is supplied to a call side terminal (input terminal) T of a switch circuit 26A. A music playing side terminal (input terminal) M of the switch circuit 26A is grounded with the present embodiment.

The audio signal obtained at a switching terminal (output terminal) of the switch circuit 26A is supplied to a mixing circuit 36A, and is added to the audio signal of the left channel supplied to the mixing circuit 36A through an attenuating unit 33LA.

Note that, in the case of the audio signal processing unit 20B regarding the user 3B, the audio signal obtained at an output terminal of the switch circuit 28B is supplied to a mixing circuit 36B with the audio signal of the right channel through a call side terminal T of a switch circuit 26B. Subsequently, the audio signal obtained at the output terminal of the switch circuit 28B is added to the audio signal of the right channel through an attenuating unit 33RB at the mixing circuit 36B.

Figure 14:
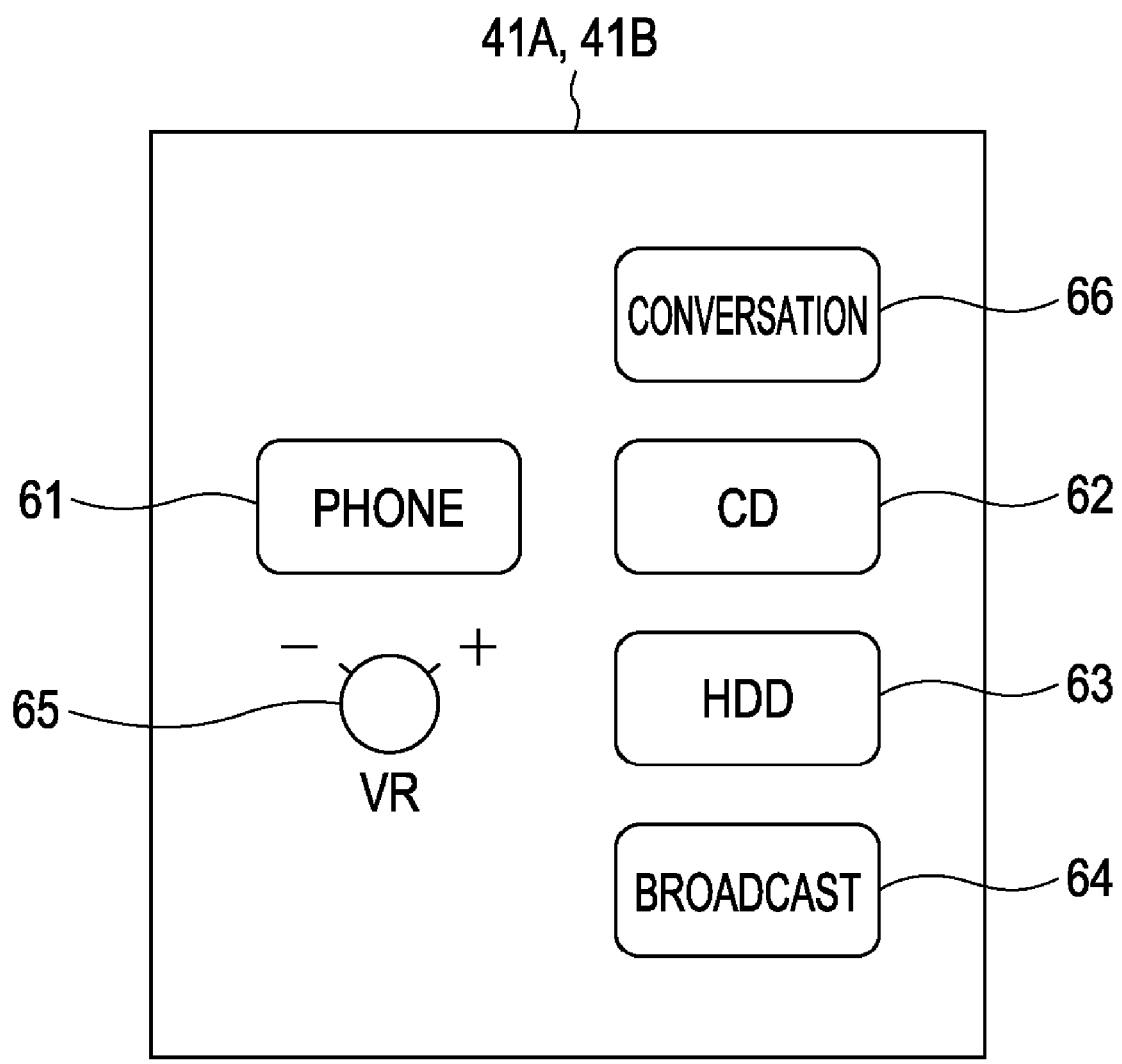
FIG. 14 is a diagram illustrating an example of an operating button group according to the fifth and ninth embodiments of the present invention.

With the present fourth embodiment, with regard to the operating button groups 41A and 41B, as shown in FIG. 14, a conversation button 66 is added to the configuration of the operating button group 41 shown in FIG. 9. Upon the conversation button 66 being pressed, the control unit 40 determines that an extension call request in the handsfree call mode has occurred, and performs control operation for enabling the extension call thereof.

Operation of Fourth Embodiment

Description will be made below regarding operation when one operating button of either the operating button group 41A or 41B is operated by the user 3A or 3B with the system according to the fourth embodiment thus configured.

The control unit 40 monitors the seating detection outputs from the seating sensors 43A and 43B to detect seating as to the seats of the users 3A and 3B. Subsequently, upon detecting seating of the user 3A, the control unit 40 powers the audio signal processing unit 20A to enable the operation thereof. Similarly, upon detecting seating of the user 3B, the control unit 40 powers the audio signal processing unit 20B to enable the operation thereof. Note that the present embodiment is an in-vehicle system, and accordingly, it goes without saying that this system is powered when an accessory switch is turned on with a key.

With the audio signal processing units 20A and 20B wherein seating of the users 3A and 3B is detected, and operation thereof is enabled by the control unit 40, the same operation as with the above-described first embodiment is performed except in a case where the conversation button 66 is pressed.

Specifically, in the music source playing mode wherein the phone button 61 has not been pressed, with the present embodiment, for example, with the audio signal processing unit 20A, the switch circuits 23A and 26A are connected to the music playing side terminal M by the control unit 40.

Subsequently, in the music source playing mode, as described above, under the control of the control unit 40, a source is selected according to pressing of the CD button 62, HDD button 63, broadcast button 64 or the like, and is subjected to two-channel stereo audio reproduction with two speakers. With the present embodiment, the users 3A and 3B can select and enjoy a different music source.

Upon the phone button 61 being pressed in the music source playing mode, the control unit 40 switches to the handsfree call mode. With the present embodiment, for example, in the case of the audio signal processing unit 20A, the control unit 40 switches the switch circuits 23A and 26A to the call side terminal T, and switches the switch circuits 27A and 28A to the outer line call side terminal ET. Also, the control unit 40 controls the attenuating unit 33LA to attenuate an input signal thereof by −20 dB, and controls the attenuating unit 33RA to attenuate an input signal thereof by −10 dB.

In the handsfree call mode, as described above, the transmitter audio from the microphone 2A is transmitted to a call partner, and also the receiver audio from the call partner is listened in with one channel. Thus, a handsfree call can be performed while continuing music playing.

Next, description will be made regarding operation when the conversation button 66 is operated. With the present embodiment, operations of the conversation button 66 at the operating button group 41A are an extension call request from the user 3A to the user 3B, and operations of the conversation button 66 at the operating button group 41B are an extension call request from the user 3B to the user 3A.

In a case where an extension call request has occurred, the control unit 40 determines whether or not the requested partner sits and the audio signal processing unit thereof is in an operable state, and in a case where the audio signal processing unit thereof is not in an operable state, the control unit 40 informs the effect thereof to the user who has requested the extension call request thereof. This notice is performed, for example, by the control unit 40 employing a method for mixing buzzer sound to the audio signal of a music source, or the like.

Next, when the audio signal processing unit of the partner whose extension call request has been performed is in an operable state, the control unit 40 performs control so as to obtain a state in which an extension call (conversation) with handsfree can be performed.

This control will be described with an example in a case where the user 3A has pressed the conversation button 66, for example. With the audio signal processing unit 20A, the control unit 40 first switches the switch circuits 23A and 26A to the call side terminal T, and also switches the switch circuits 27A and 28A to the extension call side terminal IT. Subsequently, with the audio signal processing unit 20B, the control unit 40 switches the switch circuits 23B and 26B to the call side terminal T, and also switches the switch circuits 27B and 28B to the extension call side terminal IT. FIG. 13 illustrates the switched state of the switch circuits 23A, 26A, 27A, 28A, 23B, 26B, 27B, and 28B at this time.

Also, the control unit 40 controls the attenuation amounts of the attenuating unit 33LA of the audio signal processing unit 20A, and the attenuating unit 33RB of the audio signal processing unit 20B so as to be set to −20 dB. Also, the control unit 40 controls the attenuation amounts of the attenuating unit 33RA of the audio signal processing unit 20A, and the attenuating unit 33LB of the audio signal processing unit 20B so as to be set to −10 dB.

According to switching of the above-mentioned switch circuits, the transmitter audio signal of the user 3A collected at the microphone 2A is supplied to the audio signal processing unit 20B of the partner through a route of the microphone amplifier 21A→low-pass filter 22A→switch circuit 23A→switch circuit 27A.

Subsequently, with the audio signal processing unit 20B, the audio signal from the audio signal processing unit 20A is supplied to the speaker 1RB through a route of the switch circuit 28B→switch circuit 26B→mixing circuit 36B→potentiometer 34RB for volume control→power amplifier 35RB, and is reproduced acoustically.

Thus, the transmitter audio from the user 3A is reproduced at the speaker 1RB in the vicinity of the ear of the user 3B along with the audio signal of an attenuated music source.

Also, the transmitter audio signal of the user 3B collected at the microphone 2B is supplied to the audio signal processing unit 20A of the partner through a route of the microphone amplifier 21B→low-pass filter 22B→switch circuit 23B→switch circuit 27B.

Subsequently, with the audio signal processing unit 20A, the audio signal from the audio signal processing unit 20B is supplied to the speaker 1LA through a route of the switch circuit 28A→switch circuit 26A→mixing circuit 36A→potentiometer 34LA for volume control→power amplifier 35LA, and is reproduced acoustically.

Thus, the transmitter audio from the user 3B is reproduced at the speaker 1LA in the vicinity of the ear of the user 3A along with the audio signal of an attenuated music source.

According to the above, conversation similar to an extension call between the users 3A and 3B can be performed with handsfree. In this case, with the present embodiment, the microphones 2A and 2B are disposed on the left ear side of the user 3A, and on the right ear side of the user 3B such that both are separated distantly, and accordingly, the preventive effect of howling is high.

Fifth Embodiment

In-Vehicle Audio System

The fifth embodiment is a developed type of the fourth embodiment. The fourth embodiment is the case where the acoustic reproducing apparatus with a handsfree call function according to the present invention has been applied to the driving seat and passenger seat. The fifth embodiment assumes a sedan-typed four-person riding vehicle, wherein the acoustic reproducing apparatus with a handsfree call function according to the present invention is applied to not only the driving seat and passenger seat but also two seat sheets in the back row.

Figure 15:
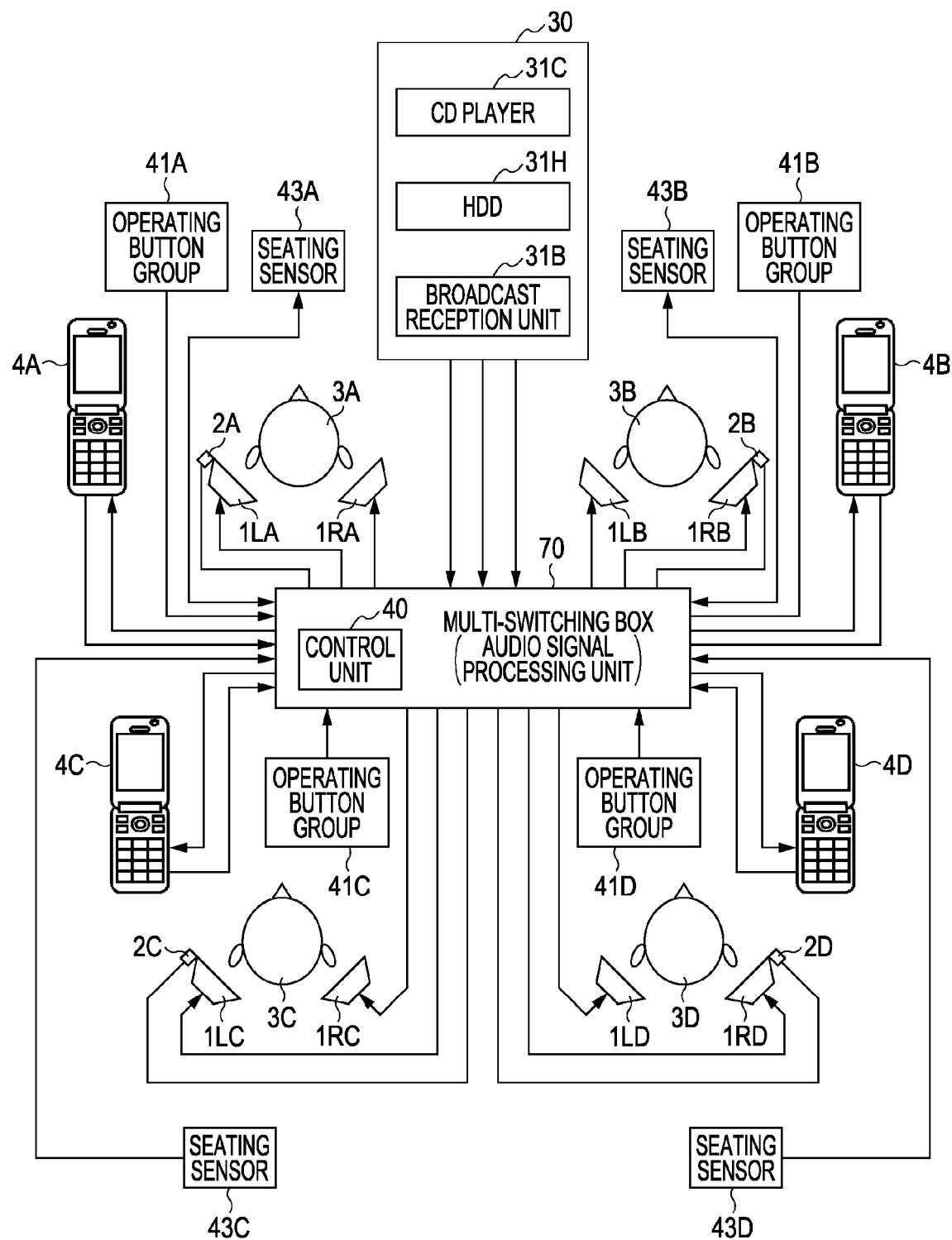
FIG. 15 is a block diagram illustrating a configuration example of an embodiment (sixth embodiment) of an acoustic reproducing apparatus with a handsfree call function according to the present invention.

FIG. 15 is a block diagram illustrating a configuration example of the in-vehicle audio system according to the fifth embodiment. Note that, in FIG. 15, the same components as the components of the above-described fourth embodiment are denoted with the same reference numerals.

In FIG. 15, assumption is made that the user 3A sits in the driving seat, the user 3B sits in the passenger seat, the user 3C sits in the seat behind the driving seat, and the user 3D sits in the seat behind the passenger seat. Left-channel speakers 1LA, 1LB, 1LC, and 1LD are attached to the left sides of the headrest portions of the seats where the users 3A, 3B, 3C, and 3D sit (not shown). Also, right-channel speakers 1RA, 1RB, 1RC, and 1RD are attached to the right sides of the headrest portions of the seats where the users 3A, 3B, 3C, and 3D sit. These left and right channel speakers 1LA, 1LB, 1LC, 1LD, and 1RA, 1RB, 1RC, 1RD have a bare speaker configuration.

With the present embodiment, the microphone 2A for collection of transmitter audio of the transmitter (user 3A) is disposed in an arbitrary position of the sound pressure zero region Zo regarding the sound waves emitted from the speaker 1LA for the left channel as to the user 3A of the driving seat. Similarly, the microphone 2C for collection of transmitter audio of the transmitter (user 3C) is disposed in an arbitrary position of the sound pressure zero region Zo regarding the sound waves emitted from the speaker 1LC for the left channel as to the user 3C of the seat behind the driving seat.

Also, the microphone 2B for collection of transmitter audio of the transmitter (user 3B) is disposed in an arbitrary position of the sound pressure zero region Zo regarding the sound waves emitted from the speaker 1RB for the right channel as to the user 3B of the passenger seat. Similarly, the microphone 2D for collection of transmitter audio of the transmitter (user 3D) is disposed in an arbitrary position of the sound pressure zero region Zo regarding the sound waves emitted from the speaker 1RD for the right channel as to the user 3D of the seat behind the passenger seat.

With the present embodiment as well, the microphones 2A, 2C, 2B, and 2D are fixed to the outer circumferential frame portions of the diaphragms of the speakers 1LA, 1LC, 1RB, and 1RD thereof serving as the sound pressure zero regions Zo, and the microphones 2A through 2D are disposed in the sound pressure zero regions Zo.

As described above, the reason why the microphones 2A and 2B, or microphones 2C and 2D are disposed so as to be divided into the left and right channels is to prevent collection of the spoken audio of the adjacent users seated horizontally as much as possible, as described above. Thus, the preventive effect of howling can be improved in combination with the disposed positions of the microphones 2A through 2D.

With the present embodiment, an arrangement is made wherein each of the users of the four seats can enjoy individual music sources, perform calls with external partners through cellular telephone networks, and further perform conversation with one or more of the four seats (extension call).

Figure 16:
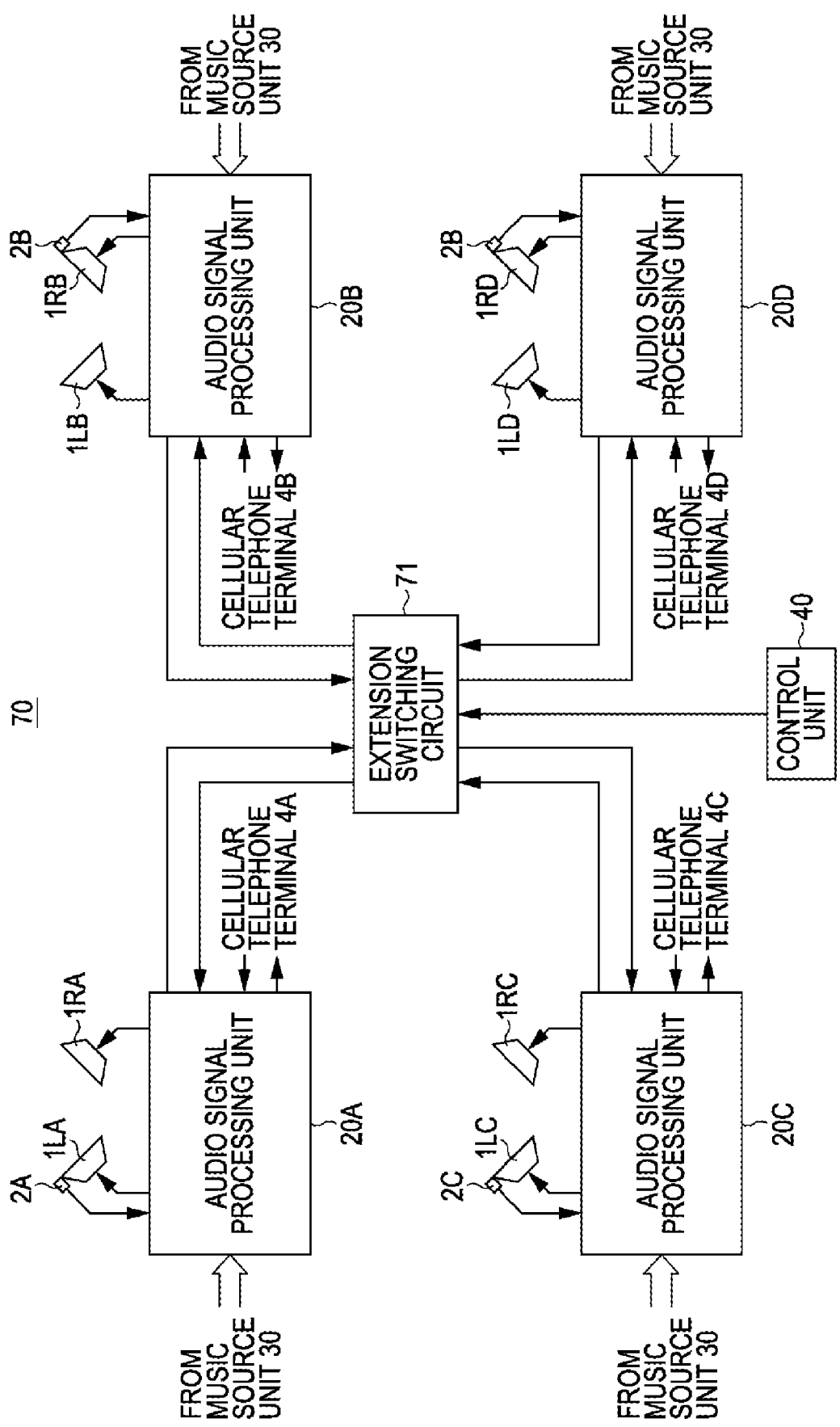
FIG. 16 is a diagram for describing a call between devices (extension call) according to the sixth embodiment of the present invention.

A multi-switching box 70 is provided therefore, and as shown in FIG. 16, includes the above-mentioned control unit 40, and also includes audio signal processing units 20A, 20B, 20C, and 20D as to the users 3A, 3B, 3C, and 3D in the seats, respectively. Further, the multi-switching box 70 includes an extension switching circuit 71.

As shown in FIG. 16, cellular telephone terminals 4A, 4B, 4C, and 4D for performing a call with an external partner through a cellular telephone network can be connected to the audio signal processing units 20A, 20B, 20C, and 20D, respectively.

Also, the audio input/output signal for an extension call from each of the audio signal processing units 20A, 20B, 20C, and 20D (e.g., signals obtained at the extension call side terminals IT of the switch circuits 27A and 28A in FIG. 12) is all supplied to the extension switching circuit 71.

The extension switching circuit 71 switches an extension call path according to the control signal from the control unit 40.

As shown in FIG. 15, operating button groups 41A, 41B, 41C, and 41D are provided to the users 3A, 3B, 3C, and 3D in the seats, respectively. Operation signals from the operating button groups 41A, 41B, 41C, and 41D are supplied to the control unit 40 included in the multi-switching box 70.

The control unit 40 determines which of the operating button groups 41A, 41B, 41C, and 41D has been operated, and further determines which of the operating buttons of the determined operating button groups has been operated. Subsequently, the control unit 40 executes control according to the determination results thereof.

Figure 17:
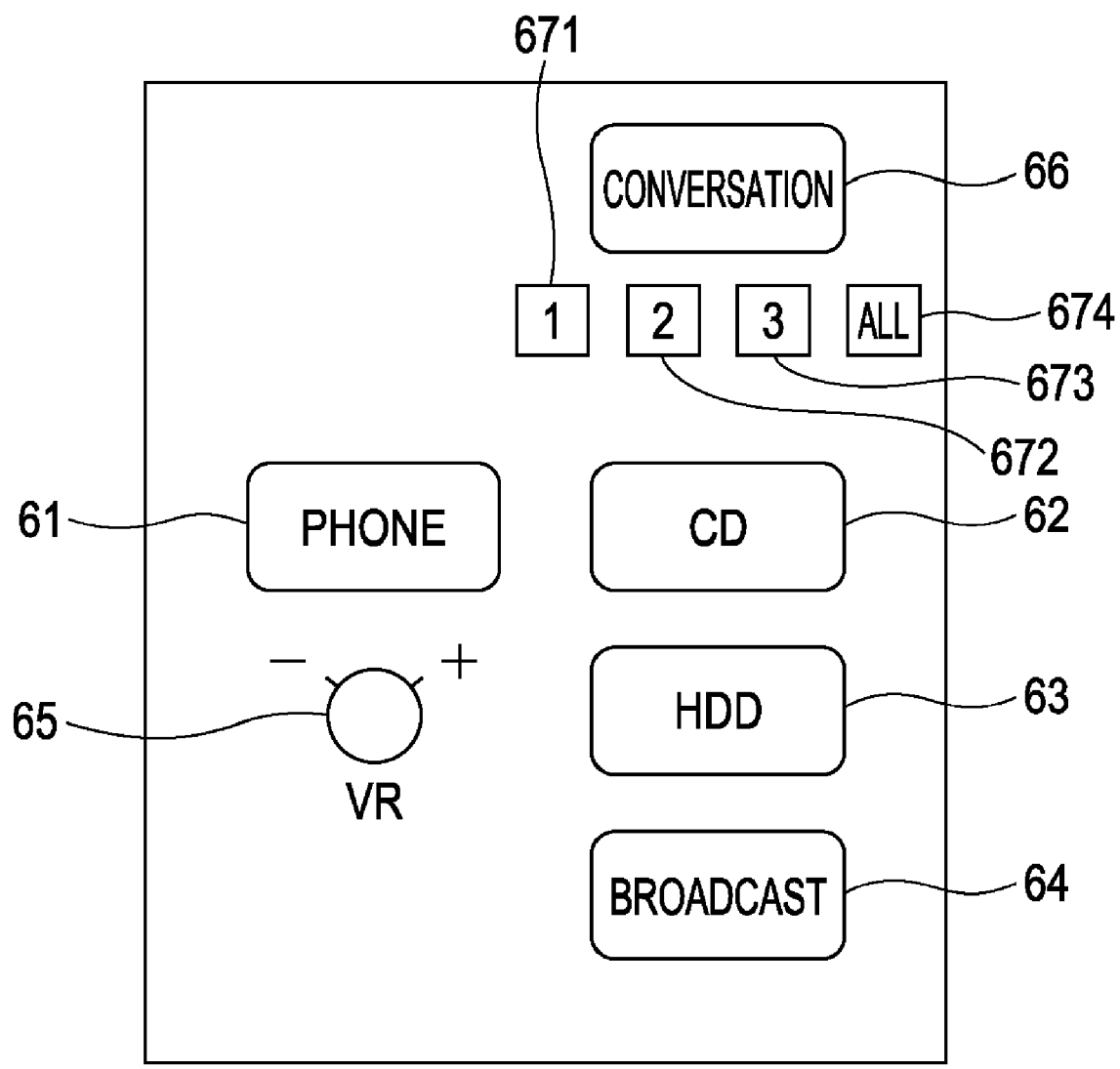
FIG. 17 is a diagram illustrating an example of an operating button group according to the sixth and tenth embodiments of the present invention.

With the present embodiment, each of the operating button groups 41A, 41B, 41C, and 41D includes operating buttons such as shown in FIG. 17. Specifically, similar to the above-described fourth embodiment, each of the operating button groups 41A, 41B, 41C, and 41D includes a phone button 61, CD button 62, HDD button 63, broadcast button 64, volume control knob 65, and conversation button 66. With the present fifth embodiment, there are provided further four partner specifying buttons 671, 672, 673, and 674 for specifying one more of the other three seats serving as conversation targets, correlated with the conversation button 66.

Note that, of the four partner specifying buttons, the three partner specifying buttons 671, 672, and 673 are set beforehand so as to specify a different another seat for each seat. The remaining one partner specifying button 674 of the four partner specifying buttons is an operating button for specifying all of the other three seats as partners.

Also, seating sensors 43A, 43B, 43C, and 43D are provided to the seats of the users 3A, 3B, 3C, and 3D, respectively. Seating detection outputs of the seating sensors 43A, 43B, 43C, and 43D are supplied to the control unit 40 of the multi-switching box 70. The control unit 40 performs control so as to power only the audio signal processing unit corresponding to the seat where a user sits, of the audio signal processing units 20A, 20B, 20C, and 20D, based on the seating detection outputs of the seating sensors 43A, 43B, 43C, and 43D, to enable the operation thereof.

The audio signal processing units 20A, 20B, 20C, and 20D include music source selecting units 32A, 32B, 32C, and 32D (not shown), respectively. Thus, the users 3A, 3B, 3C, and 3D can each play and enjoy a music source selected by themselves with the operating button groups 41A, 41B, 41C, and 41D, respectively.

Specifically, for example, upon the user 3A pressing the CD button 62 of the operating button group 41A, the control unit 40 detects this, and controls the music source selecting unit 32A of the audio signal processing unit 20A to select the audio signals of the two channels from the CD player 31C. Also, for example, upon the user 3B pressing the HDD button 63 of the operating button group 41B, the control unit 40 detects this, and controls the music source selecting unit 32B of the audio signal processing unit 20B to select the audio signals of the two channels from the HDD 31H. This is true for the selection button operations of the other users.

Also, the users 3A, 3B, 3C, and 3D can each perform a call with a partner through a cellular telephone network through the dedicated cellular telephone terminals 4A, 4B, 4C, and 4D to be connected to the audio signal processing units 20A, 20B, 20C, and 20D by pressing the phone button 61, respectively. The operations at this time have been already described with the fourth embodiment, and accordingly, description thereof will be omitted.

With the present fifth embodiment, while pressing the conversation button 66, upon pressing one of the partner specifying buttons 671, 672, and 673, conversation (extension call) with the partner of the seat specified with the pressed partner specifying button thereof can be performed.

For example, let us say that, after pressing the conversation button 66 at the operating button group 41A, the user 3A has pressed the partner specifying button 671 which has been set so as to specify the user 3B. In this case, the control unit 40 detects button pressing operations at the operating button group 41A by the user 3A thereof, and controls the extension switching circuit 71 (see FIG. 16) to connect the extension call paths of the audio signal processing units 20A and 20B. Thus, conversation can be performed between the users 3A and 3B.

Also, for example, let us say that, after pressing the conversation button 66 at the operating button group 41A, the user 3A has pressed the partner specifying button 671 which has been set so as to specify the user 3B, and the partner specifying button 672 which has been set so as to specify the user 3C. In this case, the control unit 40 detects button pressing operations at the operating button group 41A by the user 3A thereof, and controls the extension switching circuit 71 to connect the extension call paths by the three of the audio signal processing units 20A, 20B, and 20C. Thus, conversation can be performed between the users 3A, 3B, and 3C.

Also, for example, let us say that, after pressing the conversation button 66 at the operating button group 41A, the user 3A has pressed the partner specifying button 674 which has been set so as to specify all of the other users. In this case, the control unit 40 detects button pressing operations at the operating button group 41A by the user 3A, and controls the extension switching circuit 71 to connect the extension call paths by all of the audio signal processing units 20A, 20B, 20C, and 20D. Thus, conversation can be performed between all of the users 3A, 3B, 3C, and 3D.

Note that, in this case as well, as described above, a conversation request (extension call request) as to an user not seated is determined to be invalid based on the seating detection outputs of the seating sensors 43A, 43B, 43C, and 43D. Subsequently, the effect thereof is informed to the user who has requested conversation by warning buzzer sound or the like, as described above. However, an arrangement may be made wherein when requesting conversation with multiple persons, in a case where a part of the seat users is not in a seated state, conversation with the seated users is enabled, and buzzer sound informing that there is a user not seated is omitted.

With the above-described fifth embodiment as well, it goes without saying that an advantage can be obtained completely in the same way as with the above-described embodiments wherein a call with an external partner through a cellular telephone terminal, and an extension call (conversation) can be performed with howling being prevented while playing music.

Sixth Embodiment

The present sixth embodiment is an example in a case where a microphone for a handsfree call is also employed as a microphone for collecting noise to reduce ambient external noise. Specifically, the microphone 2, which is employed for transmitter audio collection at the time of the handsfree call mode, is also employed as a microphone for collecting ambient external noise at the time of the music source playing mode.

Figure 18:
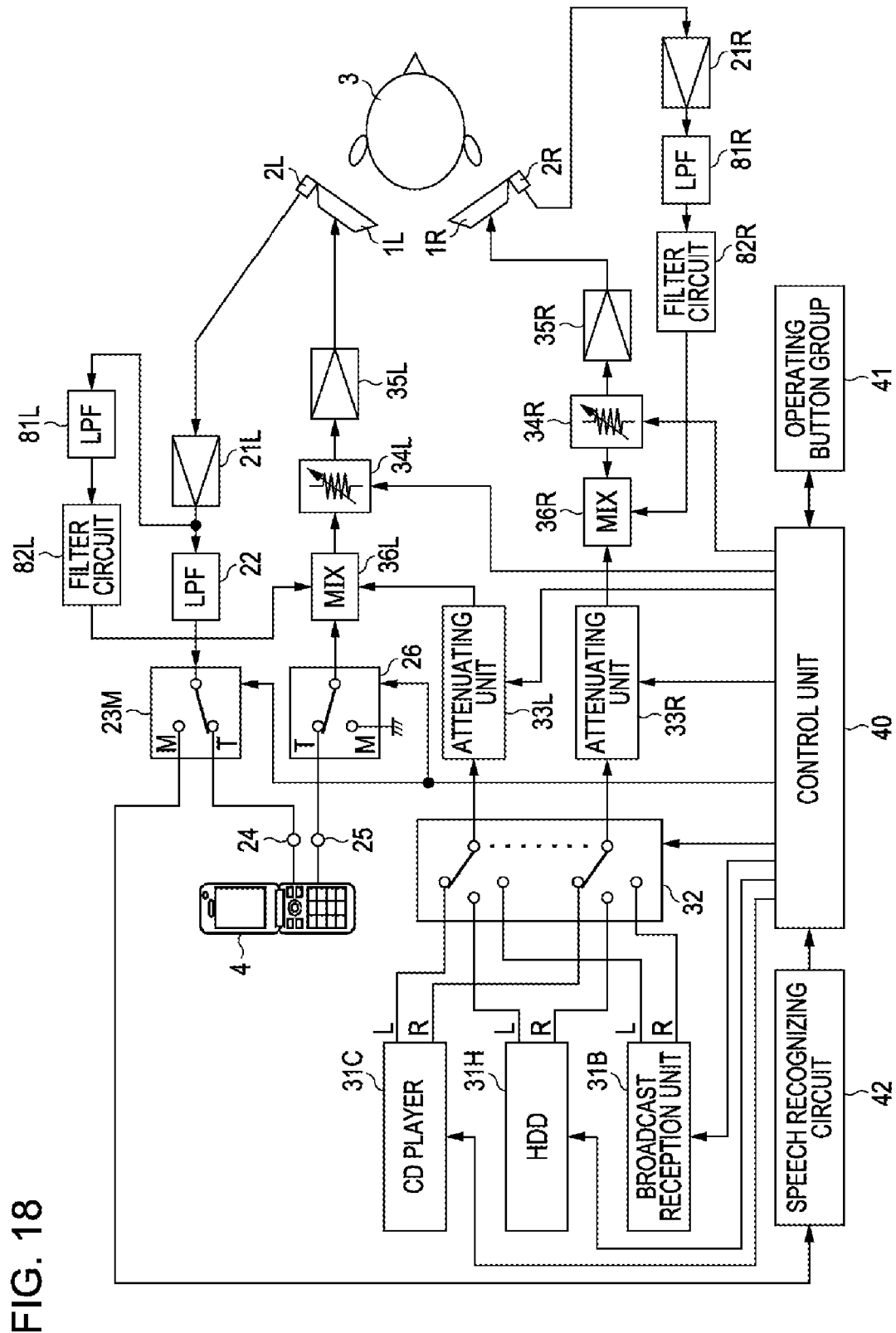
FIG. 18 is a block diagram illustrating a configuration example of yet another embodiment of an acoustic reproducing apparatus with a handsfree call function according to the present invention.

FIG. 18 is a block diagram of a configuration example of an acoustic reproducing apparatus with a handsfree call function according to the present sixth embodiment. The example in FIG. 18 is a case where the present sixth embodiment has been applied to the configuration of the third embodiment shown in FIG. 10, and the same components as those in FIG. 10 will be denoted with the same reference numerals.

As shown in FIG. 18, with the present embodiment, a speaker 1L for the left channel is a speaker for reproduction of a receiver audio signal in the handsfree call mode. Subsequently, a microphone 2L is provided in a sound pressure zero region as to the audio emitted from the speaker 1L for the left channel, and this microphone 2L is a microphone for collection of a transmitter audio signal in the handsfree call mode.

The transmitter audio signal collected at the microphone 2 is supplied to a switching terminal (input terminal) of a switch circuit 23M through a microphone amplifier 21L and low-pass filter 22. Subsequently, with the present embodiment, the audio signal from the microphone 2L through the low-pass filter 22 is supplied from a call side terminal (output terminal) T of the switch circuit 23M to the transmitter audio input terminal of the cellular telephone terminal 4 through an audio signal output terminal 24.

Also, with the present embodiment, the audio signal from the microphone 2L through the low-pass filter 22 is supplied to the speech recognizing circuit 42 through a music playing side terminal (output terminal) M of the switch circuit 23M.

Also, with the present embodiment, the microphone 2L is employed as a microphone for collecting ambient noise as to the audio signal of the left channel in the music source playing mode. With the present embodiment, as to a speaker 1R for the right channel as well, a microphone 2R is provided in a sound pressure zero region as to the emitted audio thereof. The microphone 2R is employed as a microphone for collecting ambient noise as to the audio signal of the right channel in the music source playing mode.

External noise derived from an ambient noise source of the user 3, e.g., diamond noise, or engine noise is collected by the microphones 2L and 2R. The audio signals of external noise subjected to acousto-electric conversion and obtained at the microphones 2L and 2R are supplied to low-pass filters 81L and 81R through microphone amplifiers 21L and 21R.

Subsequently, the output audio signals of the low-pass filters 81L and 81R are supplied to filter circuits 82L and 82R for noise reduction respectively, thereby generating noise reduced audio signals. The noise reduced audio signal from the filter circuit 82L is supplied to a mixing circuit 36L, and is supplied to the speaker 1L through the potentiometer 34L for volume control, and power amplifier 35L.

Also, with regard to the right channel, with the present embodiment, a mixing circuit 36R is provided between an attenuating unit 33R and potentiometer 34R for volume control. The noise reduced audio signal from the filter circuit 82R is supplied to the mixing circuit 36R, and is supplied to the speaker 1R through the potentiometer 34R for volume control and a power amplifier 35R.

The low-pass filters 81L and 81R are provided based on the following reason. That is to say, as described above, of sounds emitted from the front and back of the diaphragm of the bare speaker 1, particularly with regard to low frequencies, the cancellation effect of the sounds emitted from the front and back of the diaphragm is great. The middle through high frequency components of the sounds emitted from the front and back of the diaphragm of the bare speaker 1 become greatly attenuated components in the sound pressure zero region Zo, but do not become zero completely.

Therefore, with the present embodiment, in order to enable noise to be reduced in a more sure manner, a noise reduction target is restricted to low-frequency components alone by the low-pass filters 81L and 81R whereby the noise thereof is canceled out almost completely at the time of being disposed in the above-mentioned sound pressure zero region Zo, and the sound pressure thereof becomes zero. Thus, noise reduction can be performed in a stable manner without howling. The cut-off frequency at the low-pass filters 81L and 81R is, for example, a frequency at or below 300 Hz, and is set to 300 Hz in this example.

The filter circuits 82L and 82R are basically for subjecting the audio signal of external noise to phase inversion to generate a noise reduced audio signal. Also, the filter circuits 82L and 82R perform correction while considering a space transfer function between an external noise sound source position and the listening position of the user 3 to be subjected to noise cancellation (noise cancel point), and correction of the properties of a microphone amplifier and power amplifier. With the present example, the filter circuits 82L and 82R are configured of a digital filter.

Specifically, while omitted from the drawings, the filter circuits 82L and 82R include A/D conversion circuits for converting the analog audio signals from the low-pass filters 81L and 81R into digital audio signals, respectively. Each of the filter circuits 82L and 82R includes a digital filter configured of, for example, an FIR (Finite Impulse Response) filter which receives the digital audio signal from the A/D conversion circuits. Further, each of the filter circuits 82L and 82R includes a D/A conversion circuit for converting the digital audio signal processed at the digital filter into an analog audio signal.

Values for subjecting an input audio signal to phase inversion, and for correcting the above-mentioned space transfer function, and the properties of the microphone amplifiers 21L and 21R, and power amplifiers 35L and 35R are supplied as the filter coefficients of the digital filters of the filter circuits 82L and 82R.

Note that, with the present embodiment, as described above, a noise reduction target has been restricted to low-frequency components, but this low-frequency audio region is a region where humans do not have sense of direction, and accordingly, correction by the space transfer function by the above-mentioned filter circuits 82L and 82R may be omitted. Therefore, an arrangement may be made wherein only a phase inversion circuit is provided, and the filter circuits 82L and 82R in FIG. 18 are not provided. However, in the case of considering that correction is performed regarding the properties of the microphone amplifiers 21L and 21R, and the power amplifiers 35L and 35R described above, it is desirable to provide the filter circuits 82L and 82R within a correction range thereof.

According to the above-described configuration, noise reduced sounds are emitted from the speakers 1L and 1R. Here, a noise reduced audio signal is a signal obtained by subjecting the audio signal of external noise to phase inversion, and accordingly, noise reduced sound becomes sound having the reversed phase of external noise Nz. Accordingly, external noise, and noise reduced sound having the reversed phase of the external noise thereof are combined around the ear of the user 3, and consequently, sound is provided wherein external noise is reduced or canceled out.

Figure 19:
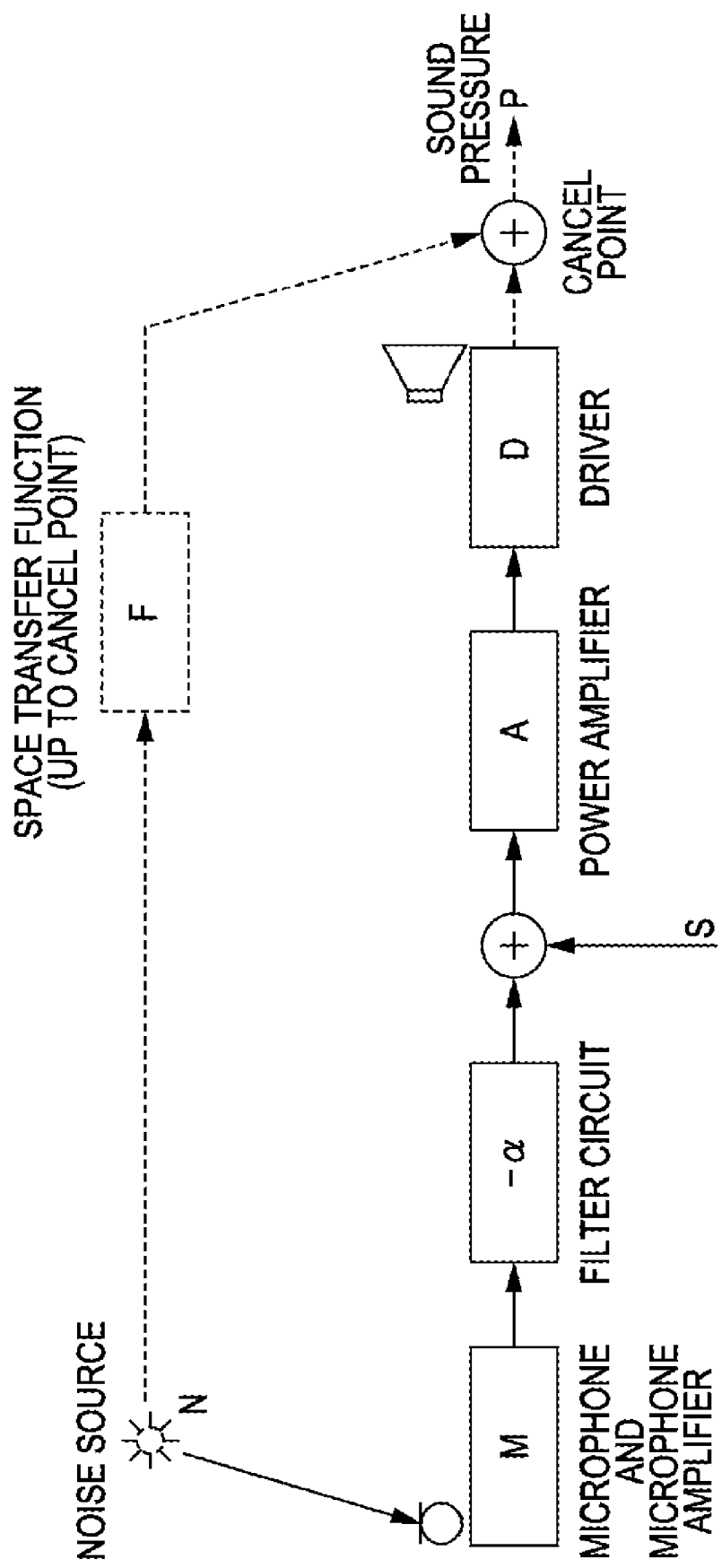
FIG. 19 is a diagram employed for describing principal components of the acoustic reproducing apparatus with a handsfree call function according to the embodiment in FIG. 18.

The noise reducing apparatus having the configuration in FIG. 18 is a noise reducing apparatus according to a so-called feed-forward method. Description will be made regarding the noise reduction operation of the noise reducing apparatus according to the feed-forward method by employing a transfer function with reference to FIG. 19. FIG. 19 is a block diagram corresponds to the blocks of the noise reducing processing system shown in FIG. 18, and represents each unit by employing the transfer function thereof.

In FIG. 19, A denotes the transfer function of the power amplifiers 35L or 35R, D denotes the transfer function of the speaker 1L or 1R serving as a driver, and M denotes the transfer function corresponding to the portion of the microphones 2L and 2R and microphone amplifier 21L or 21R. Also, $-\alpha$ denotes the transfer function of the filter designed for noise reduction of the feed-forward method, and includes the worth of phase inversion. Also, F denotes the space transfer function from the position of external noise source to the position of the cancel point around a listener's ear.

When representing such as shown in FIG. 19, sound pressure P at the cancel point around the ear of the user 3 ear with the noise reducing apparatus having the block configuration in FIG. 18 is represented as follows when assuming that the transfer function of noise is N.

$$P = -ADM\alpha N + FN + ADS \quad \text{(Expression 1)}$$

Now, if we say that the space transfer function F is represented as $$F \cong ADM\alpha \quad \text{(Expression 2)},$$

i.e., the transfer function $-\alpha$ of the filter circuit 13 is designed so as to satisfy (Expression 2), the above (Expression 1) is represented as follows.

$$P \cong ADS \quad \text{(Expression 3)}$$

Accordingly, the sound pressure P at the cancel point becomes sound pressure wherein noise is canceled, and there is a music source S alone. In (Expression 3), if we say that the music source S=0, i.e., there is no music source, P≅0 holds, which means that the sound pressure P at the cancel point is sound pressure wherein noise is canceled and eliminated.

Other operations other than noise cancel operation are the same as those in the above-described third embodiment, and operation effects such as described above are obtained.

Seventh Embodiment

Hardware Configuration Example of Seventh Embodiment

Figure 20:
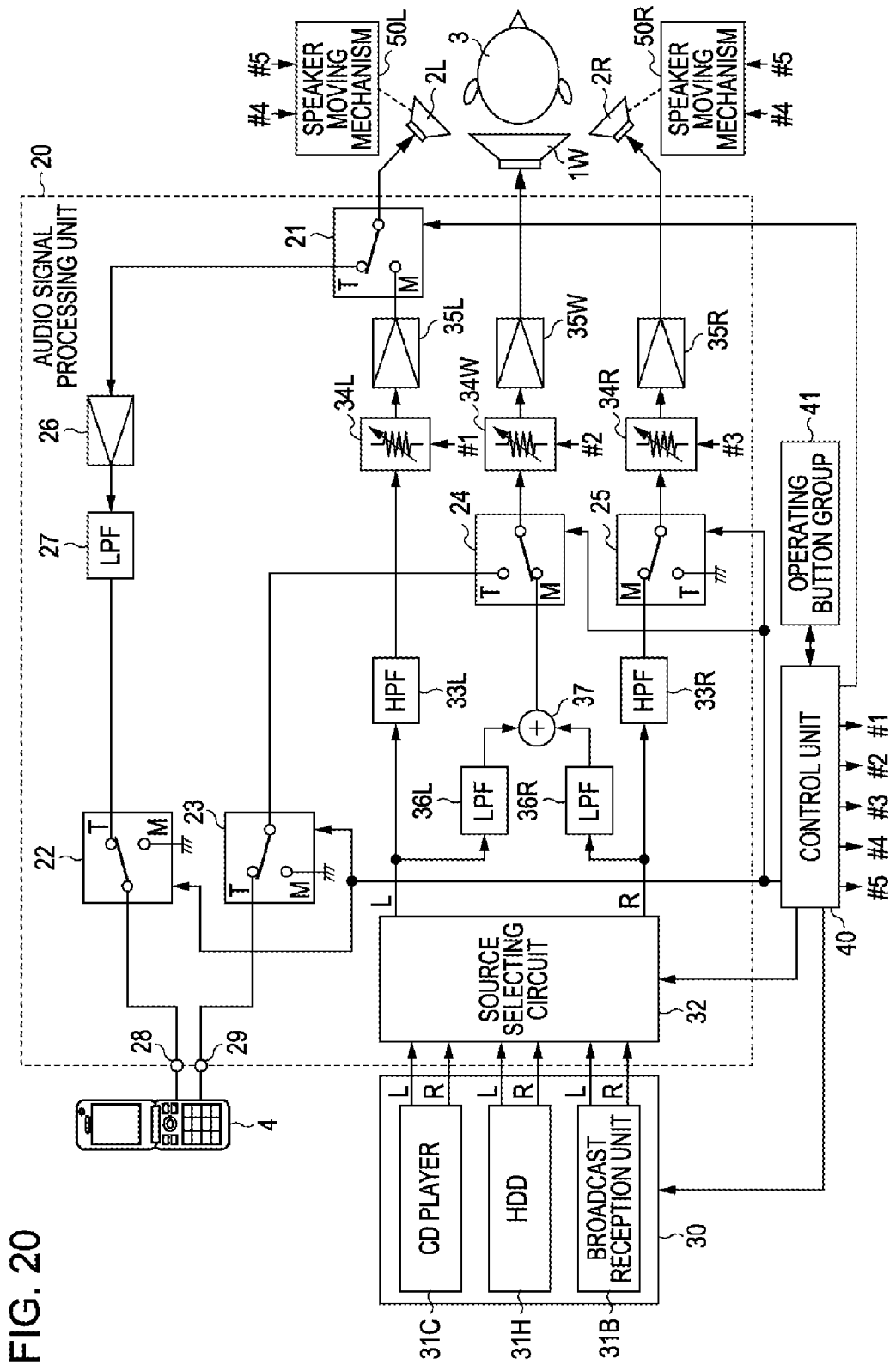
FIG. 20 is a block diagram of a configuration example of a seventh embodiment of an acoustic reproducing apparatus with a handsfree call function according to the present invention.

FIG. 20 is a diagram for describing a hardware configuration example of the present embodiment of the acoustic reproducing apparatus having a handsfree call function according to the present invention.

The acoustic reproducing apparatus 10 with a handsfree call function according to the present embodiment shown in FIG. 20 has an acoustic reproduction mode wherein a music source or the like from a disc medium such as CD (Compact Disc) or the like, or from a storage device such as a hard disk or the like is reproduced acoustically. Also, the acoustic reproducing apparatus 10 with a handsfree call function has a handsfree call mode wherein, in the acoustic reproduction mode, a handsfree call is performed by employing a speaker for reproducing a music source acoustically.

Configuration of Speaker

Speakers for acoustic reproduction of the acoustic reproducing apparatus 10 with a handsfree call function according to the present embodiment have a speaker configuration of a so-called 3D system made up of a subwoofer for low-pitched sound reproduction, and speakers for the left and right two channels for high-pitched sound reproduction. With the present embodiment, three speakers for the 3D system are configured so as to be attached to the headrest portion of a seat where a user sits.

In FIG. 20, 1W denotes a subwoofer for low-pitched sound reproduction, and makes up an example of the first speaker. As described later, with the present embodiment, the subwoofer 1W is a speaker for emitting receiver audio from a call partner in the handsfree call mode.

Also, 2L and 2R denote speakers for the left and right two channels for high-pitched sound reproduction. With the present embodiment, of the two speakers 2L and 2R, the speaker 2L makes up an example of the second speaker. As described later, with the present embodiment, the speaker 2L is configured so as to switch to a microphone for collecting the transmitter audio of a user 3 in the handsfree call mode.

Figure 21A:
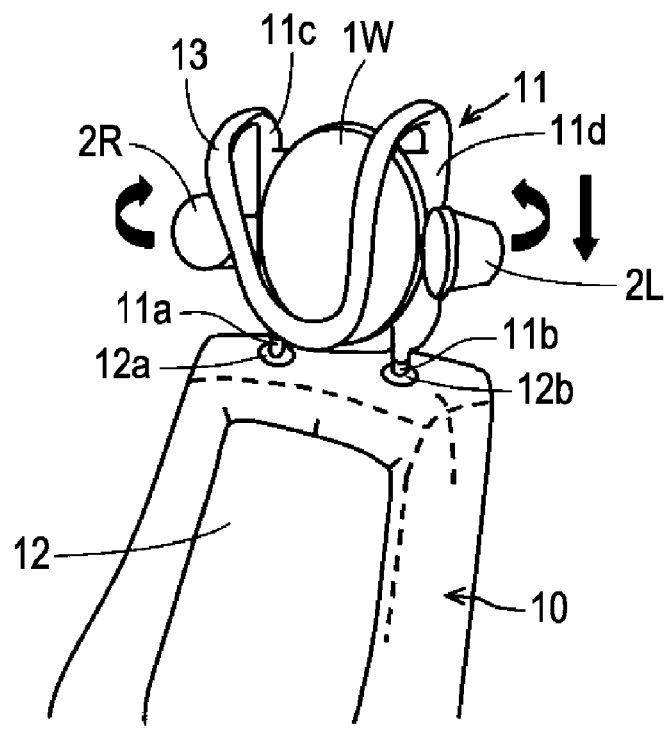
FIGS. 21A and 21B are diagrams for describing an example of a speaker attachment configuration with the seventh embodiment of the acoustic reproducing apparatus with a handsfree call function according to the present invention.
Figure 21B:
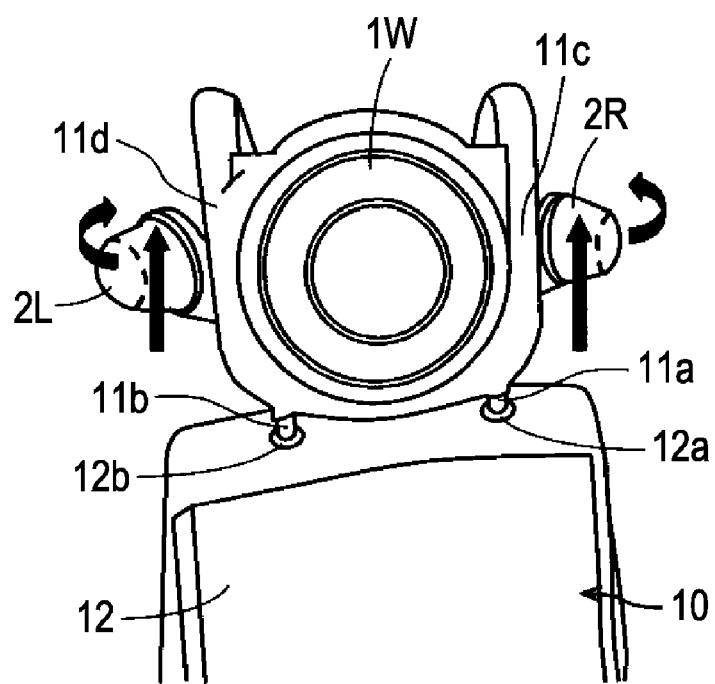

The subwoofer 1W and speakers 2L and 2R are, with the present embodiment, as shown in FIGS. 21A and 21B, provided to the portion equivalent to the headrest 11 of a seat 10 where the user 3 sits. FIG. 21A is a diagram of the seat 10 where the user 3 sits as viewed from the oblique front face side thereof, and FIG. 21B is a diagram of the seat 10 where the user 3 sits as viewed from the back face side.

With the present embodiment, the subwoofer 1W has a bare speaker configuration. Specifically, the subwoofer 1W has a configuration wherein a speaker unit is not stored in a speaker box, and is not attached to a baffle board.

As shown in FIGS. 21A and 21B, the subwoofer 1W is fixed to the headrest 11 which is a position serving as just at the back of the head portion of the user 3 when the user 3 sits in the seat 10 in this example.

With the present embodiment, the headrest 11 is configured so as to be detachable as to the seat 10 by inserting/detaching insertion/detachment rod-shaped portions 11a and 11b as to headrest attachment holes 12a and 12b of the backrest portion 12 of the seat 10. The subwoofer 1W is held and fixed by speaker holding portions 11c and 11d extending from the insertion/detachment rod-shaped portions 11a and 11b to the attachment holes 12a and 12b of the headrest 11.

Also, the headrest 11 includes a bending arm portion 13 which can be bent forward on the diaphragm side of the subwoofer 1W from the speaker holding portions 11c and 11d. As shown in FIG. 21, the bending arm portion 13 has a U-character shape, and is configured so as to elastically hold the head portion of the user 3 by the U-shaped arm thereof being bent forward on the diaphragm side of the subwoofer 1W.

In the case of the present embodiment, the bent U-character shaped portion of the bending arm portion 13 is configured so as to be located apart by predetermined distance from the most protruding portion on the diaphragm side of the subwoofer 1W. An arrangement is made wherein the head portion of the user 3 is prevented from colliding with the subwoofer 1W by the bent U-character shaped portion of the bending arm portion 13. Moreover, the bending arm portion 13 serves to elastically support the head portion of the user 3 by the bending configuration thereof.

Figure 22:
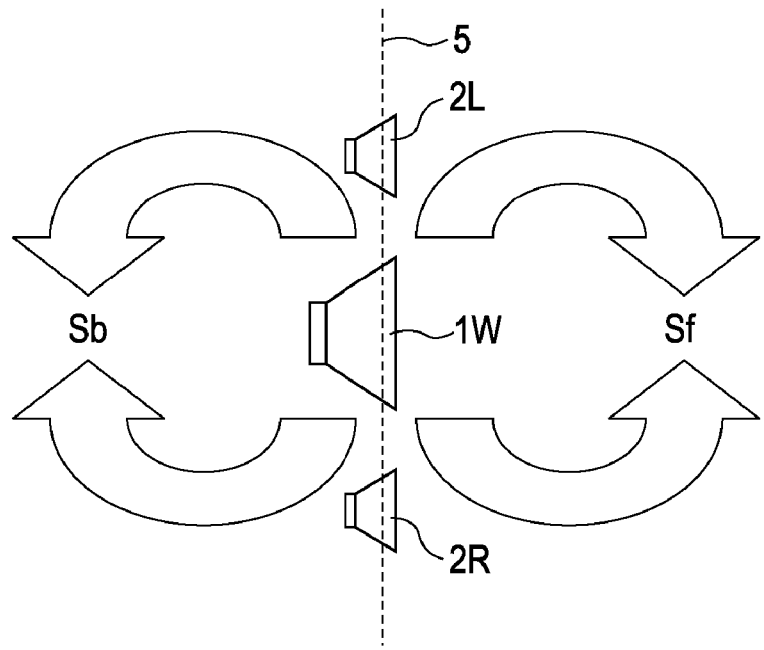
FIG. 22 is a diagram employed for describing the disposed position of a speaker employed for the seventh embodiment of the acoustic reproducing apparatus with a handsfree call function according to the present invention.

With the subwoofer 1W having a bare speaker configuration, as shown in FIG. 22, sound waves Sf emitted forward of the diaphragm of the speaker unit thereof, and sound waves Sb emitted from backward thereof are in a mixed state. Here, the phase of the sound waves Sf emitted from the front of the diaphragm of the speaker unit (see (A) in FIG. 5), and the phase of the sound waves Sb emitted from the back of the diaphragm (see (C) in FIG. 5) become inverted phases mutually. Therefore, there is a region Zo within a face parallel to a face including the outer circumferential end of the diaphragm of the subwoofer 1W, of a region outer side than the outer circumferential end of the diaphragm thereof, wherein sounds emitted from the front and back of the diaphragm thereof are mixed and canceled out (see (B) in FIG. 5), and the sound pressure is almost zero. Hereafter, the region Zo where the sound pressure is almost zero will be referred to as a sound pressure zero region Zo.

This sound pressure zero region Zo can be confirmed by collecting the sound waves emitted from the bare speakers by the microphone at the time of audio being reproduced with the bare speakers. FIG. 22 illustrates this region with a dashed line 5.

With the present embodiment, the speakers 2L and 2R are disposed in arbitrary positions of the sound pressure zero region Zo regarding the subwoofer 1W. As described above, the speaker 2L is configured so as to be employed as a microphone as well, and accordingly, a microphone for collecting the transmitter audio of the transmitter (user 3) is disposed in the sound pressure zero region Zo as to the audio emitted from the subwoofer 1W.

In actual use, inside of a flat face including the outer circumferential frame portion of the diaphragm of the subwoofer 1W becomes the sound pressure zero region Zo, and accordingly, with the present embodiment, the speakers 2L and 2R are attached to the speaker holding portions 11*c* and 11*d* holding the subwoofer 1W. With the present embodiment, the speakers 2L and 2R also have a bare speaker configuration.

Figure 23:
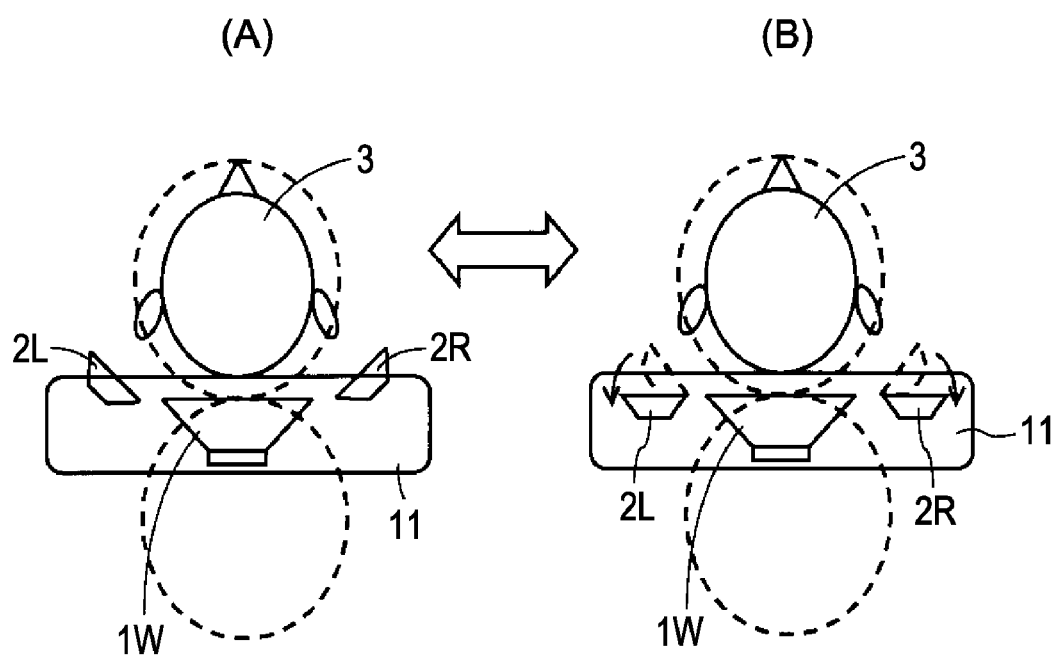
FIG. 23 is a diagram employed for describing a movement state by a speaker moving mechanism employed for the seventh embodiment of the acoustic reproducing apparatus with a handsfree call function according to the present invention.

With the present embodiment, in the acoustic reproduction mode, as shown in (A) in FIG. 23, it is desirable to dispose the vibrating faces of the diaphragms of the speakers 2L and 2R to be attached to both ends of the headrest 11 of the seat 10 where the user 3 sits so as to face the left and right ear sides of the user, respectively. This is because emitted audio reproduced acoustically effectively can be provided to the user in the vicinity of the ears thereof, and accordingly, the audio signals of low-pitched sound pressure should be emitted from the speakers 2L and 2R, and sound leakage to others can be reduced.

With the example in (A) in FIG. 23, in order that the vibrating faces of the diaphragms of the speakers 2L and 2R face the left and right ear sides of the user 3, the vibrating faces of the diaphragms thereof are disposed in an oblique state of around 45 degrees for example as to the long piece direction of the headrest 11.

On the other hand, in the handsfree call mode, as shown in (B) in FIG. 23, it is desirable that the speaker 2L to be also employed as a microphone by switching is disposed in the sound pressure zero region Zo regarding the subwoofer 1W. In this case, in a state in which the speaker 2L is disposed in the sound pressure zero region Zo regarding the subwoofer 1W, the direction of the diaphragm of the speaker 2L is identical to the direction of the diaphragm of the subwoofer 1W.

Figure 24:
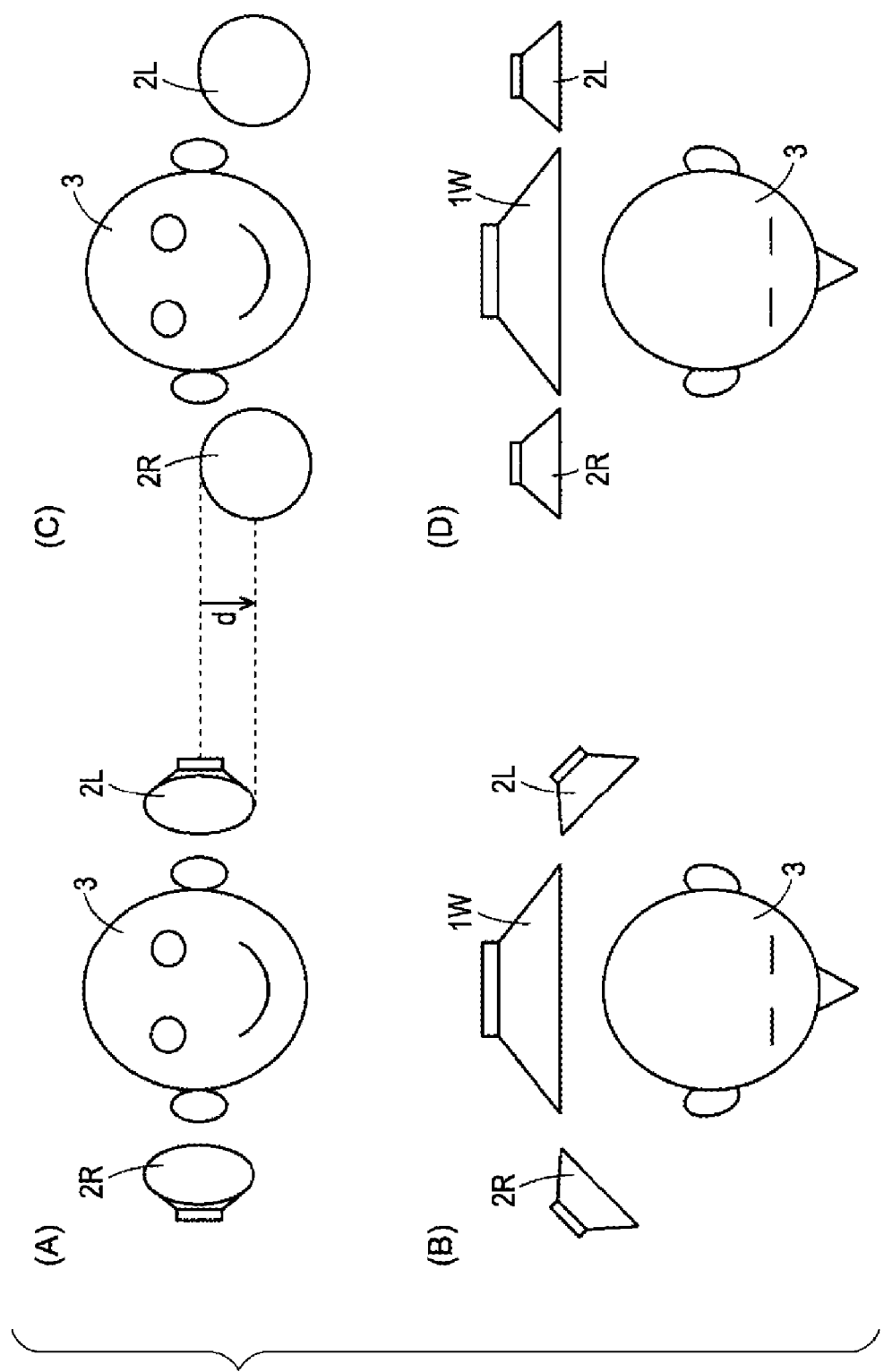
FIG. 24 is a diagram employed for describing a movement state of the speaker moving mechanism employed for the seventh embodiment of the acoustic reproducing apparatus with a handsfree call function according to the present invention.

Also, in the acoustic reproduction mode, it is desirable as shown in (A) in FIG. 24 that the speakers 2L and 2R are disposed in the height positions in the vicinity of the left and right ears of the user, whereby the output sound pressure from the speakers 2L and 2R thereof can be suppressed lower.

On the other hand, at the time of the handsfree call mode, the speaker 2L is switched to a microphone for collecting the transmitter audio of the user, and accordingly, as shown in (C) in FIG. 24, it is desirable that the speaker 2L is disposed in the height position in the vicinity of the user's mouth. That is to say, it is desirable that the speaker 2L moves by d in the height direction.

Note that (B) and (D) in FIG. 24 illustrate the directions of the diaphragms of the speakers 2L and 2R as to the user 3 at the time of the acoustic reproduction mode and at the time of the handsfree call mode in a conformable manner, which are similar to (A) and (B) in FIG. 23. Note that, in FIG. 23, elliptical dotted lines illustrate sound waves emitted forward from the subwoofer 1W, and sound waves emitted backward.

With the present embodiment, while considering the above, at least the speaker 2L is configured so as to be moved by a speaker moving mechanism for enabling the speaker 2L to be in a suitable state in each of the acoustic reproduction mode and handsfree call mode.

Specifically, firstly, the speaker 2L is attached to the headrest 11 in a rotationally movable manner so as to both states of a state in which the vibrating face of the diaphragm thereof faces the both ears directions of the user 3 sitting in the seat 10, and a state in which the vibrating face of the diaphragm thereof faces the same direction as the diaphragm of the subwoofer 1W. The two types of direction at this time are such as shown in (B) and (D) in FIG. 24.

Also, secondly, the speaker 2L is attached to the headrest 11 in a movable manner in the height direction so as to both of a state in which the speaker 2L is disposed lateral to the left ear of the user 3, and a state in which the speaker 2L is disposed lateral to the mouth of the user 3. The two types of direction at this time are such as shown in (A) and (C) in FIG. 24.

Note that, with the present embodiment, the speaker 2L alone is employed as a microphone by switching, and accordingly, with regard to the speaker 2R, a moving mechanism such as described above has not to be provided. However, in some cases, assuming a case where the speaker 2R is employed as a microphone by switching in stead of the speaker 2L, with the present embodiment, moving mechanisms are provided as to both of the two speakers 2L and 2R.

Speaker Moving Mechanism

Figure 25:
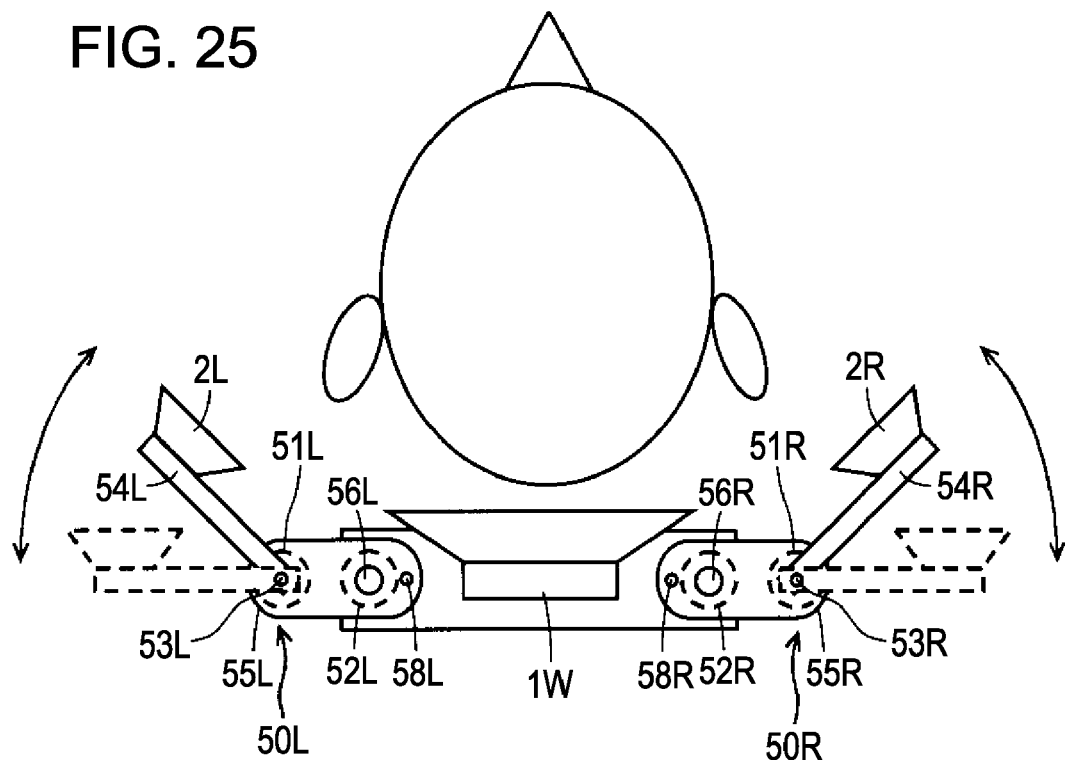
FIG. 25 is a diagram for describing an example of the speaker movement mechanism employed for the seventh embodiment of the acoustic reproducing apparatus with a handsfree call function according to the present invention.
Figure 26:
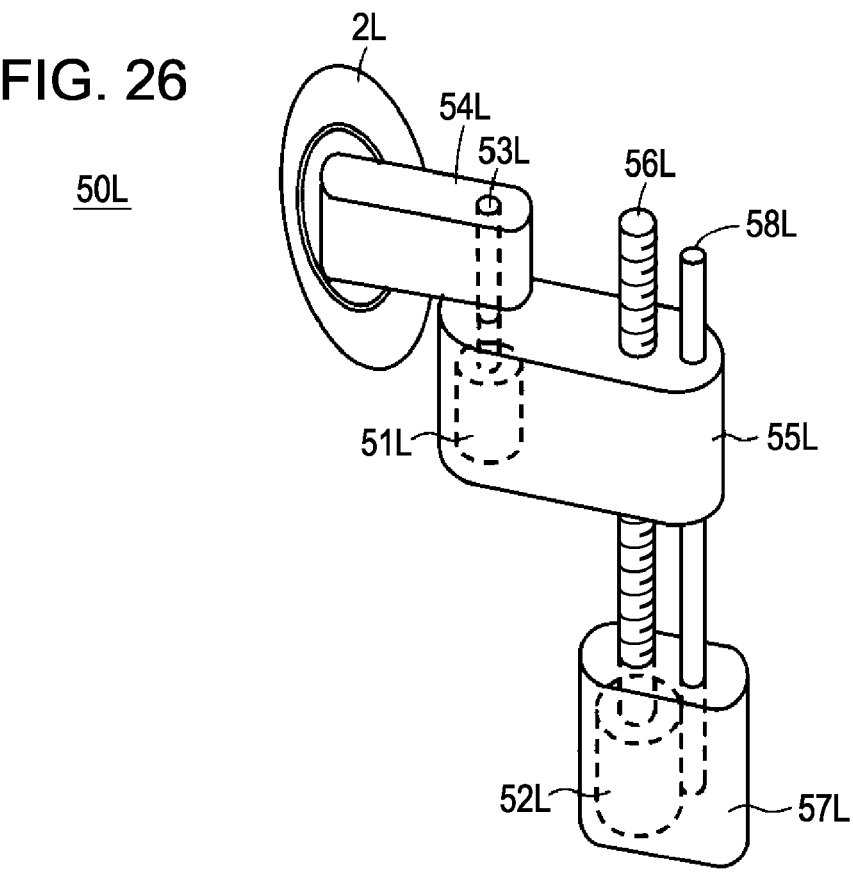
FIG. 26 is a diagram for describing an example of the speaker moving mechanism employed for the seventh embodiment of the acoustic reproducing apparatus with a handsfree call function according to the present invention.

FIGS. 25 and 26 illustrate an example of a speaker moving mechanism. In this example, with the headrest 11, there are provided a speaker moving mechanism 50L as to the speaker 2L, and a speaker moving mechanism 50R as to the speaker 2R. The speaker moving mechanisms 50L and 50R are provided to the speaker holding portions 11*c* and 11*d* for holding the subwoofer 1W, respectively.

FIG. 25 is a diagram of the speaker moving mechanisms 50L and 50R as viewed from immediately above of the seat 10. Also, FIG. 26 is a diagram for describing the detailed configuration of the speaker moving mechanism 50L. Note that the speaker moving mechanism 50R has a symmetrical configuration as to the speaker moving mechanism 50L, and accordingly, the basic configurations between both are the same, and detailed configuration thereof will be omitted.

In FIG. 26, a motor 51L made up of, for example, a stepping motor is for changing the direction of the speaker 2L within, for example, a 45-degree angle range as described above. Also, a motor 52L made up of, for example, a stepping motor is for moving the height position of the speaker 2L by distance d between the lateral position of the user's ear, and the position of the user's mouth, as described above.

A speaker holding member 54L is fixed to the rotational shaft 53L of the motor 51L. The speaker 2L is attached to the speaker holding member 54L. Therefore, upon the motor 51L being driven rotationally, the speaker holding member 54L fixed to the rotational shaft 53L is moved rotationally in the rotational direction of the rotational shaft 53L by the worth of the rotational angle of the rotational shaft 53L with the rotational shaft 53L as the center.

The motor 51L is housed in a height-direction sliding member 55L. A rotational shaft 56L of the motor 52L is threaded, and the height-direction sliding member 55L is screwed on the rotational shaft 56L of the motor 52L. The motor 52L is provided in a fixing member 57L. In order to prevent the height-direction sliding member 55L from rotating along the rotation of the rotational shaft 56L, a guide pin 58L is fixed to the fixing member 57L passing through the height-direction sliding member 55L.

According to this configuration, upon the motor 52L being driven rotationally, the height-direction sliding member 55L screwed on the rotational shaft 56L thereof moves in a vertical sliding manner according to the rotational direction of the rotational shaft 56L without moving rotationally due to the guide pin 58L.

With the present embodiment, the speaker moving mechanism 50L in FIG. 26 is housed and provided in the speaker holding portion 11*d* of the subwoofer 1W of the headrest 11.

The motors 51L and 52L are subjected to rotational driving control by a later-described rotational moving control signal for the speaker 2L from the control unit 40. In this case, the motor 51L is controlled by a rotational control signal as to the motor 51L, and the direction of the speaker 2L is changed and controlled by the rotational direction and rotational angle according to the rotational control signal thereof. Also, the motor 52L is controlled by a rotational control signal as to the motor 52L, and the height-direction sliding member 55L is moved in a sliding manner in the height direction according to the rotational direction by the rotational control signal thereof.

Specifically, when the acoustic reproduction mode is changed to the handsfree call mode, the control unit 40 supplies a rotational control signal to the motor 51L so as to rotate the rotational shaft 53L by 45 degrees in the counter clockwise direction. Thus, the speaker holding member 54L is moved rotationally by 45 degrees in the counter clockwise direction with the rotational shaft 53L as the center from a state in the acoustic reproduction mode in which the face including the outer circumferential frame of the diaphragm of the speaker 2L makes up an angle of 45 degrees as to the face including the outer circumferential frame of the diaphragm of the subwoofer 1W. Thus, the face including the outer circumferential frame of the diaphragm of the speaker 2L is in parallel with the face including the outer circumferential frame of the diaphragm of the subwoofer 1W, and the speaker 2L is disposed in the sound pressure zero region Zo as to the subwoofer 1W.

Conversely, when the handsfree call mode is changed to the acoustic reproduction mode, the control unit 40 supplies a rotational control signal to the motor 51L so as to rotate the rotational shaft 53L by 45 degrees in the clockwise direction. Thus, the speaker 2L returns to the state of the acoustic reproduction mode wherein the face including the outer circumferential frame of the diaphragm of the speaker 2L makes up an angle of 45 degrees as to the face including the outer circumferential frame of the diaphragm of the subwoofer 1W.

Also, when the acoustic reproduction mode is changed to the handsfree call mode, the control unit 40 supplies a rotational control signal to the motor 51L so as to lower the height position of the height-direction sliding member 55L by distance d. Thus, the height-direction sliding member 55L moves in a sliding manner such that the center position of the speaker 2L comes beside the user's mouth.

Conversely, when the handsfree call mode is changed to the acoustic reproduction mode, the control unit 40 supplies a rotational control signal to the motor 52L so as to raise the height position of the height-direction sliding member 55L by distance d. Thus, the height-direction sliding member 55L moves in a sliding manner such that the center position of the speaker 2L comes beside the user's ear.

The description above is a description regarding the speaker moving mechanism 50L, but the speaker moving mechanism 50R is also configured completely in the same way except that the speaker moving mechanism 50R is configured in a symmetric manner as to the speaker moving mechanism 50L. Note that, in FIG. 25, the components regarding the speaker moving mechanism 50R are denoted with the same reference numerals as the components corresponding to the speaker moving mechanism 50L by changing suffixes L thereof to suffixes R. With the present embodiment, the speaker moving mechanism 50R is provided by being housed in the speaker holding portion 11c of the subwoofer 1W of the headrest 11.

Description of Signal Processing System

Next, description will be made regarding the configuration of the signal processing system of the acoustic reproducing apparatus with a handsfree call function according to the present embodiment, with reference to FIG. 20.

The acoustic reproducing apparatus with a handsfree call function according to the present embodiment is configured of an audio signal processing unit 20, music source unit 30 serving as an example of audio signal generating unit, control unit 40, operating button group 41, and cellular telephone terminal 4.

The audio signal processing unit 20 includes switch circuits 21, 22, 23, 24, and 25 which can be switched between the acoustic reproduction mode and the handsfree call mode. According to the mode switching signal from the control unit 40, these switch circuits 21 through 25 are switched to the terminal M side at the time of the acoustic reproduction mode, and are switched to the terminal T side at the time of the handsfree call mode, respectively.

With the present embodiment, the music source unit 30 includes a CD (Compact Disc) player, hard disk drive (hereafter, abbreviated as HDD) 31H, and broadcast reception unit 31B. Upon CD being loaded to a CD player 31C, the CD player 31C decodes two-channel audio signals and output these. The music data of a great number of music contents is stored in an HDD 31H, and upon this being selected, the HDD 31H decodes the music data to output two-channel audio signals. The broadcast reception unit 31B can receive, for example, AM radio broadcast, FM radio broadcast, television broadcast, or the like, and outputs the received broadcast audio as two-channel audio signals.

With the present embodiment, the audio signals for the left and right channels from the CD player 31C, HDD 31H, and broadcast reception unit 31B are supplied to the audio signal processing unit 20.

With the audio signal processing unit 20, the audio signals for the two channels from the CD player 31C, HDD 31H, and broadcast reception unit 31B are input to a source selecting circuit 32.

The operating button group 41 includes, as shown in FIG. 9, selection buttons such as a phone button 61, CD button 62, HDD button 63, broadcast button 64, and so forth, and volume control knob 65. The operating signal corresponding to button operations by the user at the operating button group 41 is supplied to the control unit 40.

Note that the operating button group 41 also includes, in addition to the selection buttons such as described above, so-called repeat play, and shuffle play as to the CD player 31C and HDD 31H, and a broadcast channel selecting button with the broadcast reception unit 31B, and so forth. However, in order to simplify description, the illustrations and descriptions regarding these buttons will be omitted.

The control unit 40, which is configured of a microcomputer being mounted thereupon for example, generates the control signal corresponding to the button operations of the user with the operating button group 41, and supplies this to necessary units of the music source unit 30 and audio signal processing unit 20.

Upon the phone button 61 being operated in the state of the acoustic reproduction mode, the control unit 40 determines that the acoustic reproduction mode has been switched to the handsfree call mode, and supplies a mode switching signal to the switch circuits 21 through 25. Subsequently, the control unit 40 supplies a rotational control signal such as described above to the motors 51L and 52L according to this mode switching.

Also, upon detecting one of the selection buttons such as the CD button 62, HDD button 63, broadcast button 64, or the like being operated in the state of the handsfree call mode, the control unit 40 determines that the handsfree call mode has been changed to the acoustic reproduction mode. Subsequently, based on the determination results thereof, the control unit 40 supplies a mode switching signal to the switch circuits 21 through 25, and also supplies a rotational control signal such as described above to the motors 51L, 52L, 51R, and 52R.

Note that, with the handsfree call mode according to the present embodiment, switching to a state in which playing of a music source is not performed is performed. Subsequently, the speaker 2L is employs as a microphone, and is employed for collection of the transmitter audio of the user 3, and also the subwoofer 1W is employed for collection of the receiver audio from a call partner.

Upon a selection button regarding a music source such as the CD button 62, HDD button 63, broadcast button 64, or the like being pressed in the music source playing mode, the control unit 40 supplies a source selection signal to the source selecting circuit 32.

The source selecting circuit 32 is selectively controlled by the source selection signal thereof, and performs selection control so as to select the music source corresponding to the pressed selection button. For example, upon the CD button 62 being pressed, the source selecting circuit 32 selectively outputs the audio signals of the left and right two channels from the CD player 31C. Similarly, the source selecting circuit 32 selectively outputs the audio signals of the left and right two channels from the HDD 31H upon the HDD button 63 being pressed, and selectively outputs the audio signals of the left and right two channels from the broadcast reception unit 31B respectively upon the broadcast button 64 being pressed.

Of the audio signals of the two channels from the source selecting circuit 32, the audio signal of the left channel is supplied to a high-pass filer 33L, and the high-frequency components are extracted. Subsequently, the high-frequency components of the audio signal of the left channel from the high-pass filter 33L are supplied to the acoustic reproduction mode side terminal M (input terminal) of the switch circuit 21 for mode switching through the potentiometer 34L for volume control, and the power amplifier 35L. In the acoustic reproduction mode, the audio signal obtained at the switching terminal (input/output terminal) of the switch circuit 21 is supplied to the speaker 2L, and is reproduced acoustically.

Also, the audio signal of the right channel of the audio signals of the two channels from the source selecting circuit 32 is supplied to a high-pass filer 33R, and the high-frequency components are extracted. Subsequently, the high-frequency components of the audio signal of the left channel from the high-pass filter 33R are supplied to the acoustic reproduction mode side terminal M (input terminal) of the switch circuit 25.

A handsfree call mode side terminal T (input terminal) of the switch circuit 25 is grounded. Also, the audio signal obtained at the switching terminal (output terminal) of the switch circuit 25 is supplied to the speaker 2R through the potentiometer 34R for volume control, and the power amplifier 35R, and is reproduced acoustically.

Also, the audio signals of the two channels from the source selecting circuit 32 are supplied to the low-pass filters 36L and 36R, and the low-frequency components are extracted, respectively. The low-frequency components of the audio signals of the two channels obtained from the low-pass filters 36L and 36R are supplied to an adding circuit 37, and are added there. The output audio signal of the adding circuit 37 is supplied to an acoustic reproduction mode side terminal M (input terminal) of the switch circuit 24. As described later, the receiver audio signal from a call partner is supplied to a handsfree call mode side terminal T (input terminal) of the switch circuit 24.

Subsequently, the audio signal obtained at a switching terminal (output terminal) of the switch circuit 24 is supplied to the subwoofer 1W through a potentiometer 34W for volume control, and a power amplifier 35W, and is reproduced acoustically.

In this case, the speakers 1W, 2L, and 2R are disposed near the user's ear, and accordingly, the sound volume of call voice emitted from the speakers 1W, 2L, and 2R can be suppressed. Accordingly, sound leakage to others can be reduced, even if the user 3 listens to music with relatively large volume.

Next, the processing system of the audio signal of a handsfree call will be described. The switch circuit 21 is connected to a voice coil of the speaker 2L, and at the time of the acoustic reproduction mode, an audio signal is supplied to the speaker 2L, whereby the speaker 2L thereof serves as an electro-acoustic conversion device.

On the other hand, at the time of the handsfree call mode, the switch circuit 21 is switched to the handsfree call mode side terminal T, thereby providing a state in which the audio signal is taken out from the speaker 2L. That is to say, at the time of the handsfree call mode, the speaker 2L serves as an acousto-electric conversion device, i.e., a microphone. Subsequently, with the present embodiment, according to the speaker 2L switched to a microphone, the call voice spoken by the user 3 is collected, and is subjected to acousto-electric conversion to generate a call voice signal, and this signal is input to the audio signal processing unit 20.

Subsequently, with the audio signal processing unit 20, the audio signal from the speaker (microphone) 2L serving as an acousto-electric conversion device is supplied to a microphone amplifier 26 through the handsfree call mode side terminal T of the switch circuit 21. Subsequently, the audio signal amplified at the microphone amplifier 26 is supplied to a low-pass filter 27.

With the present embodiment, the low-pass filter 27 is provided according to the following reason. Specifically, of sounds emitted from the front and back of the diaphragm of the subwoofer 1W which is a bare speaker, and particularly with regard to low frequencies, cancellation effects of the sounds emitted from the front and back of the diaphragm are great.

Therefore, with the present embodiment, in order to enable a call to be performed stably in a sure manner without howling, according to the low-pass filter 27, the components of the sounds emitted from the front and back of the diaphragm of the subwoofer 1W are restricted to only call voice band components of which the sound pressure is approximately completely canceled out and becomes zero when the microphone is disposed in the above-mentioned sound pressure zero region Zo. With this example, a cut-off frequency at the low-pass filter 27 is set to, for example, around 2 kHz. The cut-off frequency at the low-pass filter 27 differs depending on the use environment of the handsfree call apparatus, and for example, it can be conceived that the cut-off frequency is at or below 1 kHz.

Note that, depending on the type of the cellular telephone terminal, or the connection method as to the cellular telephone terminal thereof, both the microphone amplifier 26 and low-pass filter 27 may be omitted.

The output audio signal of the low-pass filter 27 is supplied to a handsfree call mode side terminal T (input terminal) of the switch circuit 22. An acoustic reproduction mode side terminal M (input terminal) of the switch circuit 22 is grounded with the present embodiment.

A switching terminal (output terminal) of the switch circuit 22 is connected to the transmitter audio input terminal of the cellular telephone terminal 4 through an audio signal output terminal 28 with the present embodiment. That is to say, the transmitter audio signal of the user 3 collected at the microphone is supplied to the transmitter audio input terminal of the cellular telephone terminal 4.

Also, the receiver audio signal from a call partner from the receiver audio output terminal of the cellular telephone terminal 4 is input to the audio signal processing unit 20 through an audio signal input terminal 29.

The receiver audio signal input through the audio signal input terminal 29 is supplied to a handsfree call mode side terminal T (input terminal) of the switch circuit 23. An acoustic reproduction mode side terminal M (input terminal) of the switch circuit 23 is grounded with the present embodiment. Subsequently, a switching terminal (output terminal) of the switch circuit 23 is connected to a handsfree call mode side terminal T of the switch circuit 24.

Therefore, the receiver audio signal from a call partner transmitted from the cellular telephone terminal 4 is supplied to the subwoofer 1W through the switch circuit 24, potentiometer 34W for volume control, and power amplifier 35W.

In this case, the subwoofer 1W is disposed in the vicinity of the user, on the rear side of the head portion of the user, and accordingly, sound emitted from the subwoofer 1W can be suppressed to a small output volume.

The potentiometers 34L, 34R, and 34W for volume control are for controlling, at the time of the volume control knob 65 having been operated by the user, the sound volume of each of the audio signals to be supplied to the speakers 2L, 2R, and subwoofer 1W in accordance with the operations thereof.

Specifically, upon the user rotating the volume control knob 65 to the right for example, the control unit 40 detects this as volume-up operations. Subsequently, the control unit 40 controls the potentiometers 34L, 34R, and 34W for volume control to increase the sound volume of each of the audio signals to be supplied to the speakers 2L, 2R, and subwoofer 1W for the worth corresponding to the rotational amount of the volume control knob 65.

Also, upon the user rotating the volume control knob 65 to the left for example, the control unit 40 detects this as volume-down operations. Subsequently, the control unit 40 controls the potentiometers 34L, 34R, and 34W to decrease the sound volume of each of the audio signals to be supplied to the speakers 2L, 2R, and subwoofer 1W for the worth corresponding to the rotational amount of the volume control knob 65.

Note that, with the present embodiment, the number of the volume control knobs 65 is one, and according to the operations of the one volume control knob 65 thereof, volume control is performed in an interlock manner between the potentiometers 34L, 34R, and 34W for volume control. However, an arrangement may be made wherein a volume control knob is provided to each of the potentiometers 34L, 34R, and 34W for volume control, and each of the volumes is controlled independently.

Description of Operation in Seventh Embodiment

In the acoustic reproduction mode, the switch circuits 21 through 25 have each been switched to the acoustic reproduction mode side terminal M.

Therefore, this state is a state in which an audio signal is supplied from the switch circuit 21 to the speaker 2L, and the speaker 2L has been switched to a state of being employed as an electro-acoustic conversion device, i.e., speaker. Also, the switch circuits 22 and 23 have been switched to the ground end side, and the audio signal system for a handsfree call has been shut off.

Also, the speakers 2L and 2R have been set in a state in which the height position is set beside the ear of the user 3 such as shown in (A) in FIG. 24, and also in a state in which the diaphragms thereof face the direction of the ear.

In the acoustic reproduction mode, the music source from the music source unit 30 is reproduced acoustically by the speakers 2L, 2R, and subwoofer 1W. The output volume is changed by the operations of the volume control knob 65 of the operating button group 41. Also, the CD button 62, HDD button 63, broadcast button 64, or the like of the operating button group 41 is operated, thereby changing the sources of the two-channel audio signals to be transmitted from the music source unit 30.

For example, in a case where there has been an incoming call at the cellular telephone terminal 4 at the time of the acoustic reproduction mode, with the present embodiment, the user performs incoming call response operations (e.g., off-hook operations) at the cellular telephone terminal 4, and also presses the phone button 61 of the operating button group 41. Also, in a case where the user 3 performs an outgoing call from the cellular telephone terminal 4 to a call partner to perform a handsfree call, with the present embodiment, the user 3 performs outgoing call operations to the call partner at the cellular telephone terminal 4, and also presses the phone button 61.

Upon the user pressing the phone button 61 of the operating button group 41, the control unit 40 detects this to perform processing to switch to the handsfree call mode.

First, the control unit 40 supplies a rotational control signal to each of the motors 51L, 52L, 51R, and 52R to move the speakers 2L and 2R to the height position of the mouth of the user 3, and also to move these to the sound pressure zero regions Zo as to the subwoofer 1W. Simultaneously therewith, the control unit 40 supplies a switching control signal to the switch circuits 21 through 25 to switch each of these to the handsfree call mode side terminal T.

Also, the speaker 2L is switched to a microphone. The transmitter audio signal of the spoken audio of the user 3 collected at the speaker 2L is supplied to the cellular telephone terminal 4 through the microphone amplifier 26, low-pass filter 27, switch circuit 22, and audio signal output terminal 28. Thus, the transmitter audio signal of the user 3 is transmitted to the call partner through the cellular telephone terminal 4 through a cellular telephone network.

Also, the receiver audio signal from the partner received at the cellular telephone terminal 4 is input to the audio signal processing unit 20 through an audio signal input terminal 29. The receiver audio signal input from the partner is supplied to the subwoofer 1W through the switch circuits 23 and 24, potentiometer 34W, and power amplifier 35W for volume control. Consequently, the receiver audio signal is reproduced acoustically by the subwoofer 1W.

Note that, with the present embodiment, response to an incoming call to the cellular telephone terminal 4, and outgoing call operations are handled by performing incoming call response operations, and outgoing call operations at the cellular telephone terminal 4, respectively.

However, in a case where the cellular telephone terminal 4 includes a connection terminal with a computer, there has been a handsfree kit which employs the connection terminal thereof to realize automatic incoming call/call-ending, and an outgoing call function to a registered partner with a single touch of a button. Therefore, this handsfree kit function is included in the control unit 40, whereby the control unit 40 can perform functions such as automatic incoming call/call-ending, and so forth, obviously.

Figure 27:
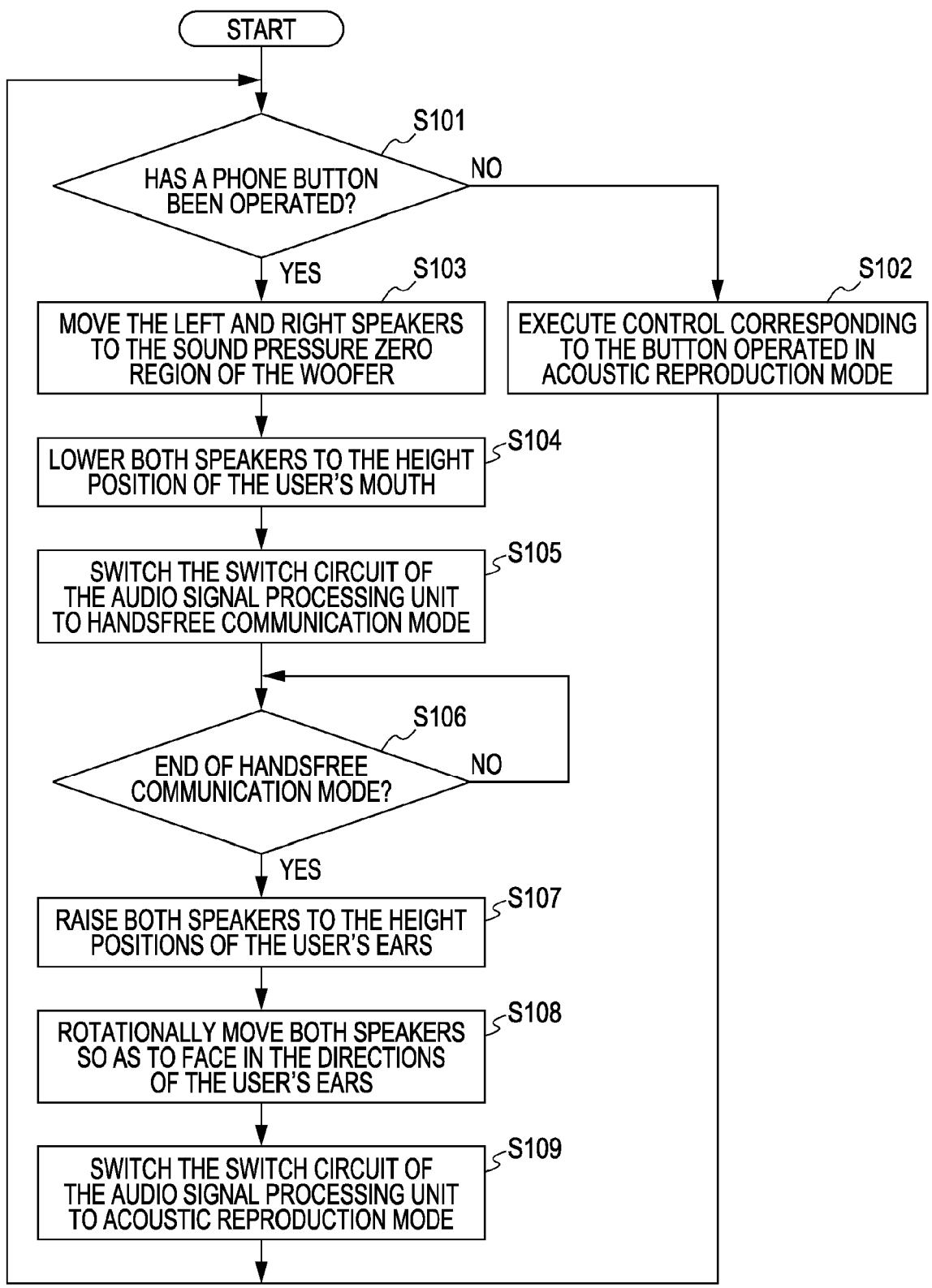
FIG. 27 is a flowchart for describing the operations of principal components according to the seventh embodiment of the acoustic reproducing apparatus with a handsfree call function according to the present invention.

FIG. 27 is a flowchart for describing control operation by the control unit 40 at the time of switching from the acoustic reproduction mode to the handsfree call mode.

The control unit 40 monitors whether or not the phone button 61 has been pressed (step S101). Subsequently, in the case of determining that the phone button 61 has not been pressed, the control unit 40 executes the control corresponding to the operations of the CD button 62, HDD button 63, broadcast button 64, volume control knob 65, or the like in the acoustic reproduction mode (step S102). After this step S102, the processing is returned to step S101.

When determination is made in step S101 that the phone button 61 has been pressed, the control unit 40 supplies a rotational control signal to the motors 51L and 51R to change and move the directions of the speakers 2L and 2R so as to face the sound pressure zero region Zo of the subwoofer 1W (step S103). Also, the control unit 40 supplies a rotational control signal to the motors 52L and 52R to change and move the height positions of the speakers 2L and 2R so as to locate the height position of the mouth of the user 3 (step S104).

Further, the control unit 40 switches the switch circuits 21 through 25 from the acoustic reproduction mode side terminal M to the handsfree call mode side terminal T (step S105).

Subsequently, the control unit 40 determines whether or not the handsfree call mode has been completed (step S106). The determining processing of the control unit 40 in step S106 is performed by the control unit 40 determining whether or not the user 3 has pressed the phone button 61 again, or whether or not the user 3 has pressed one of the selection buttons such as the CD button 62, HDD button 63, broadcast button 64, or the like.

When determination is made in step S106 that the handsfree call mode has been completed, the control unit 40 performs processing for switching to the acoustic reproduction mode as follows. Specifically, first, the control unit 40 supplies a rotational control signal to the motors 52L and 52R to change and move the height positions of the speakers 2L and 2R so as to locate in the height positions of the ears of the user 3 (step S107).

Next, the control unit 40 supplies a rotational control signal to the motors 51L and 51R to change and move the directions of the speakers 2L and 2R so as to face the direction of the ear of the user 3 (step S108). Further, the control unit 40 switches the switch circuits 21 through 25 from the handsfree call mode side terminal T to the acoustic reproduction mode side terminal M (step S109). After this step S109, the processing is returned to step S101.

Note that, as described above, in a case where the cellular telephone terminal 4 includes a connection terminal with a computer, an arrangement may be made wherein the control unit 40 can detect end of a call at the cellular telephone terminal 4 based on information though the connection terminal thereof. In this case, upon detecting end of a call at the cellular telephone terminal 4, in step S106 the control unit 40 determines end of the handsfree call mode, and switches to the acoustic reproduction mode. In this case, in the acoustic reproduction mode after switching, the processing may be proceeded to a state in which a predetermined music source is selected, or may be returned to a state immediately before being changed to the handsfree call mode.

Thus, in the handsfree call mode, the receiver audio from the call partner is emitted from the subwoofer 1W, and also the transmitter audio of the user is collected by the microphone (speaker 2L) disposed in the sound pressure zero region Zo of the subwoofer 1W.

Therefore, a handsfree call while preventing occurrence of howling can be performed. The subwoofer 1W has a bare speaker configuration, and is also disposed in the vicinity of the user, and accordingly, the original sound emission output volume (sound pressure) may be small. According to a combination of this advantage and that the microphone (speaker 2L) for collection of the transmitter audio of the user 3 is disposed in the sound pressure zero region Zo of the subwoofer 1W, with the present embodiment, a handsfree call can be performed while howling is sufficiently prevented.

In a case where the user 3 has pressed the phone button 61 to transmit an outgoing call to the call partner from the cellular telephone terminal 4 to attempt to perform a handsfree call, upon the call partner responding to this, a handsfree call can be performed such as described above.

Eighth Embodiment

With the above-described seventh embodiment, in the handsfree call mode, the audio from the music source unit 30 has been shut off. However, in the handsfree call mode, a call may be performed while listening to the audio from the music source unit 30. The present eighth embodiment is an embodiment of the acoustic reproducing apparatus with a handsfree call function in the case of enabling a handsfree call while listening to the audio from the music source unit 30.

Figure 28:
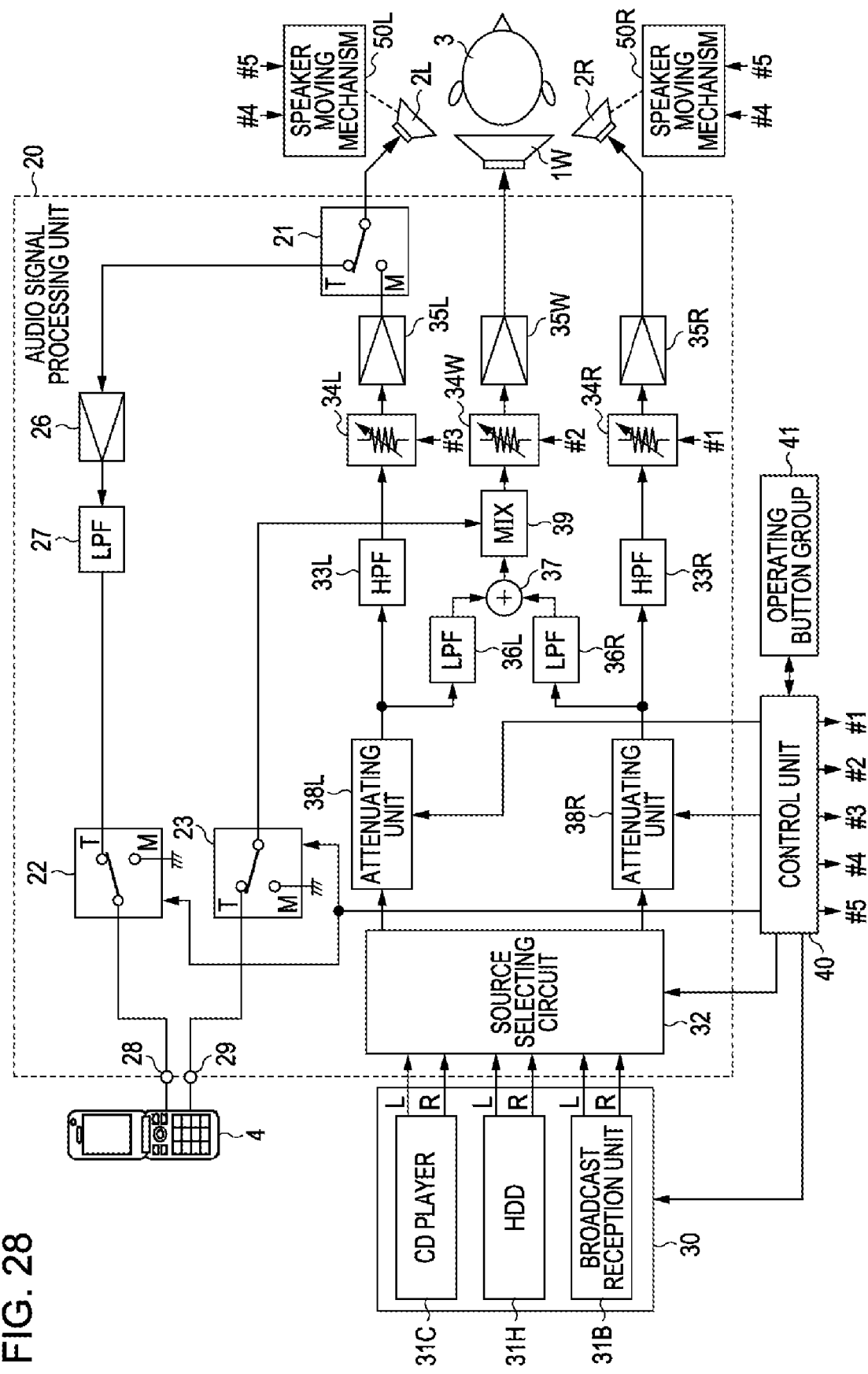
FIG. 28 is a block diagram illustrating a configuration example of an eighth embodiment of an acoustic reproducing apparatus with a handsfree call function according to the present invention.

FIG. 28 illustrates a hardware configuration example of the acoustic reproducing apparatus with a handsfree call function according to the present eighth embodiment. In FIG. 28, the same components as those in the acoustic reproducing apparatus with a handsfree call function according to the above-described seventh embodiment will be denoted with the same reference numerals.

With the present eighth embodiment, the switch circuits 24 and 25 according to the seventh embodiment are not provided. With the present eighth embodiment, instead of the switch circuits 24 and 25 being removed, attenuating units 38L and 38R are provided as to the audio signals of the left and right channels from the source selecting circuit 32. Further, with the present eighth embodiment, there is provided a mixing circuit 39 for mixing the receiver audio signal from the call partner into the audio signal to be supplied to the subwoofer 1W. Note that the attenuating units 38L and 38R make it easy to listen to the receiver audio at the time of a handsfree call, and are not indispensable.

The audio signal of the left channel of the audio signals of the two channels from the source selecting circuit 32 is supplied to the high-pass filter 33L and low-pass filter 36L through the attenuating unit 38L. Also, the audio signal of the right channel of the audio signals of the two channels from the source selecting circuit 32 is supplied to the high-pass filter 33R and low-pass filter 36R through the attenuating unit 38R.

Subsequently, the high-frequency components of the audio signal of the left channel from the high-pass filter 33L are supplied to the speaker 2L for high frequencies of the left channel through the potentiometer 34L for volume control, power amplifier 35L, and further through the acoustic reproduction mode side terminal M of the switch circuit 21.

Also, the high-frequency components of the audio signal of the right channel from the high-pass filter 33R are supplied to the speaker 2R for high frequencies of the right channel through the potentiometer 34R for volume control, and power amplifier 35R as it is.

Also, the low-frequency components of the audio signals of the left and right two channels from an adding circuit 37 are supplied to a mixing circuit 39. The receiver audio signal from the partner at the time of a call through the handsfree call mode side terminal T of the switch circuit 23 is supplied to the mixing circuit 39. Subsequently, the output audio signal of the mixing circuit 39 is supplied to the subwoofer 1W through the potentiometer 34W for volume control and power amplifier 35W.

The attenuating units 38L and 38R are for reducing the sound volume of the music source from the music source unit 30 at the time of performing a handsfree call with the acoustic reproducing apparatus with a handsfree call function according to the present embodiment.

In the music source playing mode, the attenuation amounts of the attenuating units 38L and 38R are zero. That is to say, the attenuating units 38L and 38R input/output an input audio signal thereof without attenuating the signal thereof in the acoustic reproduction mode.

Upon the user pressing the phone button 61 of the operating button group 41, the control unit 40 detects this to switch to the handsfree call mode, and supplies an attenuation control signal to the attenuating units 38L and 38R to attenuate the audio signal from the source selecting circuit 32.

In this case, the attenuation amounts of the attenuating units 38L and 38R at the time of the handsfree call mode are selected so as to attenuate the audio signal of the music source to the degree that a call is not disturbed. With the present example, the attenuating units 38L and 38R are controlled to attenuate an input audio signal thereof, for example, by −20 dB at the time of the handsfree call mode in accordance with the attenuation control signal from the control unit 40. The other configurations are the same as those in the seventh embodiment.

Description of Operation of Eighth Embodiment

In the music source playing mode, the switch circuits 21, 22, and 23 have each been switched to the acoustic reproduction mode side terminal M in the same way as with the seventh embodiment. Therefore, the speaker 2L has not been switched to a microphone, and also the audio signal from the cellular telephone terminal 4 has been shut off by the switch circuit 23.

Subsequently, the high-frequency components of the left and right channels formed from the music source from the music source unit 30 are supplied to the speakers 2L and 2R, and are reproduced acoustically, and the low-frequency components thereof are supplied to the subwoofer 1W, and are reproduced acoustically. The attenuation amounts at the attenuating units 38L and 38R at this time are zero. The output sound volume is changed by operating the volume control knob 65 of the operating button group 41. Also, the source of the two-channel audio signals transmitted from the music source unit 30 is changed by operating the CD button 62, HDD button 63, broadcast button 64, or the like of the operating button group 41.

Upon the user pressing the phone button 61 of the operating button group 41 at the time of the music source playing mode, in the same way as above, the control unit 40 detects this to switch the audio signal processing unit 20 to the handsfree call mode.

Specifically, in the same way as with the seventh embodiment, the control unit 40 supplies a rotational control signal to each of the motors 51L, 52L, 51R, and 52R, moves the speakers 2L and 2R to the height position of the mouth of the user 3, and also to the sound pressure zero region Zo of the subwoofer 1W.

Subsequently, with the present eighth embodiment, the control unit 40 switches the switch circuits 21 through 23 to the handsfree call mode side terminal T. Further, with the present eighth embodiment, the control unit 40 outputs the above-mentioned attenuation control signal to the attenuating units 38L and 38R. Thus, the attenuating units 38L and 38R attenuate an input audio signal thereof by −20 dB, and output the attenuated signal.

Subsequently, the transmitter audio signal of the spoken audio of the user 3 collected at the speaker 2L switched to a microphone is supplied to the cellular telephone terminal 4 through the microphone amplifier 26, low-pass filter 27, switch circuit 22, and audio signal output terminal 28. The cellular telephone terminal 4 transmits the received user's transmitter audio signal to the partner through a cellular telephone network. Also, the receiver audio signal from the partner received at the cellular telephone terminal 4 is input to the audio signal processing unit 20 through the audio signal input terminal 29.

The receiver audio signal input from the partner is mixed with the low-frequency components of the audio signals attenuated at the attenuating units 38L and 38R from the adding circuit 37 at the mixing circuit 39 through the handsfree call mode side terminal T of the switch circuit 23. Subsequently, the audio signal from the mixing circuit 39 is supplied to the subwoofer 1W through the potentiometer 34W for volume control and the power amplifier 35W. That is to say, the receiver audio signal from the call partner is mixed with the attenuated audio signal from the music source unit 30, and is reproduced acoustically by the subwoofer 1W.

Thus, in the handsfree call mode according to the present eighth embodiment, the audio signals from the music source unit 30 are attenuated by −20 dB at the attenuating units 38L and 38R respectively, thereby preventing call voice from becoming inaudible.

Therefore, in the handsfree call mode, while continuing listening to a music source to which the user 3 is listening in the music source playing mode, a handsfree call with a call partner through the cellular telephone 4 can be performed.

The subwoofer 1W is disposed in the vicinity of the backward of the user's head portion, and accordingly, the original sound emission output volume (sound pressure) may be small. According to a combination of this advantage and that the speaker 2L to be switched to a microphone is disposed in the sound pressure zero region Zo of the subwoofer 1W, with the present eighth embodiment, a handsfree call can be performed while preventing howling, and listening to a music source.

Ninth Embodiment

In-Vehicle Audio System

The present ninth embodiment has been arranged such that between two acoustic reproducing apparatuses with a handsfree call function each of the users can call each other as suitable while enjoying playing of a music source. The embodiment described below is a case where an acoustic reproducing apparatus with a handsfree call function is provided to, for example, to the driving seat and passenger seat as an in-vehicle audio system.

Figure 29:
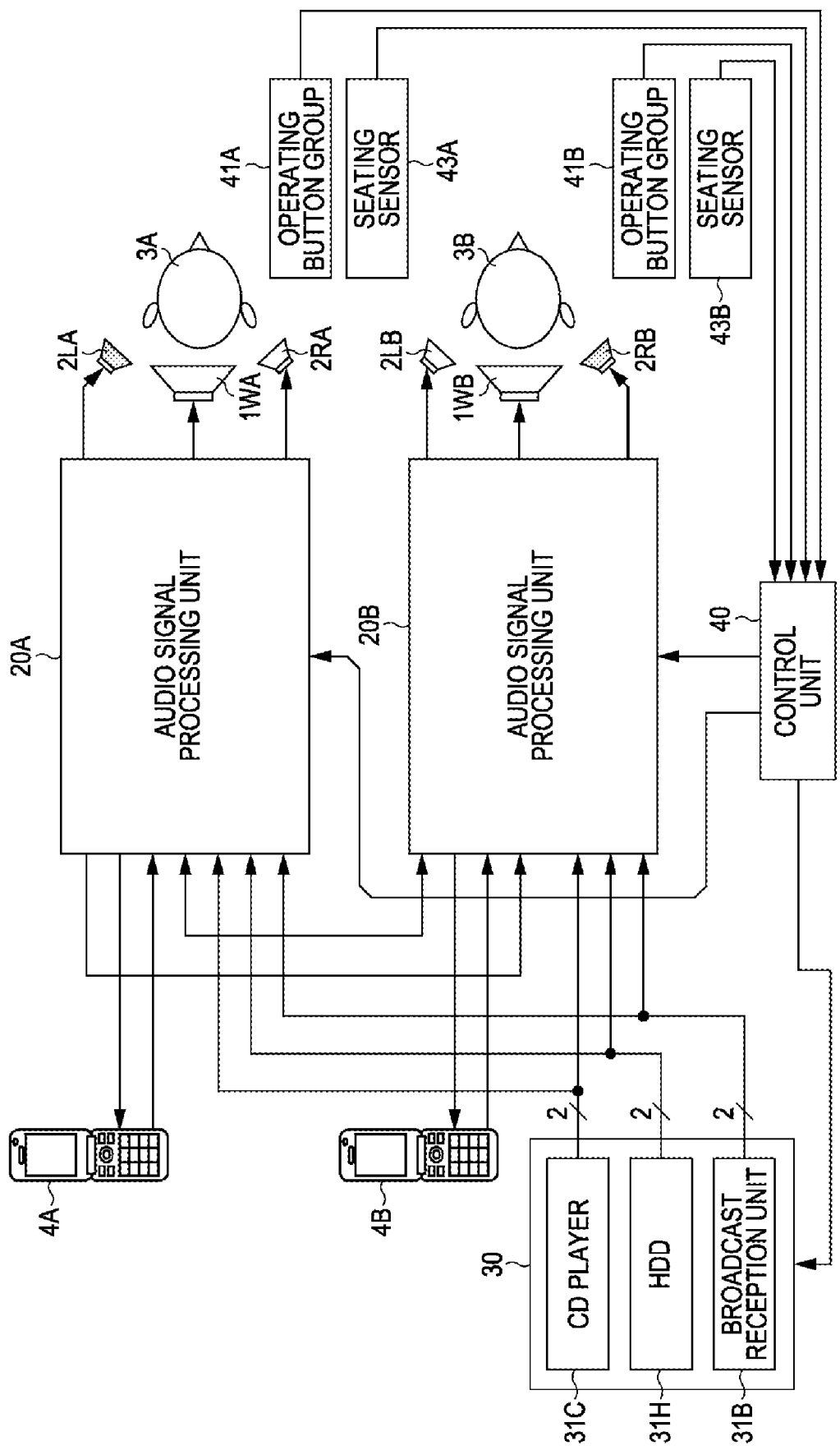
FIG. 29 is a block diagram illustrating a configuration example of a ninth embodiment of an acoustic reproducing apparatus with a handsfree call function according to the present invention.

FIG. 29 is a block diagram illustrating the whole configuration of the in-vehicle audio system according to the present ninth embodiment. As shown in FIG. 29, the present ninth embodiment is, for example, a case where a user 3B sits in the passenger seat, and a user 3A sits in the driving seat.

With the present ninth embodiment, acoustic reproducing apparatuses with a handsfree call function as to the users 3A and 3B can have generally the same configuration as the above-described seventh embodiment or eighth embodiment. Therefore, with the present ninth embodiment, the same portions as those in the above-described seventh and eighth embodiments are denoted with the same reference numerals. With regard to the acoustic reproducing apparatus with a handsfree call function as to the user 3A, the same portions as those in the seventh and eight embodiments are denoted with the same reference numerals to which a suffix A is added. Similarly, with regard to the acoustic reproducing apparatus with a handsfree call function as to the user 3B, the same components as those in the seventh and eight embodiments are denoted with the same reference numerals to which a suffix B is added.

The acoustic reproducing apparatus with a handsfree call function according to the ninth embodiment differs from the above-described seventh and eighth embodiments in that an arrangement is made wherein a mutual call can be performed between the acoustic reproducing apparatuses with a handsfree call function.

With the ninth embodiment as well, though not shown in the drawing, a speaker is provided to the headrest portions of the seats where the users 3A and 3B sit as a speaker having the same configuration as shown in FIG. 21.

Specifically, subwoofers 1WA and 1WB are provided to the portions equivalent to the centers of the headrest portions of the seats where the users 3A and 3B sit. Also, speakers 2LA and 2LB for high frequencies of the left channels are attached to the left side ends of the headrest portions of the seats where the users 3A and 3B sit, and speakers 2RA and 2RB for high frequencies of the right channels are attached to the right side ends of the headrest portions.

In the same way as with the above-described embodiments, the speakers 2LA and 2RA are configured movably, as described above, so as to have a different height position and direction between at the time of the acoustic reproduction mode and at the time of the handsfree call mode, according to the speaker moving mechanisms 50LA and 50RA. Similarly, the speakers 2LB and 2RB are configured movably, as described above, so as to have a different height position and direction between at the time of the acoustic reproduction mode and at the time of the handsfree call mode, according to the speaker moving mechanisms 50LB and 50RB.

Further, at the time of the handsfree call mode, the speakers 2LA and 2RA are configured so as to be positioned in the sound pressure zero region Zo of the subwoofer 1WA, and also the speakers 2LB and 2RB are configured so as to be positioned in the sound pressure zero region Zo of the subwoofer 1WB.

With the present ninth embodiment as well, the subwoofers 1WA and 1WB, and the speakers 2LA, 2LB, 2RA, and 2RB for high frequencies of the left and right channels have a bare speaker configuration.

With the present ninth embodiment, with regard to the user 3A of the driving seat, the speaker 2LA for high frequencies of the left channel is configured so as to be switched to a microphone. Also, with regard to the user 3B of the passenger seat, the speaker 2RB for high frequencies of the right channel is configured so as to be switched to a microphone. In FIG. 29, the speakers 2LA and 2RB configured so as to be switched to a microphone are illustrated with hatching.

Thus, the reason why the microphones at the time of the handsfree call mode are separated by being disposed on the left of the user 3A, and on the right of the user 3B, is to maximally prevent each of the microphones from collecting the spoken audio of the adjacent user.

With the present embodiment, an operating button group 41A is provided as to the user 3A, and an operating button group 41B is provided as to the user 3B. The operation signals corresponding to the operations of the users 3A and 3B as to the operating button groups 41A and 41B are supplied to the control unit 40. The control unit 40 determines which of the operating button groups 41A and 41B has been operated, and which operating button has been operated, thereby performing control according to the determination results thereof.

An audio signal processing unit 20A is provided as to the user 3A, and an audio signal processing unit 20B is provided as to the user 3B, respectively. A cellular telephone terminal 4A can be connected to the audio signal processing unit 20A, and also a cellular telephone terminal 4B can be connected to the audio signal processing unit 20B. Further, the audio signals of the left and right two channels from each of the CD player 31C, HDD 31H, and broadcast reception unit 31B of the music source unit 30 are supplied to each of the audio signal processing units 20A and 20B.

The audio signal processing units 20A and 20B have basically the same configuration as the audio signal processing unit 20 according to the above-described seventh and eighth embodiments.

Specifically, a configuration is employed wherein a music source from the music source unit 30 can be selected and played, and also a telephone call (handsfree call) with an external call partner can be performed through the cellular telephone terminals 4A and 4B, and a cellular telephone network. However, with the present ninth embodiment, the speakers for high frequencies switchable to a microphone differs between the audio signal processing units 20A and 20B, and accordingly, the configurations on this point of view differs between the audio signal processing units 20A and 20B.

With the present ninth embodiment, the audio signal processing units 20A and 20B are configured such that a call between apparatuses can be performed between the users 3A and 3B by employing the speaker 2LA (microphone), subwoofer 1WA, speaker 2RB (microphone), and subwoofer 1WB. If we say that a call employing a cellular telephone terminal is an outer line call, this call between the apparatuses is a call among extensions (conversation between users).

Further, with the present ninth embodiment, seats where the users 3A and 3B sit include seating sensors 43A and 43B for detecting that the users 3A and 3B sit, respectively. The seating detection outputs of the seating sensors 43A and 43B are supplied to the control unit 40.

The control unit 40 sets only the audio signal processing units 20A and/or 20B as to the users 3A and/or 3B of which the seating detection outputs from the seating sensors 43A and 43B are in a state showing seating, to an operable state. For example, the control unit 40 supplies power supply voltage to only the audio signal processing units 20A and/or 20B as to the users 3A and/or 3B of which the seating detection outputs from the seating sensors 43A and 43B are in a state showing seating, enables operation thereof, thereby realizing conservation of electrical power.

Figure 30:
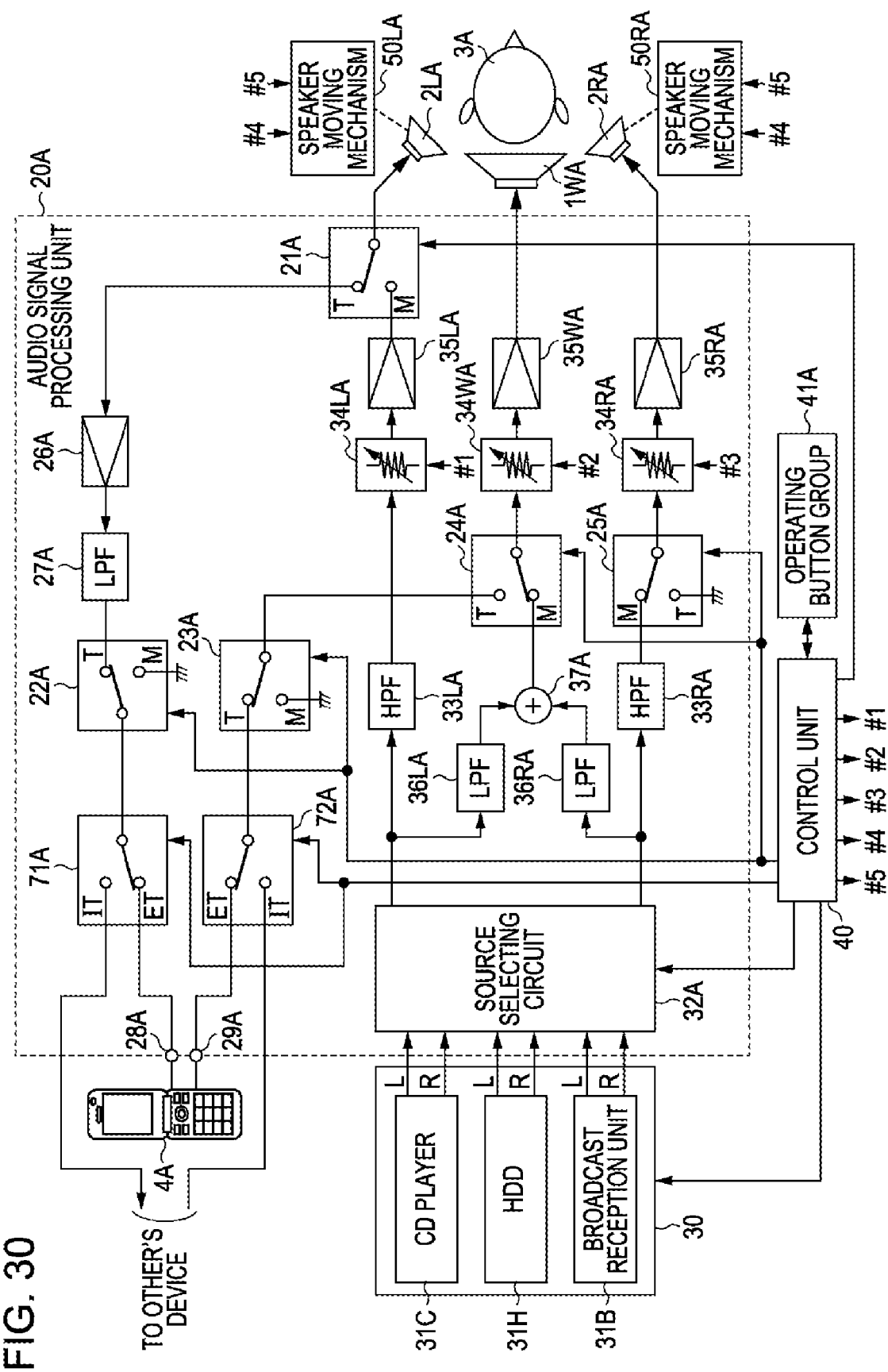
FIG. 30 is a block diagram illustrating a configuration example of a portion of the ninth embodiment of the present invention.
Figure 31:
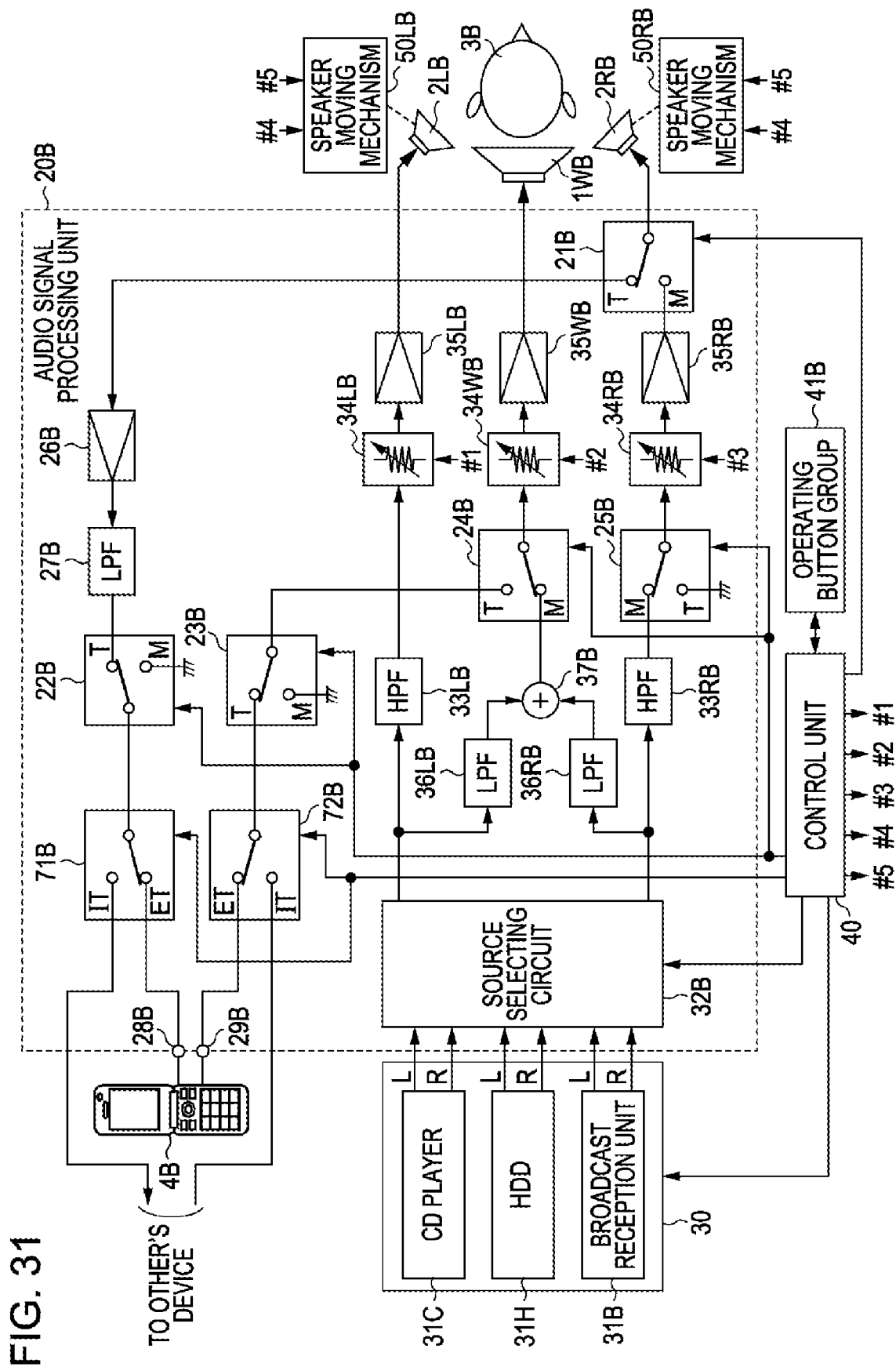
FIG. 31 is a block diagram illustrating a configuration example of another portion of the ninth embodiment of the present invention.

FIG. 30 illustrates a hardware configuration example of the acoustic reproducing apparatus with a handsfree call function as to the user 3A according to the present ninth embodiment. Also, FIG. 31 illustrates a hardware configuration example of the acoustic reproducing apparatus with a handsfree call function as to the user 3B according to the present ninth embodiment. The configurations in FIGS. 30 and 31 are cases where the audio signal processing unit 20 according to the above-described seventh embodiment has been applied to the present ninth embodiment.

As shown in FIG. 30, with the audio signal processing unit 20A of the acoustic reproducing apparatus with a handsfree call function as to the user 3A, a switching terminal (output terminal) of a switch circuit 22A is connected to an switching terminal of a switch circuit 71A.

The switch circuit 71A is a switch circuit which can be switched between at the time of an outer line call and at the time of an extension call (mutual call) by the switching control signal from the control unit 40.

With the present embodiment, an outer line call side terminal ET (output terminal) of the switch circuit 71A is connected to the transmitter audio input terminal of the cellular telephone terminal 4A through an audio signal output terminal 28A.

Also, the receiver audio signal from a call partner from the receiver audio output terminal of the cellular telephone terminal 4A is input to the audio signal processing unit 20A according to the present embodiment through an audio signal input terminal 29A. Subsequently, the receiver audio signal input through the audio signal input terminal 29A is supplied to an outer line call side terminal ET (input terminal) of a switch circuit 72A to be switched between at the time of an outer line call through the cellular telephone terminal 4A and at the time of conversation with the other user 3B (extension call). A switching terminal (output terminal) of the switch circuit 72A is connected to a handsfree call mode side terminal T of a switch circuit 23A.

An extension call side terminal IT (output terminal) of the switch circuit 71A is connected to an extension call side terminal IT (input terminal) of a switch circuit 72B of the audio signal processing unit 20B of later-described another user 3B. Also, an extension call side terminal IT (output terminal) of a switch circuit 71B of the audio signal processing unit 20B of the other user 3B is connected to the extension call side terminal IT (input terminal) of the switch circuit 72A of the audio signal processing unit 20A of the user 3A.

As shown in FIG. 31, with the audio signal processing unit 20B of the acoustic reproducing apparatus with a handsfree call function as to the user 3B, a switch circuit 21B is provided to a speaker 2RB for high frequencies of the right channel. The high-frequency components of the audio signal of the right channel are supplied to an acoustic reproduction mode side terminal M of the switch circuit 21B through a power amplifier 35RB.

Also, the speaker 2RB is configured so as to be switched to a microphone along with switching of the switch circuit 21B at the time of the handsfree call mode. At the time of the handsfree call mode, the audio signal collected at the speaker 2RB switched to a microphone is supplied to a microphone amplifier 26B through a handsfree call mode side terminal T of the switch circuit 21B.

Subsequently, the audio signal amplified at the microphone amplifier 26B is supplied to a handsfree call mode side terminal T (input terminal) of the switch circuit 22B to be switched between at the time of the acoustic reproduction mode and at the time of the handsfree call mode through the low-pass filter 27B. An acoustic reproduction mode side terminal M (input terminal) of the switch circuit 22B is grounded.

Subsequently, a switching terminal (output terminal) of the switch circuit 22B is connected to a switching terminal of the switch circuit 71B to be switched between at the time of an outer line call and at the time of an extension call (mutual call) by the switching control signal from the control unit 40.

An outer line call side terminal ET (output terminal) of the switch circuit 71B is connected to the transmitter audio input terminal of the cellular telephone terminal 4B through an audio signal output terminal 28B with the present embodiment.

Also, the receiver audio signal from the call partner from the receiver audio output terminal of the cellular telephone terminal 4B is input to the audio signal processing unit 20B according to the present embodiment through an audio signal input terminal 29B. The receiver audio signal input through the audio signal input terminal 29B is supplied to an outer line call side terminal (input terminal) ET of the switch circuit 72B to be switched between at the time of an outer line call through the cellular telephone terminal 4B, and at the time of conversation (extension call) with the other user 3A. A switching terminal (output terminal) of the switch circuit 72B is connected to a handsfree call mode side terminal T of the switch circuit 23B.

Subsequently, the extension call side terminal IT (output terminal) of the switch circuit 71B is connected to the extension call side terminal IT (input terminal) of the switch circuit 72A of the audio signal processing unit 20A of the other user 3A. Also, the extension call side terminal IT (output terminal) of the switch circuit 71A of the audio signal processing unit 20A of the other user 3A is connected to the extension call side terminal IT (input terminal) of the switch circuit 72B of the audio signal processing unit 20B of the user 3B.

With the present ninth embodiment, with regard to the operating button groups 41A and 41B, as shown in FIG. 14, the conversation button 66 is added to the configuration of the operating button group 41 shown in FIG. 9. Upon the conversation button 66 being pressed, the control unit 40 determines that an extension call request in the handsfree call mode has occurred to perform control operation for enabling the extension call thereof to be performed.

Operation of Ninth Embodiment

Description will be made below regarding operation at the time of any operating button of the operating button group 41A or 41B being operated by the user 3A or 3B with the system according to the ninth embodiment thus configured.

The control unit 40 monitors the seating detection outputs from the seating sensors 43A and 43B to detect seating as to the seats of the users 3A and 3B. Subsequently, upon detecting seating of the user 3A, the control unit 40 powers the audio signal processing unit 20A to enable the operation thereof. Similarly, upon detecting seating of the user 3B, the control unit 40 powers the audio signal processing unit 20B to enable the operation thereof. Note that the present embodiment is an in-vehicle system, and accordingly, it goes without saying that this system is powered when an accessory switch is turned on with a key.

With the audio signal processing units 20A and 20B wherein seating of the users 3A and 3B is detected, and operation thereof is enabled by the control unit 40, the same operation as with the above-described seventh embodiment is performed except in a case where the conversation button 66 is pressed.

Specifically, in the acoustic reproduction mode wherein the phone button 61 has not been pressed, with the present embodiment, for example, with the audio signal processing unit 20A, the switch circuits 21A through 25A are connected to the music playing side terminal M by the control unit 40. Subsequently, in the acoustic reproduction mode, as described above, under the control of the control unit 40, a source is selected according to pressing of the CD button 62, HDD button 63, broadcast button 64 or the like, and acoustic reproduction according to the 3D system is performed with three speakers.

With the present embodiment, the users 3A and 3B can select and enjoy different music sources. For example, upon the phone button 61 of the operating button group 41A being pressed by the user 3A in the acoustic reproduction mode, the control unit 40 switches to a state of an outer line call in the handsfree call mode. With the present embodiment, the control unit 40 switches the switch circuits 21A through 25A of the audio signal processing unit 20A to the handsfree call mode side terminal T, and switches the switch circuits 71A and 72A to the outer line call side terminal ET.

Also, the control unit 40 controls, as described above, the speaker moving mechanisms 50LA and 50RB to locate and direct the speakers 2LA and 2RA to the height position and direction in the handsfree call mode.

In a state of an outer line call in the handsfree call mode, as described above, with the audio signal processing unit 20A, the transmitter audio from the speaker 2LA switched to a microphone is transmitted to a call partner, and also the receiver audio from the call partner is emitted from the subwoofer 1WA. Thus, a handsfree call can be performed.

Next, description will be made regarding operation at the time of the conversation button 66 being operated. With the present embodiment, operations of the conversation button 66 at the operating button group 41A are an extension call request from the user 3A to the user 3B, and operations of the conversation button 66 at the operating button group 41B are an extension call request from the user 3B to the user 3A.

In a case where an extension call request has occurred, the control unit 40 determines whether or not the requested partner is seated and the audio signal processing unit thereof is in an operable state, and in a case where the audio signal processing unit thereof is not in an operable state, the control unit 40 informs the effect thereof to the user who has requested the extension call request thereof. This notice is performed, for example, by the control unit 40 employing a method for mixing buzzer sound to the audio signal of a music source, or the like.

Next, when the audio signal processing unit of the partner whose extension call request has been performed is in an operable state, the control unit 40 performs control so as to obtain a state in which an extension call (conversation) with handsfree can be performed.

This control will be described with an example in a case where the user 3A has pressed the conversation button 66, for example. With the audio signal processing unit 20A, the control unit 40 first switches the switch circuits 21A through 25A to the handsfree call mode side terminal T, and also switches the switch circuits 71A and 72A to the extension call side terminal IT. Subsequently, with the audio signal processing unit 20B, the control unit 40 switches the switch circuits 21B through 25B to the handsfree call mode side terminal T, and also switches the switch circuits 71B and 72B to the extension call side terminal IT.

Figure 32:
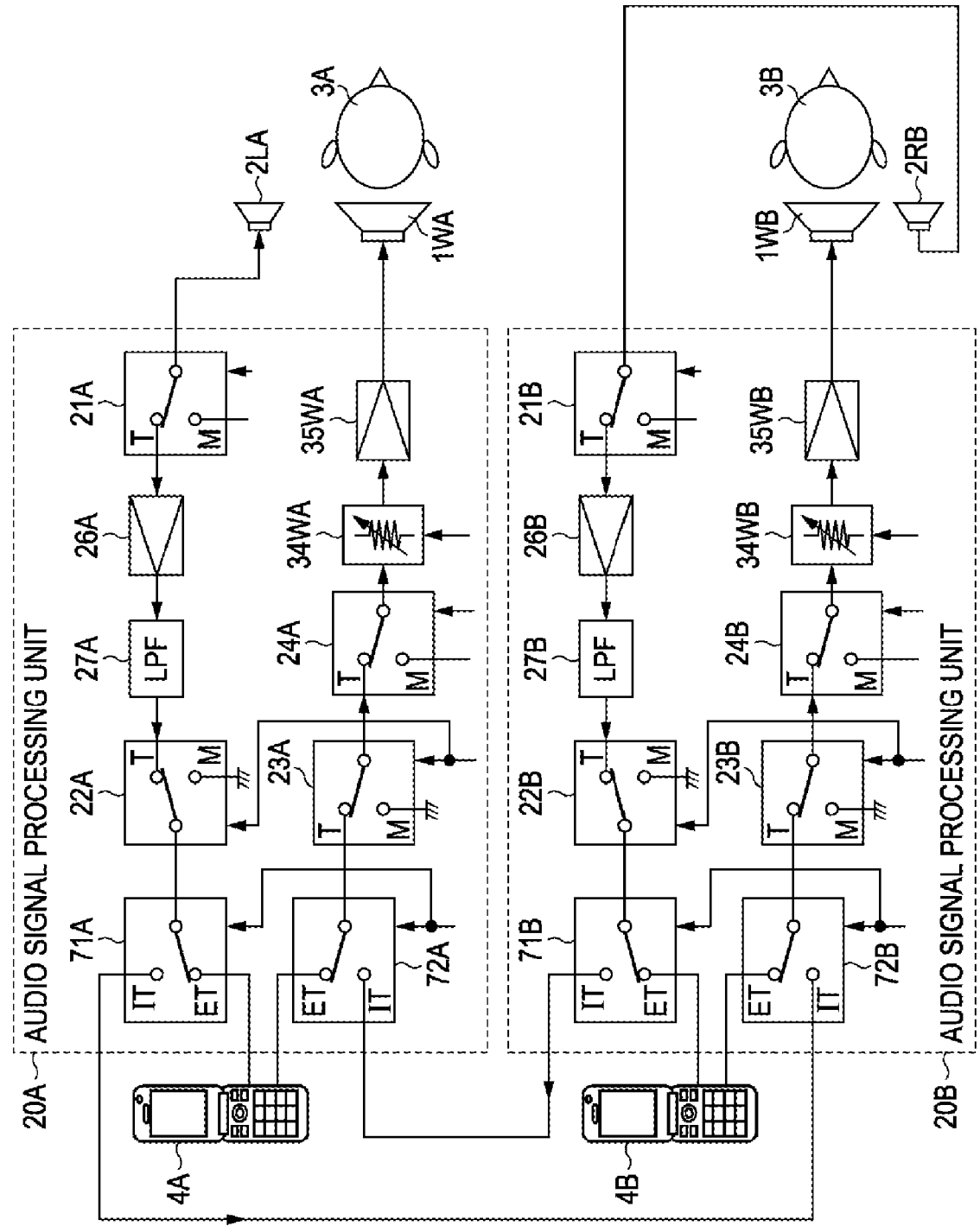
FIG. 32 is a diagram for describing a call between devices (extension call) according to the ninth embodiment of the present invention.

FIG. 32 illustrates the audio signal processing units 20A and 20B by extracting only the components for a handsfree call. FIG. 32 illustrates the switched state of the switch circuits 21A through 24A, 71A, 72A, 21B through 24B, 71B, and 72B at the time of an extension call in the handsfree call mode.

According to switching of the above-mentioned switch circuits, the transmitter audio signal of the user 3A collected at the speaker 2LA switched to a microphone is supplied to the audio signal processing unit 20B of the partner through a route of the microphone amplifier 26A→low-pass filter 27A→switch circuit 22A→switch circuit 71A.

Subsequently, with the audio signal processing unit 20B, the audio signal from the audio signal processing unit 20A is supplied to the subwoofer 1WB through a route of the switch circuit 72B→switch circuit 23B→switch circuit 24B→potentiometer 34WB for volume control→power amplifier 35WB, and is reproduced acoustically.

Thus, the transmitter audio from the user 3A is reproduced acoustically and emitted at the subwoofer 1WB in the vicinity of the user 3B.

Also, the transmitter audio signal of the user 3B collected at the speaker 2RB switched to a microphone is supplied to the audio signal processing unit 20A of the partner through a route of the microphone amplifier 26B→low-pass filter 27B→switch circuit 22B→switch circuit 71B.

Subsequently, with the audio signal processing unit 20A, the audio signal from the audio signal processing unit 20B is supplied to the subwoofer 1WA through a route of the switch circuit 72A→switch circuit 23A→switch circuit 24A→potentiometer 34WA for volume control→power amplifier 35WA, and is reproduced acoustically.

Thus, the transmitter audio from the user 3B is reproduced acoustically and emitted at the subwoofer 1WB in the vicinity of the user 3A.

According to the above, conversation similar to an extension call between the users 3A and 3B can be performed with handsfree. In this case, with the present embodiment, the speakers to be switched to a microphone are disposed on the left ear side of the user 3A, and on the right ear side of the user 3B such that both are separated distantly, and the users 3A and 3B lie between both, and accordingly, the preventive effect of howling is high.

Tenth Embodiment

In-Vehicle Audio System

The tenth embodiment is a developed type of the ninth embodiment. The ninth embodiment is the case where the acoustic reproducing apparatus with a handsfree function according to the present invention has been applied to the driving seat and passenger seat. The tenth embodiment assumes a sedan-typed four-person riding vehicle, wherein the acoustic reproducing apparatus with a handsfree call function according to the present invention is applied to not only the driving seat and passenger seat but also two seat sheets in the back row.

Figure 33:
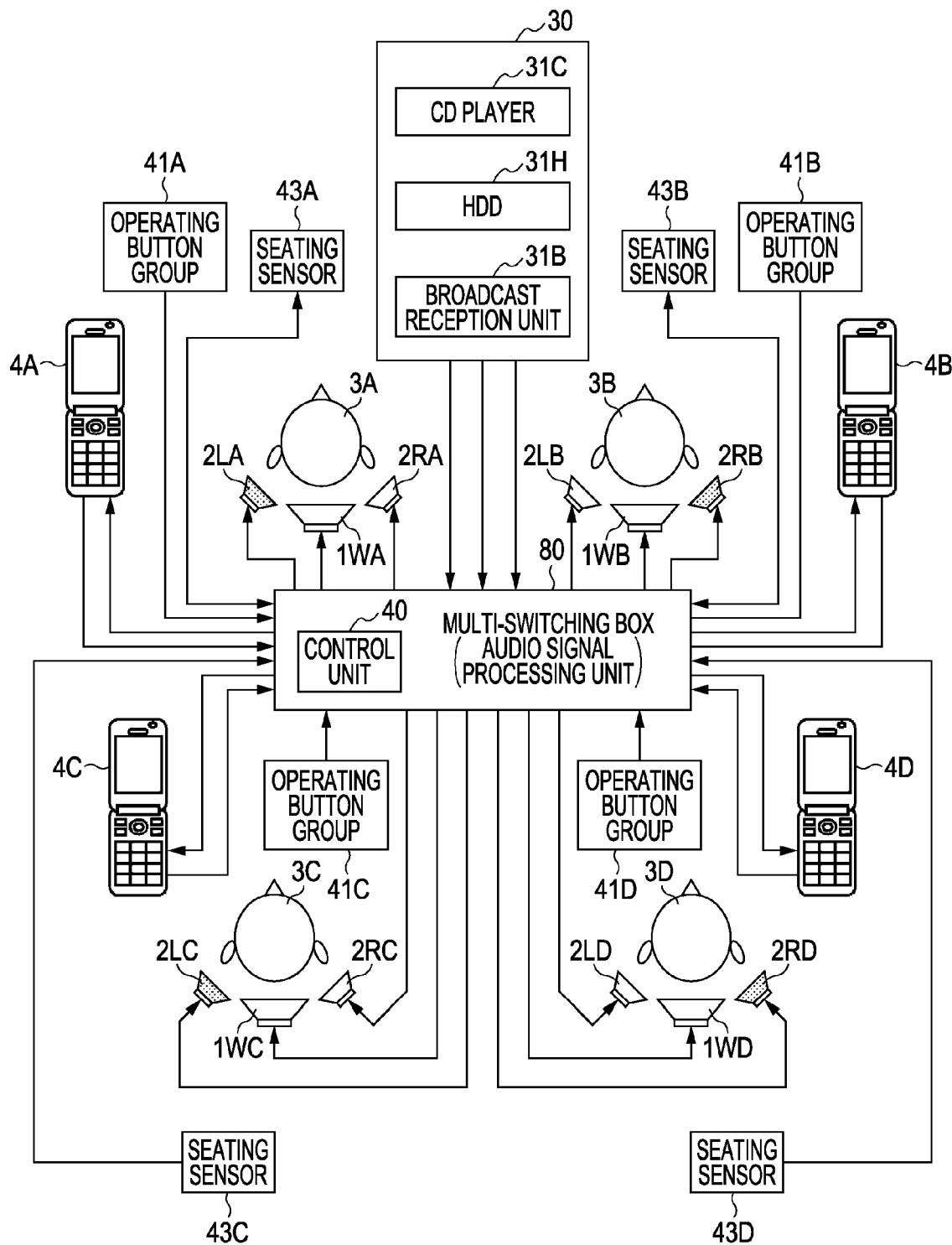
FIG. 33 is a block diagram illustrating a configuration example of a tenth embodiment of an acoustic reproducing apparatus with a handsfree call function according to the present invention.

FIG. 33 is a block diagram illustrating a configuration example of the in-vehicle audio system according to the present tenth embodiment. In FIG. 33, assumption is made that the user 3A sits in the driving seat, the user 3B sits in the passenger seat, the user 3C sits in the seat behind the driving seat, and the user 3D sits in the seat behind the passenger seat.

With the present tenth embodiment as well, the acoustic reproducing apparatus with a handsfree call function as to each of the users 3A, 3B, 3C, and 3D can have, similar to the ninth embodiment, generally the same configuration in the above-described seventh and eighth embodiments. Accordingly, with the present tenth embodiment as well, the same components as the components of the above-described seventh and eighth embodiments are denoted with the same reference numerals.

In FIG. 33, with regard to the acoustic reproducing apparatuses with a handsfree call function as to the users 3A, 3B, 3C, and 3D, the same components as the components of the above-described seventh and eighth embodiments are denoted with the same reference numerals each of which the corresponding suffix A, B, C, or D is added to.

Left-channel speakers 2LA, 2LB, 2LC, and 2LD for high frequencies are attached to the left sides of the headrest portions of the seats where the users 3A, 3B, 3C, and 3D sit (not shown in the drawing). Also, right-channel speakers 2RA, 2RB, 2RC, and 2RD for high frequencies are attached to the right sides of the headrest portions of the seats where the users 3A, 3B, 3C, and 3D sit.

The subwoofers 1WA, 1WB, 1WC, and 1WD are provided in the rear of the head portions of the users 3A, 3B, 3C, and 3D. The subwoofers 1WA, 1WB, 1WC, and 1WD have a bare speaker configuration.

Also, with the present embodiment, the speakers 2LA, 2LB, 2LC, 2LD, 2RA, 2RB, 2RC, and 2RD for high frequencies of the left and right channels have a bare speaker configuration.

With the present embodiment, the speaker 2LA for high frequencies of the left channel is configured so as to be switched to a microphone as to the user 3A of the driving seat. Similarly, the speaker 2LC for high frequencies of the left channel is configured so as to be switched to a microphone as to the user 3C of the seat behind the driving seat.

Also, the speaker 2RB for high frequencies of the right channel is configured so as to be switched to a microphone as to the user 3B of the passenger seat. Similarly, the speaker 2RD for high frequencies of the right channel is configured so as to be switched to a microphone as to the user 3D of the seat behind the passenger seat.

With the present embodiment as well, in the handsfree call mode, the speakers 2LA, 2LB, 2LC, and 2LD for high frequencies, and the speakers 2RA, 2RB, 2RC, and 2RD for high frequencies are disposed in the sound pressure zero regions Zo of the subwoofers 1WA, 1WB, 1WC, and 1WD.

As described above, the reason why the speakers 2LA and 2RB, and speakers 2LC and 2RD are configured so as to be switched to a microphone is, as described above, to prevent collection of the spoken audio of the adjacent users seated horizontally as much as possible. Thus, the preventive effect of howling can be improved in combination with the disposed positions of the speakers to be switched to a microphone.

With the present embodiment, an arrangement is made wherein each of the users of the four seats can enjoy a music source individually, perform a call with an external partner through a cellular telephone network, and further perform conversation with one or more of the four seats (extension call).

A multi-switching box 80 is provided therefore, and as shown in FIG. 34, includes the above-mentioned control unit 40, and also includes audio signal processing units 20A, 20B, 20C, and 20D as to the users 3A, 3B, 3C, and 3D in the seats, respectively. Further, the multi-switching box 80 includes an extension switching circuit 81.

As shown in FIG. 34, cellular telephone terminals 4A, 4B, 4C, and 4D for performing a call with an external partner through a cellular telephone network can be connected to the audio signal processing units 20A, 20B, 20C, and 20D, respectively.

Also, the audio input/output signal for an extension call from each of the audio signal processing units 20A, 20B, 20C, and 20D (e.g., signals obtained at the extension call side terminals IT of the switch circuits 71A and 72A in FIG. 30) is all supplied to the extension switching circuit 81.

The extension switching circuit 81 switches an extension call path according to the control signal from the control unit 40.

As shown in FIG. 33, operating button groups 41A, 41B, 41C, and 41D are provided to the users 3A, 3B, 3C, and 3D in the seats, respectively. Operation signals from the operating button groups 41A, 41B, 41C, and 41D are supplied to the control unit 40 included in the multi-switching box 80.

The control unit 40 determines which of the operating button groups 41A, 41B, 41C, and 41D has been operated, and further determines which of the operating buttons of the determined operating button groups has been operated. Subsequently, the control unit 40 executes control according to the determination results thereof.

With the present embodiment, each of the operating button groups 41A, 41B, 41C, and 41D includes operating buttons such as shown in FIG. 17. Specifically, similar to the above-described embodiments, each of the operating button groups 41A, 41B, 41C, and 41D includes a phone button 61, CD button 62, HDD button 63, broadcast button 64, volume control knob 65, and conversation button 66. With the present tenth embodiment, there are provided further four partner specifying buttons 671, 672, 673, and 674 for specifying one or more of the other three seats serving as conversation targets, correlated with the conversation button 66.

Note that, of the four partner specifying buttons, the three partner specifying buttons 671, 672, and 673 are set beforehand so as to specify a different another seat for each seat. The remaining one partner specifying button 674 of the four partner specifying buttons is an operating button for specifying all of the other three seats as partners.

Also, seating sensors 43A, 43B, 43C, and 43D are provided to the seats of the users 3A, 3B, 3C, and 3D, respectively. Seating detection outputs of the seating sensors 43A, 43B, 43C, and 43D are supplied to the control unit 40 of the multi-switching box 80. The control unit 40 performs control so as to power only the audio signal processing unit corresponding to the seat where a user sits, of the audio signal processing units 20A, 20B, 20C, and 20D, based on the seating detection outputs of the seating sensors 43A, 43B, 43C, and 43D, to enable the operation thereof.

The audio signal processing units 20A, 20B, 20C, and 20D include music source selecting units 32A, 32B, 32C, and 32D (not shown in the drawing), respectively. Thus, the users 3A, 3B, 3C, and 3D can each play and enjoy a music source selected by themselves with the operating button groups 41A, 41B, 41C, and 41D, respectively.

Specifically, for example, upon the user 3A pressing the CD button 62 of the operating button group 41A, the control unit 40 detects this, and controls the music source selecting unit 32A of the audio signal processing unit 20A to select the audio signals of the two channels from the CD player 31C. Also, for example, upon the user 3B pressing the HDD button 63 of the operating button group 41B, the control unit 40 detects this, and controls the music source selecting unit 32B of the audio signal processing unit 20B to select the audio signals of the two channels from the HDD 31H. This is true for the selection button operations of the other users.

Also, the users 3A, 3B, 3C, and 3D can perform a call with a partner through a cellular telephone network through the dedicated cellular telephone terminals 4A, 4B, 4C, and 4D to be connected to the audio signal processing units 20A, 20B, 20C, and 20D by pressing the phone button 61, respectively. The operations at this time have been already described with the ninth embodiment, and accordingly, description thereof will be omitted.

With the present tenth embodiment, while pressing the conversation button 66, upon pressing one of the partner specifying buttons 671, 672, and 673, conversation (extension call) with the partner of the seat specified with the pressed partner specifying button can be performed.

For example, let us say that, after pressing the conversation button 66 at the operating button group 41A, the user 3A has pressed the partner specifying button 671 which has been set so as to specify the user 3B. In this case, the control unit 40 detects button pressing operations at the operating button group 41A by the user 3A, and controls the extension switching circuit 81 to connect the extension call paths of the audio signal processing units 20A and 20B. Thus, conversation can be performed between the users 3A and 3B.

Also, for example, let us say that, after pressing the conversation button 66 at the operating button group 41A, the user 3A has pressed the partner specifying button 671 which has been set so as to specify the user 3B, and the partner specifying button 672 which has been set so as to specify the user 3C. In this case, the control unit 40 detects button pressing operations at the operating button group 41A by the user 3A, and controls the extension switching circuit 81 to connect the extension call paths by the three of the audio signal processing units 20A, 20B, and 20C. Thus, conversation can be performed between the users 3A, 3B, and 3C.

Also, for example, let us say that, after pressing the conversation button 66 at the operating button group 41A, the user 3A has pressed the partner specifying button 674 which has been set so as to specify all of the other users. In this case, the control unit 40 detects button pressing operations at the operating button group 41A by the user 3A, and controls the extension switching circuit 81 to connect the extension call paths by all of the audio signal processing units 20A, 20B, 20C, and 20D. Thus, conversation can be performed between all of the users 3A, 3B, 3C, and 3D.

Note that, in this case as well, as described above, a conversation request (extension call request) as to a user not seated is determined to be invalid based on the seating detection outputs of the seating sensors 43A, 43B, 43C, and 43D. Subsequently, the effect thereof is informed to the user who has requested conversation by warning buzzer sound or the like, as described above. However, an arrangement may be made wherein when requesting conversation with multiple persons, in a case where a part of the seat users is not seated, conversation with the seated users is enabled, and buzzer sound informing that there is a user not seated is omitted.

With the above-described tenth embodiment as well, it goes without saying that an advantage can be obtained completely in the same way as with the above-described embodiments wherein a call with an external partner through a cellular telephone terminal, and an extension call (conversation) can be performed with howling being prevented.

Other Embodiments

With the above-described embodiments, the audio signals of the left and right two channels from a music source have been supplied to left and right speakers as is. Thus, there is a possibility that a sound image is localized in the vicinity of the head portion. However, the audio signals of the left and right two channels from a music source are subjected to virtual sound image localization processing employing a head transfer function, whereby the stereo sound images of the left and right two channels can be localized forward of a user (listener) as virtual sound images.

Specifically, for example, in FIG. 7, a virtual sound image localization processing unit is provided on the output side of the source selecting circuit 32 on the previous stage of the attenuating units 33L and 33R. Subsequently, left and right speakers are installed forward of the user beforehand, and also sound waves from the installed speakers are collected at microphones installed in the vicinity of both ears of the user or dummy head, and a head transfer function is measured beforehand. Subsequently, the virtual sound image localization processing unit performs convolution processing employing the measured head transfer function and the audio signals of the two channels. Thus, virtual sound images are localized forward of the user 3 by emitted audio from speakers 1L and 1R disposed backward in the vicinity of both of the user's ears, whereby the user 3 can listen to the two-channel audio as if it were emitted from left and right speakers disposed forward.

Note that, according to this virtual sound image localization processing, for example 5.1-channel multi-surround virtual sound localization may be performed by employing the two speakers 1L and 1R. In this case, 5.1-channel surround audio signal is subjected to virtual sound image localization processing to generate two-channel audio, and the audio signals of the two channels thereof are supplied to the speakers 1L and 1R, respectively. Therefore, the two speakers 1L and 1R are not restricted to speakers for the left and right channels of two-channel stereo audio.

Note that, with the above-described seventh through tenth embodiments, only one of the left and right speakers for high frequencies of a subwoofer has been configured so as to be switched to a microphone. However, an arrangement may be made wherein both of the left and right speakers 2L and 2R are configured so as to be switched to a microphone, and one thereof is selected as appropriate to be employed as a microphone.

Figure 35A:
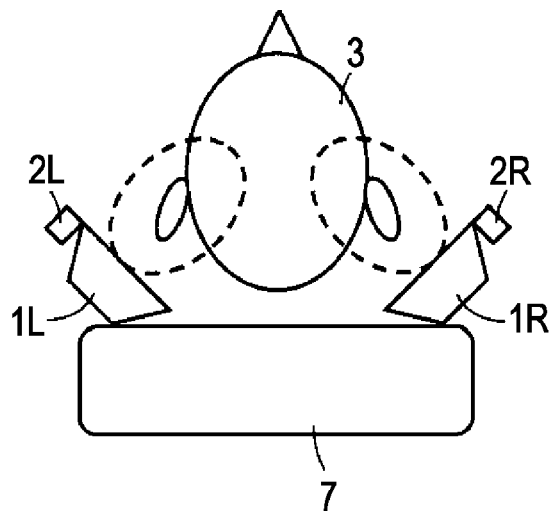
FIGS. 35A through 35C are diagrams for describing another disposed position example of a speaker and microphone for a handsfree call according to the present invention.

Next, with the above-described first through sixth embodiments, the user's left and right speakers 1L and 1R are, as shown in FIG. 35A, fixed such that the vibrating faces of the diaphragms thereof face the left and right ears of the user 3 from the front, and with the example above, in an oblique state as to the long side direction of the headrest portion 7 of the seat where the user 3 sits.

However, in the case of installing the speakers 1L and 1R in the oblique direction, the distance between the speakers 1L and 1R is extended, and accordingly, there is a possibility that rear visibility for the driver deteriorates for the worth thereof.

Figure 35B:
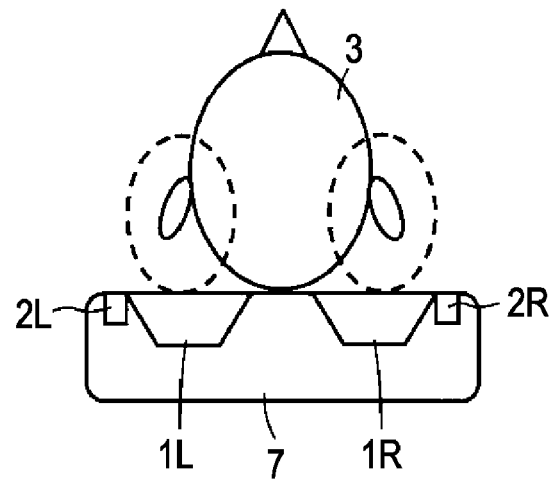

Therefore, in the case of the driving seat, as shown in FIG. 35B, the speakers 1L and 1R are attached to the headrest portion 7 such that the vibrating faces of the diaphragms of the speakers 1L and 1R are located in the direction parallel to the long side direction of the headrest portion. FIG. 35B illustrates a state in which the speakers 1L and 1R are embedded in the headrest portion 7 in a bare speaker state.

Figure 35C:
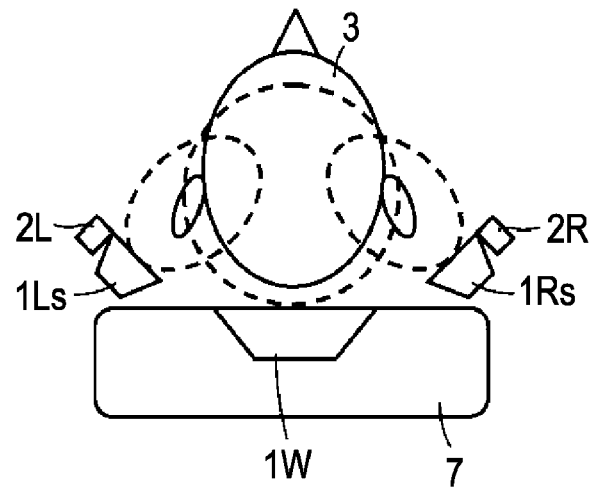

Also, as shown in FIG. 35C, a so-called 3D system made up of a woofer 1W, left and right two small speakers 1Ls and 1Rs for high frequencies may be employed as the configuration of speakers. In this case, for example, an addition signal for the low-frequency components of the audio signals of the left and right two channels is supplied to the woofer 1W. Also, for example, audio signals of the left and right channels passed through a high-pass filter are supplied to the two small speakers 1Ls and 1Rs for high frequencies, respectively.

In the case of the example in FIG. 35C, the left and right small speakers 1Ls and 1Rs for high frequencies are disposed so as to face both of the user's ears from the front, such that the vibrating faces of the diaphragms thereof are located in the oblique direction as to both of the user's ears. However, the speakers 1Ls and 1Rs are small speakers for high frequencies of which the diaphragms have a small bore diameter, and accordingly, backward visibility is better than in the case of FIG. 35A.

Also, with the above-described embodiments, a microphone for a handsfree call has been provided to only one of the left and right two speakers. However, as shown in FIGS. 35A, 35B, and 35C, an arrangement may be made wherein microphones 2L and 2R are provided to both speakers, and any one thereof is selected and employed.

Note that, in the case of FIG. 35C, no microphone is provided to the woofer 1W, and microphones 2L and 2R are provided to both small speakers 1Ls and 1Rs for high frequencies.

Figure 36:
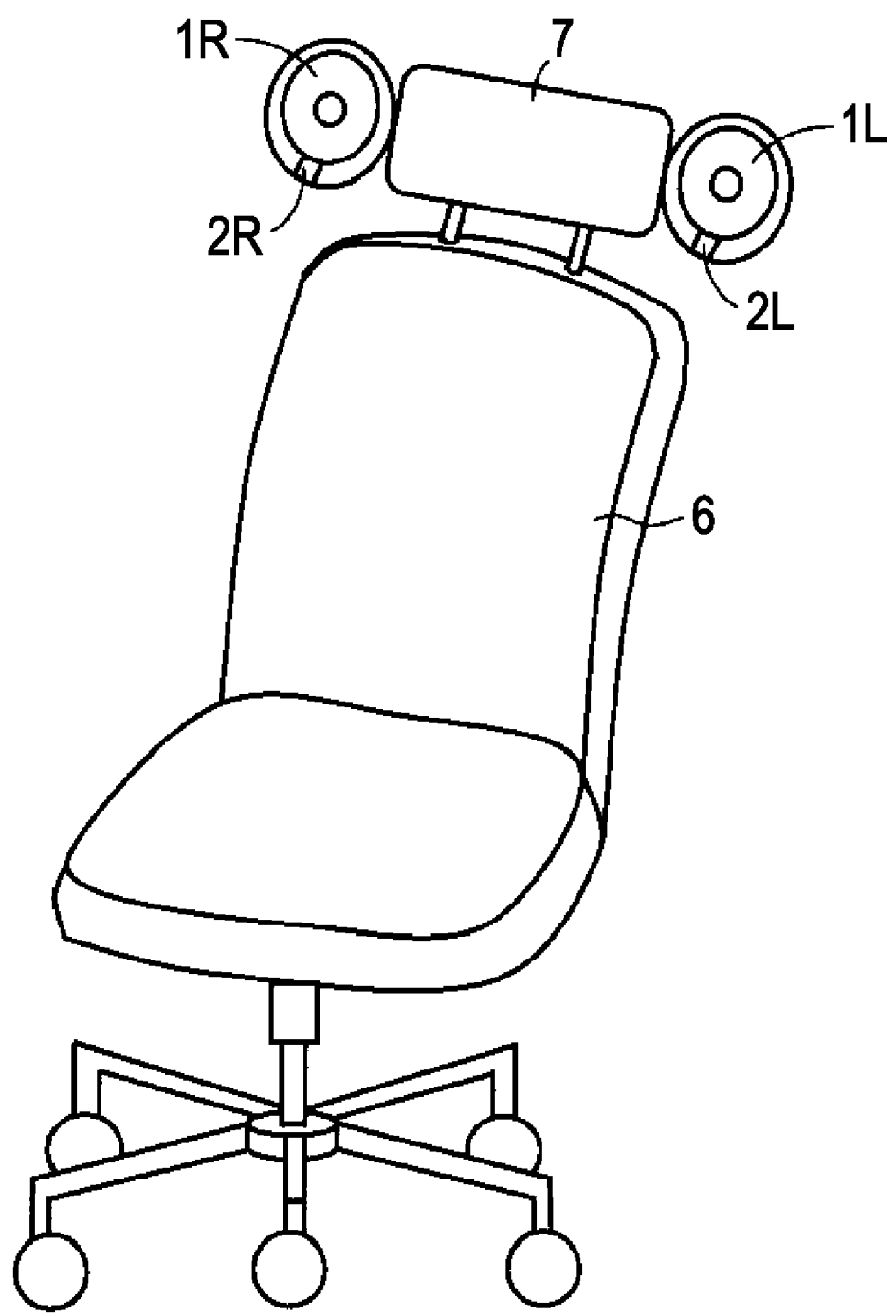
FIG. 36 is a diagram illustrating a disposed position example of a speaker and microphone for a handsfree call with another embodiment of a handsfree call apparatus according to the present invention.

Also, both of the two microphones 2L and 2R provided to both of the left and right speakers 1L and 1R may be employed as microphones for a handsfree call. FIG. 36 illustrates an arrangement wherein both of the left and right speakers 1L and 1R are provided to the headrest portion 7 of a business seat 6, and also microphones 2L and 2R are provided to the frames (sound pressure zero regions) of the speakers 1L and 1R thereof.

In this case, an arrangement is made wherein the left speaker 1L and microphone 2L are employed for a handsfree call regarding a first telephone line, and the right speaker 1R and microphone 2R are employed for a handsfree call regarding a second telephone line. That is to say, two telephone lines are provided, the left speaker 1L and microphone 2L are connected to one telephone line as for a handsfree call as to one telephone line, and the right speaker 1R and microphone 2R are connected to the other telephone line as for a handsfree call as to the other telephone line.

An operator who sits in the seat 6 can perform a handsfree call as to both of the first line and second line by turning the face to the left and right. In this case, simultaneous handsfree calls as to both of the first line and second line can be performed. Accordingly, the apparatus having the configuration in FIG. 36 is suitable for a handsfree call of a telephone answering operator of a call center. In this case, the example in FIG. 36 is for telephone answering, and accordingly, a signal processing system for playing a music source does not have to be provided.

Advantages

According to the handsfree call apparatuses and acoustic reproducing apparatuses with a handsfree call function according to the above-described embodiments, a handsfree call can be performed with a simple hardware configuration while preventing howling. Heretofore, with an in-vehicle apparatus or the like, there has been trouble in that a microphone for a handsfree call has to be attached to a sun visor, steering wheel, or the like.

On the other hand, according to the above-described embodiments, an arrangement is made wherein a microphone (or speaker capable of serving as a microphone) is attached to a position which is a sound pressure zero region of a speaker, and the speaker thereof is attached to a headrest portion, and accordingly, such trouble can be done away with.

Also, with a headphone-typed handsfree call apparatus, a user has had to put on headphones, which has included problems such as uncomfortable feeling, unsanitary state, and so forth caused by the headphones contacting the body.

On the other hand, with the above-described embodiments, speakers and microphone are fixed to a headrest or the like in the vicinity of the user, and accordingly, such problems are eliminated.

Further, speakers are disposed in the vicinity of the user's ears, whereby acoustic energy can be reduced, and even in narrow space such as a vehicle or the like, a handsfree call preventing howling can be performed while suppressing influence to others.

Also, with the above-described embodiments of the acoustic reproducing apparatuses with a handsfree call function, each user can select a music source individually, and can also control sound volume individually. A music source is attenuated at the time of a handsfree call, whereby a handsfree call while listening to the music source can be performed.

Also, as with the ninth embodiment, there is an advantage wherein a microphone for a handsfree call can also be employed for audio recognition at the time of the music playing mode.

Also, there is an advantage wherein a microphone for a handsfree call can also be employed for collection of external noise to perform noise cancellation at the time of the music playing mode.

Other Modifications

With the above-described embodiments, a handsfree call has been performed while listening to a music source at the time of the handsfree call mode. However, in the handsfree call mode, control may be performed so as not to supply the audio signals of the two channels from the music source unit to the speakers 1L and 1R. Specifically, at the time of the handsfree call mode, the output level of the audio signals from the music source unit 30 may be attenuated to zero (attenuation amount is $-\infty$), occurrence thereof may be stopped, or the audio signals from the music source unit 30 may be muted.

With the above-described seventh through tenth embodiments, the speakers for high frequencies of the left and right two channels have had a bare speaker configuration, but these may be attached to a baffle board, or may be speakers to be housed in speaker boxes. However, at least one of the speakers for high frequencies of the left and right two channels has to have a speaker configuration to be switched to a microphone.

Also, with the above-described embodiments, the transmitter audio of a handsfree call is transmitted through the microphone amplifier and low-pass filter, and receiver audio is passed through the power amplifier. However, depending on the type of a cellular telephone terminal, or a connection method as to the cellular telephone terminal thereof, the microphone amplifier, low-pass filter, and power amplifier may be omitted.

With the above-described embodiments, an arrangement has been made wherein a call is performed with an external partner through a cellular telephone network, but this telephone network is not restricted to a cellular telephone network, and it goes without saying that a call through a subscriber telephone line network or another telephone network can be performed.

Also, an acoustic reproducing apparatus with a handsfree call function is not restricted the case of the above-described in-vehicle audio system, and may be configured, for example, as an apparatus for home use.

Note that, with the above-described embodiments, the operating button group has been illustrated in a state of being connected by cable, but it goes without saying that the operating button group may have a configuration to be provided in a remote controller.

The present application contains subject matter related to that disclosed in Japanese Priority Patent Application JP 2008-207918 filed in the Japan Patent Office on Aug. 12, 2008, and 2008-217884 filed in the Japan Patent Office on Aug. 27, 2008, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An acoustic reproducing apparatus with a handsfree call function, the apparatus comprising:
a first speaker held by holding means, with a speaker unit of the first speaker not being attached to a baffle board so as to mix sounds emitted from the front and back of a diaphragm thereof;
a second speaker, which is provided in a region where the sounds emitted from the front and back of said diaphragm of said first speaker are mixed and canceled out, configured so as to be switched to a microphone;
a switching circuit configured to switch said second speaker to said microphone to switch to a state in which a call voice signal of a user collected at said microphone is transmitted to a handsfree call partner at a time of a handsfree call mode, and to switch to a state in which said audio signal to be reproduced is supplied to said second speaker at a time of an acoustic reproduction mode;
audio mixing means configured to supply a mixed audio signal in which an audio signal to be reproduced and a partner audio signal from a call partner are mixed to said first speaker at the time of said handsfree call mode;
output means configured to transmit the call voice signal of said user to the call partner at the time of said handsfree call mode; and
input means configured to receive a partner call voice signal from said call partner and to supply the partner call voice signal to said first speaker at the time of said handsfree call mode.

2. The acoustic reproducing apparatus with the handsfree call function according to claim 1, wherein said first speaker is attached to a headrest of a seat where the user sits;
and wherein said second speaker is attached to said seat in said region where the sounds emitted from the front and back are to be canceled out.

3. The acoustic reproducing apparatus with the handsfree call function according to claim 1, further comprising:
a moving mechanism configured to dispose said second speaker in the vicinity of said user's ear in said acoustic reproduction mode, and dispose said second speaker in the vicinity of said user's mouth in said region to be canceled out in said handsfree call mode.

4. The acoustic reproducing apparatus with the handsfree call function according to claim 1, further comprising:
a second moving mechanism configured to move said second speaker to said region to be canceled out only at the time of said handsfree call mode.

5. The acoustic reproducing apparatus with the handsfree call function according to claim 1, wherein said first speaker is a speaker for low-pitched sound reproduction, and said second speaker is a speaker for high-pitched sound reproduction.

6. The acoustic reproducing apparatus with the handsfree call function according to claim 5, wherein two speakers are for high-pitched sound reproduction, and said second speaker is one of said two speakers.

7. A handsfree call method comprising:
disposing a second speaker configured so as to be switched to a microphone at a region where sounds emitted from the front and back of a diaphragm of a first speaker are mixed and canceled out, the first speaker being held by holding means with a speaker unit thereof not being attached to a baffle board so as to mix and cancel out sounds emitted from the front and back of said diaphragm;
supplying an audio signal to be reproduced to said first speaker, and supplying said audio signal to be reproduced to said second speaker at a time of an acoustic reproduction mode; and
switching said second speaker to said microphone to transmit a call voice signal of a user collected at said microphone to a handsfree call partner, and also supplying a mixed audio signal obtained by adding a partner audio signal from said call partner to said audio signal to be reproduced to said first speaker, at a time of a handsfree reproduction mode.

8. The handsfree call method according to claim 7, further comprising:
attenuating said audio signal to be reproduced, and then adding the attenuated audio signal to an audio signal of said call partner at the time of said handsfree call mode.

9. An acoustic reproducing apparatus with a handsfree call function, comprising:
a first speaker held by a holding unit, a speaker unit of the first speaker not being attached to a baffle board so as to mix sounds emitted from the front and back of a diaphragm thereof;
a second speaker, which is provided in a region where the sounds emitted from the front and back of said diaphragm of said first speaker are mixed and canceled out, configured so as to be switched to a microphone;
a switching circuit configured to switch said second speaker to said microphone to switch to a state in which a call voice signal of a user collected at said microphone is transmitted to a handsfree call partner at a time of a handsfree call mode, and to switch to a state in which said audio signal to be reproduced is supplied to said second speaker at a time of an acoustic reproduction mode;
an audio mixing unit configured to supply a mixed audio signal in which an audio signal to be reproduced and a partner audio signal from a call partner are mixed to said first speaker at the time of said handsfree call mode;
an output unit configured to transmit the call voice signal of said user to the call partner at the time of said handsfree call mode; and
an input unit configured to receive a partner call voice signal from said call partner and to supply the partner call voice signal to said first speaker at the time of said handsfree call mode.

10. A handsfree call method comprising:
disposing a second speaker configured so as to be switched to a microphone at a region where sounds emitted from the front and back of a diaphragm of a first speaker are mixed and canceled out, the first speaker being held by a holding unit with a speaker unit thereof not being attached to a baffle board so as to mix and cancel out sounds emitted from the front and back of said diaphragm;
supplying an audio signal to be reproduced to said first speaker, and supplying said audio signal to be reproduced to said second speaker at a time of an acoustic reproduction mode; and
switching said second speaker to said microphone to transmit a call voice signal of a user collected at said microphone to a handsfree call partner, and also supplying a mixed audio signal obtained by adding a partner audio signal from said call partner to said audio signal to be reproduced to said first speaker, at a time of a handsfree reproduction mode.

* * * * *